(12) United States Patent
Amin et al.

(10) Patent No.: US 11,267,973 B2
(45) Date of Patent: Mar. 8, 2022

(54) DURABLE ANTI-REFLECTIVE ARTICLES

(71) Applicant: CORNING INCORPORATED, Corning, NY (US)

(72) Inventors: Jaymin Amin, Corning, NY (US); Shandon Dee Hart, Corning, NY (US); Karl William Koch, III, Elmira, NY (US); Eric Louis Null, Corning, NY (US); Xu Ouyang, Painted Post, NY (US); Charles Andrew Paulson, Painted Post, NY (US); James Joseph Price, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/707,106

(22) Filed: May 8, 2015

(65) Prior Publication Data

US 2015/0322270 A1    Nov. 12, 2015

Related U.S. Application Data

(60) Provisional application No. 62/098,836, filed on Dec. 31, 2014, provisional application No. 62/098,819, (Continued)

(51) Int. Cl.
*C09D 5/00* (2006.01)
*G02B 1/115* (2015.01)
(Continued)

(52) U.S. Cl.
CPC .......... *C09D 5/006* (2013.01); *C03C 17/3417* (2013.01); *C03C 17/3435* (2013.01); (Continued)

(58) Field of Classification Search
CPC .......... G02B 1/115; G02B 1/105; G02B 1/11; G02B 1/111; G02B 1/113; G02B 1/116; (Continued)

(56) References Cited

U.S. PATENT DOCUMENTS 3,922,068 A    11/1975 Uetsuki
3,934,961 A    1/1976 Itoh et al.
(Continued)

FOREIGN PATENT DOCUMENTS

AU    766773    5/2001
AU    2002341016 B2    8/2008
(Continued)

OTHER PUBLICATIONS

PCT/US2015/030111 PCT Search Report and Written Opinion dated Sep. 24, 2015.
(Continued)

*Primary Examiner* — Nancy R Johnson
(74) *Attorney, Agent, or Firm* — William J. Tucker; Payal Patel

(57) ABSTRACT

Embodiments of durable, anti-reflective articles are described. In one or more embodiments, the article includes a substrate and an anti-reflective coating disposed on the major surface. The article exhibits an average light transmittance of about 94% or greater over an optical wavelength regime and/or an average light reflectance of about 2% or less over the optical wavelength regime, as measured from an anti-reflective surface. In some embodiments, the article exhibits a maximum hardness of about 8 GPa or greater as measured by a Berkovich Indenter Hardness Test along an indentation depth of about 50 nm or greater and a b* value, in reflectance, in the range from about −5 to about 1 as measured on the anti-reflective surface only at all incidence illumination angles in the range from about 0 degrees to
(Continued)

about 60 degrees under an International Commission on Illumination illuminant.

29 Claims, 40 Drawing Sheets

Related U.S. Application Data filed on Dec. 31, 2014, provisional application No. 62/028,014, filed on Jul. 23, 2014, provisional application No. 62/010,092, filed on Jun. 10, 2014, provisional application No. 61/991,656, filed on May 12, 2014.

(51) Int. Cl.
 *C03C 17/34* (2006.01)
 *C03C 21/00* (2006.01)

(52) U.S. Cl.
 CPC ............ *C03C 21/002* (2013.01); *G02B 1/115* (2013.01); *C03C 2217/734* (2013.01); *C03C 2217/78* (2013.01); *Y10T 428/24355* (2015.01); *Y10T 428/265* (2015.01)

(58) Field of Classification Search
 CPC ............. C09D 5/006; Y10T 428/24355; Y10T 428/24364; Y10T 428/2495; Y10T 428/24967; Y10T 428/24975
 See application file for complete search history.

(56) References Cited

U.S. PATENT DOCUMENTS

| | | |
|---|---|---|
| 3,989,350 A | 11/1976 | Cohen et al. |
| 4,033,667 A | 7/1977 | Fleming, Jr. |
| 4,137,365 A | 1/1979 | Wydeven et al. |
| 4,298,366 A | 11/1981 | Dabby et al. |
| 4,310,595 A | 1/1982 | Beall et al. |
| 4,423,925 A | 1/1984 | Dabby et al. |
| 4,495,684 A | 1/1985 | Sander et al. |
| 4,519,966 A | 5/1985 | Aldinger et al. |
| 4,537,814 A | 8/1985 | Itoh et al. |
| 4,568,140 A | 2/1986 | van der Werf |
| 4,571,519 A | 2/1986 | Kawabata et al. |
| 4,705,356 A | 11/1987 | Berning et al. |
| 4,826,734 A | 5/1989 | Jackson et al. |
| 4,851,095 A | 7/1989 | Scobey et al. |
| 4,896,928 A | 1/1990 | Perilloux et al. |
| 4,995,684 A | 2/1991 | Tustison |
| 5,071,206 A | 12/1991 | Hood et al. |
| 5,138,219 A | 8/1992 | Krisl et al. |
| 5,178,911 A | 1/1993 | Gordon et al. |
| 5,234,769 A | 8/1993 | Shevlin |
| 5,268,217 A | 12/1993 | Kimock et al. |
| 5,300,951 A | 4/1994 | Yamazaki |
| 5,332,888 A | 7/1994 | Tausch et al. |
| 5,390,274 A | 2/1995 | Toyoda et al. |
| 5,393,574 A | 2/1995 | Sulzbach |
| 5,478,634 A | 12/1995 | Setoyama et al. |
| 5,503,912 A | 4/1996 | Setoyama et al. |
| 5,506,038 A | 4/1996 | Knapp et al. |
| 5,508,092 A | 4/1996 | Kimock |
| 5,549,953 A | 8/1996 | Li |
| 5,567,363 A | 10/1996 | Jung et al. |
| 5,597,622 A | 1/1997 | Zoller et al. |
| 5,635,245 A | 6/1997 | Kimock et al. |
| 5,637,353 A | 6/1997 | Kimock et al. |
| 5,643,638 A | 7/1997 | Otto et al. |
| 5,718,773 A | 2/1998 | Shiozaki |
| 5,719,705 A * | 2/1998 | Machol .................. 359/581 |
| 5,766,783 A | 6/1998 | Utsumi et al. |
| 5,772,862 A | 6/1998 | Ando et al. |
| 5,773,148 A | 6/1998 | Charrue et al. |
| 5,846,650 A | 12/1998 | Ko et al. |
| 5,935,716 A | 8/1999 | McCurdy |
| 5,938,898 A | 8/1999 | Ando et al. |
| 6,045,894 A | 4/2000 | Jonza et al. |
| 6,074,730 A | 6/2000 | Laird et al. |
| 6,077,569 A | 6/2000 | Knapp et al. |
| 6,088,166 A | 7/2000 | Lee |
| 6,114,043 A | 9/2000 | Joret |
| 6,129,980 A | 10/2000 | Tsukada et al. |
| 6,132,650 A | 10/2000 | Nakamura |
| 6,165,598 A | 12/2000 | Nelson |
| 6,166,125 A | 12/2000 | Sugiyama et al. |
| 6,172,812 B1 | 1/2001 | Haaland |
| 6,174,599 B1 | 1/2001 | Boire et al. |
| 6,217,272 B1 | 4/2001 | Felsenthal et al. |
| 6,238,781 B1 | 5/2001 | Anderson et al. |
| 6,250,758 B1 | 6/2001 | Yoshihara |
| 6,267,915 B1 | 7/2001 | Park et al. |
| 6,303,225 B1 | 10/2001 | Veerasamy |
| 6,337,771 B1 | 1/2002 | Chu et al. |
| 6,344,288 B1 | 2/2002 | Oyama et al. |
| 6,355,334 B1 | 3/2002 | Rondeau et al. |
| 6,355,344 B1 | 3/2002 | Mamish et al. |
| 6,391,400 B1 | 5/2002 | Russell et al. |
| 6,395,333 B2 | 5/2002 | Veerasamy |
| 6,416,872 B1 | 7/2002 | Maschwitz |
| 6,495,251 B1 | 12/2002 | Arbab et al. |
| 6,503,557 B1 | 1/2003 | Joret |
| 6,524,714 B1 | 2/2003 | Neuman et al. |
| 6,535,333 B1 | 3/2003 | Piepel et al. |
| 6,570,709 B2 | 5/2003 | Katayama et al. |
| 6,572,990 B1 | 6/2003 | Oyama et al. |
| 6,580,512 B1 | 6/2003 | Hussey et al. |
| 6,583,935 B1 | 6/2003 | Saif et al. |
| 6,596,368 B1 | 7/2003 | Liebig |
| 6,605,358 B1 | 8/2003 | Stachowiak |
| 6,652,974 B1 | 11/2003 | Krisko |
| 6,707,610 B1 | 3/2004 | Woodard et al. |
| 6,730,352 B2 | 5/2004 | Stachowiak |
| 6,746,775 B1 | 6/2004 | Boire et al. |
| 6,783,253 B2 | 8/2004 | Thomsen et al. |
| 6,785,468 B2 | 8/2004 | Takasaki et al. |
| 6,813,096 B2 | 11/2004 | Ohta |
| 6,838,179 B1 | 1/2005 | Legrand |
| 6,875,468 B2 | 4/2005 | Kunz et al. |
| 6,908,480 B2 | 6/2005 | Jayaraman |
| 6,924,037 B1 | 8/2005 | Joret |
| 6,950,236 B2 | 9/2005 | Hokazono et al. |
| 6,986,857 B2 | 1/2006 | Klemm et al. |
| 6,998,177 B2 | 2/2006 | Krzyzak et al. |
| 7,005,188 B2 | 2/2006 | Anderson et al. |
| 7,018,727 B2 | 3/2006 | Dzick |
| 7,055,954 B2 | 6/2006 | Marechal |
| 7,156,533 B2 | 1/2007 | Hoeing |
| 7,166,360 B2 | 1/2007 | Coustet et al. |
| 7,189,456 B2 | 3/2007 | King |
| 7,229,684 B2 | 6/2007 | Enniss et al. |
| 7,332,213 B2 | 2/2008 | Mimura et al. |
| 7,351,447 B2 | 4/2008 | Nishida et al. |
| 7,378,146 B1 | 5/2008 | Hedrick et al. |
| 7,381,469 B2 | 6/2008 | Moelle et al. |
| 7,405,005 B2 | 7/2008 | Watanabe |
| 7,426,328 B2 | 9/2008 | Zhou et al. |
| 7,498,058 B2 | 3/2009 | Harris et al. |
| 7,521,123 B2 | 4/2009 | Hattori et al. |
| 7,541,102 B2 | 6/2009 | Klippe et al. |
| 7,569,269 B2 | 8/2009 | Takada et al. |
| 7,643,719 B1 | 1/2010 | Zhou et al. |
| 7,655,298 B2 | 2/2010 | Thies et al. |
| 7,736,728 B2 | 6/2010 | Loboda et al. |
| 7,736,824 B2 | 6/2010 | Yoshikawa et al. |
| 7,910,215 B2 | 3/2011 | Reymond |
| 7,926,939 B2 | 4/2011 | Kato et al. |
| 7,978,402 B2 | 7/2011 | Sweeney et al. |
| 8,062,749 B2 | 11/2011 | Shelestak et al. |
| 8,067,094 B2 | 11/2011 | Benson et al. |
| 8,088,502 B2 | 1/2012 | Martin et al. |
| 8,118,896 B2 | 2/2012 | Can et al. |
| 8,187,671 B2 | 5/2012 | Sol |

(56) References Cited

U.S. PATENT DOCUMENTS

| | | |
|---|---|---|
| 8,236,433 B2 | 8/2012 | Chiu |
| 8,273,801 B2 | 9/2012 | Baikerikar et al. |
| 8,304,078 B2 | 11/2012 | Varshneya |
| 8,312,739 B2 | 11/2012 | Lee et al. |
| 8,360,574 B2 | 1/2013 | Ishak et al. |
| 8,383,214 B2 | 2/2013 | Schaepkens et al. |
| 8,400,592 B2 | 3/2013 | Hirakata et al. |
| 8,409,716 B2 | 4/2013 | Schultz et al. |
| 8,425,035 B2 | 4/2013 | von Blanckenhagen |
| 8,432,611 B1 | 4/2013 | Wach |
| 8,445,112 B2 | 5/2013 | Di Stefano |
| 8,446,673 B2 | 5/2013 | Yoshihara |
| 8,460,804 B2 | 6/2013 | Henn et al. |
| 8,508,703 B2 | 8/2013 | Lee |
| 8,561,429 B2 | 10/2013 | Allan et al. |
| 8,679,631 B2 | 3/2014 | Murata |
| 8,691,351 B2 | 4/2014 | Asakura et al. |
| 8,746,880 B2 | 6/2014 | Fukagawa et al. |
| 8,753,744 B2 | 6/2014 | Borrelli et al. |
| 8,784,933 B2 | 7/2014 | Krzyak |
| 8,840,257 B2 | 9/2014 | Kawagishi |
| 8,842,365 B2 | 9/2014 | Koike |
| 8,854,623 B2 | 10/2014 | Fontaine et al. |
| 9,023,457 B2 | 5/2015 | Carrilero et al. |
| 9,041,885 B2 | 5/2015 | Weber et al. |
| 9,042,019 B2 | 5/2015 | Su |
| 9,079,802 B2 | 7/2015 | Bellman et al. |
| 9,110,230 B2 | 8/2015 | Koch, III et al. |
| 9,249,049 B2 | 2/2016 | Fujii |
| 9,296,648 B2 | 3/2016 | Henn et al. |
| 9,335,444 B2 | 5/2016 | Hart et al. |
| 9,359,261 B2 | 6/2016 | Bellman et al. |
| 9,366,784 B2 | 6/2016 | Bellman et al. |
| 9,411,180 B2 | 8/2016 | Gollier et al. |
| 9,573,842 B2 | 2/2017 | Gollier et al. |
| 9,574,262 B2 | 2/2017 | Henn et al. |
| 9,663,400 B2 | 5/2017 | O'Malley et al. |
| 9,684,097 B2 | 6/2017 | Koch et al. |
| 9,701,579 B2 | 7/2017 | Gollier et al. |
| 9,726,786 B2 | 8/2017 | Hart et al. |
| 9,790,593 B2 | 10/2017 | Adib et al. |
| 9,957,609 B2 | 5/2018 | Lee et al. |
| 2001/0002295 A1 | 5/2001 | Anderson et al. |
| 2001/0016262 A1 | 8/2001 | Toyoshima et al. |
| 2001/0017452 A1 | 8/2001 | Bernard |
| 2001/0031365 A1 | 10/2001 | Anderson et al. |
| 2002/0009593 A1 | 1/2002 | Veerasamy |
| 2002/0017452 A1 | 2/2002 | Zimmermann et al. |
| 2002/0051274 A1 | 5/2002 | Kim |
| 2002/0051294 A1 | 5/2002 | Katayama et al. |
| 2002/0136908 A1 | 9/2002 | Komatsu et al. |
| 2003/0019363 A1 | 1/2003 | Grover et al. |
| 2003/0031879 A1 | 2/2003 | Neuman et al. |
| 2003/0035044 A1 | 2/2003 | Nakayama et al. |
| 2003/0044652 A1 | 3/2003 | Wang |
| 2003/0116270 A1 | 6/2003 | Hawa et al. |
| 2003/0179454 A1 | 9/2003 | Thomsen et al. |
| 2003/0193636 A1 | 10/2003 | Allen et al. |
| 2004/0004778 A1 | 1/2004 | Liu et al. |
| 2004/0005482 A1 | 1/2004 | Kobayashi et al. |
| 2004/0065968 A1 | 4/2004 | Klemm et al. |
| 2004/0147185 A1 | 7/2004 | Decroupet |
| 2004/0258947 A1 | 12/2004 | Moelle et al. |
| 2005/0008863 A1 | 1/2005 | Mimura et al. |
| 2005/0012569 A1 | 1/2005 | Sasaki |
| 2005/0074591 A1 | 4/2005 | Zagdoun |
| 2005/0084705 A1 | 4/2005 | Klippe et al. |
| 2005/0123772 A1 | 6/2005 | Coustet et al. |
| 2005/0196632 A1 | 9/2005 | Maschwitz et al. |
| 2005/0233091 A1 | 10/2005 | Kumar et al. |
| 2005/0263775 A1 | 12/2005 | Ikeda et al. |
| 2006/0008656 A1 | 1/2006 | Veerasamy |
| 2006/0017707 A1 | 1/2006 | Fukui et al. |
| 2006/0019119 A1 | 1/2006 | Spitsberg et al. |
| 2006/0093833 A1 | 5/2006 | Meyer et al. |
| 2006/0115651 A1 | 6/2006 | Merfeld et al. |
| 2006/0134436 A1 | 6/2006 | Maschwitz |
| 2006/0139783 A1 | 6/2006 | Decroupet |
| 2006/0154044 A1 | 7/2006 | Yamada et al. |
| 2006/0165963 A1 | 7/2006 | Fleury et al. |
| 2006/0197096 A1 | 9/2006 | Kerdiles et al. |
| 2006/0222863 A1 | 10/2006 | Naduad et al. |
| 2006/0240266 A1 | 10/2006 | Schicht et al. |
| 2007/0018671 A1 | 1/2007 | Steck |
| 2007/0018871 A1 | 1/2007 | Riley |
| 2007/0030569 A1* | 2/2007 | Lu .................. C03C 17/3435 359/586 |
| 2007/0063147 A1 | 3/2007 | Yamazaki et al. |
| 2007/0097509 A1 | 5/2007 | Nevitt et al. |
| 2007/0128528 A1 | 6/2007 | Hess et al. |
| 2007/0146887 A1 | 6/2007 | Ikeda et al. |
| 2007/0188871 A1 | 8/2007 | Fleury et al. |
| 2007/0237918 A1 | 10/2007 | Jonza et al. |
| 2007/0247567 A1 | 10/2007 | Sato et al. |
| 2007/0285776 A1 | 12/2007 | Nakamura et al. |
| 2008/0024867 A1 | 1/2008 | Kawashima et al. |
| 2008/0032157 A1 | 2/2008 | Koekert et al. |
| 2009/0017314 A1 | 1/2009 | Nadaud et al. |
| 2009/0023254 A1 | 1/2009 | Lim et al. |
| 2009/0040440 A1 | 2/2009 | Park |
| 2009/0052041 A1* | 2/2009 | Watanabe et al. .......... 359/586 |
| 2009/0086778 A1 | 4/2009 | Kameyama et al. |
| 2009/0086783 A1 | 4/2009 | Kameyama et al. |
| 2009/0104385 A1* | 4/2009 | Reymond et al. ........... 428/34 |
| 2009/0109537 A1 | 4/2009 | Bright et al. |
| 2009/0141357 A1 | 6/2009 | Kamura |
| 2009/0155490 A1 | 6/2009 | Bicker et al. |
| 2009/0195865 A1 | 8/2009 | Kleideiter et al. |
| 2009/0197048 A1 | 8/2009 | Amin et al. |
| 2009/0217968 A1 | 9/2009 | Joshi et al. |
| 2009/0223437 A1 | 9/2009 | Ballard |
| 2009/0297877 A1 | 12/2009 | Chang et al. |
| 2009/0298669 A1 | 12/2009 | Akiba et al. |
| 2009/0324844 A1 | 12/2009 | Haoto et al. |
| 2010/0009154 A1 | 1/2010 | Allan et al. |
| 2010/0027383 A1* | 2/2010 | Suzuki et al. ............. 368/276 |
| 2010/0028607 A1* | 2/2010 | Lee et al. .................. 428/156 |
| 2010/0047521 A1 | 2/2010 | Amin et al. |
| 2010/0060979 A1 | 3/2010 | Harris et al. |
| 2010/0062245 A1 | 3/2010 | Martin et al. |
| 2010/0119486 A1 | 5/2010 | Sakamoto et al. |
| 2010/0127154 A1 | 5/2010 | Kameyama |
| 2010/0177380 A1 | 7/2010 | Nagahama et al. |
| 2010/0183857 A1 | 7/2010 | Nouvelot |
| 2010/0196685 A1 | 8/2010 | Murata et al. |
| 2010/0215950 A1 | 8/2010 | Schultz et al. |
| 2010/0247745 A1 | 9/2010 | Rudmann et al. |
| 2010/0291353 A1 | 11/2010 | Dejneka et al. |
| 2010/0304090 A1 | 12/2010 | Henn et al. |
| 2010/0311868 A1 | 12/2010 | Bekiarian et al. |
| 2010/0313875 A1 | 12/2010 | Kennedy |
| 2010/0330350 A1 | 12/2010 | Osada et al. |
| 2011/0033635 A1 | 2/2011 | Nishimoto et al. |
| 2011/0033681 A1 | 2/2011 | Adachi |
| 2011/0043719 A1 | 2/2011 | Thunhorst et al. |
| 2011/0114160 A1 | 5/2011 | Murashige et al. |
| 2011/0120554 A1 | 5/2011 | Chhajed |
| 2011/0129287 A1 | 6/2011 | Lecoutre |
| 2011/0151173 A1 | 6/2011 | Ramadas et al. |
| 2011/0157703 A1 | 6/2011 | Broadway et al. |
| 2011/0177241 A1 | 7/2011 | Lee et al. |
| 2011/0235181 A1 | 9/2011 | Hayashibe |
| 2011/0262742 A1 | 10/2011 | Takeuchi et al. |
| 2011/0262752 A1 | 10/2011 | Bawendi et al. |
| 2011/0262754 A1 | 10/2011 | Zehentmaier et al. |
| 2011/0290982 A1 | 12/2011 | Boutami et al. |
| 2011/0297979 A1 | 12/2011 | Diana et al. |
| 2012/0008217 A1 | 1/2012 | Ishak et al. |
| 2012/0027968 A1 | 2/2012 | Chang et al. |
| 2012/0040179 A1 | 2/2012 | Dave |
| 2012/0052271 A1 | 3/2012 | Gomez et al. |
| 2012/0099188 A1 | 4/2012 | Akozbek et al. |
| 2012/0099323 A1 | 4/2012 | Thompson |
| 2012/0107607 A1 | 5/2012 | Takaki et al. |

(56) References Cited

U.S. PATENT DOCUMENTS

| | | |
|---|---|---|
| 2012/0135153 A1 | 5/2012 | Osakabe et al. |
| 2012/0154921 A1 | 6/2012 | Yoshida et al. |
| 2012/0196103 A1 | 8/2012 | Murashige et al. |
| 2012/0212826 A1* | 8/2012 | Henn ............... C03C 17/3435 |
| | | 359/586 |
| 2012/0219792 A1 | 8/2012 | Yamamoto et al. |
| 2012/0228641 A1 | 9/2012 | Thoumazet et al. |
| 2012/0235399 A1 | 9/2012 | Lochbihler |
| 2012/0247152 A1 | 10/2012 | Ohara et al. |
| 2012/0250314 A1 | 10/2012 | Maikowski et al. |
| 2012/0268809 A1 | 10/2012 | Guo et al. |
| 2012/0281292 A1 | 11/2012 | Baca et al. |
| 2012/0301676 A1 | 11/2012 | Ushida et al. |
| 2012/0321898 A1 | 12/2012 | Meinhardt et al. |
| 2012/0327568 A1 | 12/2012 | Shedletsky et al. |
| 2013/0013574 A1 | 1/2013 | Wu |
| 2013/0021669 A1 | 1/2013 | Xi et al. |
| 2013/0022798 A1 | 1/2013 | Fukawa et al. |
| 2013/0029118 A1 | 1/2013 | Kishi et al. |
| 2013/0057950 A1 | 3/2013 | Lin |
| 2013/0059137 A1 | 3/2013 | Hevesi et al. |
| 2013/0120842 A1 | 5/2013 | Moens et al. |
| 2013/0128342 A1 | 5/2013 | Mitarai et al. |
| 2013/0135741 A1 | 5/2013 | Lee et al. |
| 2013/0135742 A1 | 5/2013 | Fukagawa et al. |
| 2013/0135750 A1 | 5/2013 | Walker et al. |
| 2013/0170044 A1 | 7/2013 | Mont et al. |
| 2013/0176615 A1 | 7/2013 | Uefuji et al. |
| 2013/0177751 A1 | 7/2013 | Oh et al. |
| 2013/0183489 A1 | 7/2013 | Cremer et al. |
| 2013/0187185 A1 | 7/2013 | Deshazer et al. |
| 2013/0189184 A1 | 7/2013 | Lub et al. |
| 2013/0209762 A1 | 8/2013 | Damm et al. |
| 2013/0260115 A1 | 10/2013 | Suzuki et al. |
| 2013/0263784 A1 | 10/2013 | Lee et al. |
| 2013/0271836 A1 | 10/2013 | Fukaya |
| 2013/0322270 A1 | 12/2013 | Ko |
| 2013/0334031 A1 | 12/2013 | Lee et al. |
| 2014/0022630 A1 | 1/2014 | Reymond et al. |
| 2014/0036175 A1 | 2/2014 | Morishima et al. |
| 2014/0049827 A1 | 2/2014 | Fujii et al. |
| 2014/0087101 A1 | 3/2014 | Tixhon et al. |
| 2014/0090864 A1 | 4/2014 | Paulson |
| 2014/0090974 A1 | 4/2014 | Ballet et al. |
| 2014/0091419 A1 | 4/2014 | Hasegawa et al. |
| 2014/0093711 A1 | 4/2014 | Paulson |
| 2014/0106141 A1 | 4/2014 | Bellman et al. |
| 2014/0106146 A1 | 4/2014 | Decker et al. |
| 2014/0106150 A1 | 4/2014 | Decker et al. |
| 2014/0111859 A1 | 4/2014 | Duraes et al. |
| 2014/0113083 A1 | 4/2014 | Lee et al. |
| 2014/0113120 A1 | 4/2014 | Thiel |
| 2014/0139978 A1 | 5/2014 | Kwong |
| 2014/0170765 A1 | 6/2014 | Ockenfuss |
| 2014/0174532 A1 | 6/2014 | Stewart et al. |
| 2014/0186615 A1 | 7/2014 | An et al. |
| 2014/0220327 A1 | 8/2014 | Adib et al. |
| 2014/0226208 A1 | 8/2014 | Vikor |
| 2014/0233104 A1 | 8/2014 | Nagahama et al. |
| 2014/0233106 A1 | 8/2014 | Vergoehl et al. |
| 2014/0247415 A1 | 9/2014 | Kleptsyn |
| 2014/0255616 A1 | 9/2014 | Paulson |
| 2014/0261615 A1 | 9/2014 | Nair et al. |
| 2014/0264321 A1 | 9/2014 | Liang et al. |
| 2014/0295330 A1 | 10/2014 | Pruned et al. |
| 2014/0320806 A1 | 10/2014 | Cohen-Tannoudji et al. |
| 2014/0334006 A1 | 11/2014 | Adib et al. |
| 2014/0335330 A1 | 11/2014 | Bellman et al. |
| 2014/0347722 A1 | 11/2014 | Hevesi |
| 2014/0353618 A1 | 12/2014 | Shim et al. |
| 2014/0362444 A1 | 12/2014 | Paulson |
| 2014/0368029 A1 | 12/2014 | Park |
| 2014/0370264 A1 | 12/2014 | Ohara et al. |
| 2014/0376094 A1 | 12/2014 | Bellman et al. |
| 2014/0377522 A1 | 12/2014 | Koch, III et al. |
| 2015/0002809 A1 | 1/2015 | Cohen-Tannoudji et al. |
| 2015/0037554 A1 | 2/2015 | Gao et al. |
| 2015/0043058 A1 | 2/2015 | Saito |
| 2015/0062695 A1 | 3/2015 | Chu et al. |
| 2015/0062710 A1 | 3/2015 | Grillmayer et al. |
| 2015/0079398 A1 | 3/2015 | Amin et al. |
| 2015/0083464 A1 | 3/2015 | Zilbauer et al. |
| 2015/0116832 A1 | 4/2015 | Kamiuto et al. |
| 2015/0212245 A1 | 7/2015 | Ueda |
| 2015/0219798 A1 | 8/2015 | Sonoda et al. |
| 2015/0260888 A1 | 9/2015 | Yoshihara et al. |
| 2015/0284840 A1 | 10/2015 | Henn et al. |
| 2015/0293284 A1 | 10/2015 | Tatemura |
| 2015/0322270 A1 | 11/2015 | Amin et al. |
| 2015/0323705 A1 | 11/2015 | Hart et al. |
| 2015/0346403 A1 | 12/2015 | Jidai et al. |
| 2015/0355382 A1* | 12/2015 | Henn ............... C23C 14/34 |
| | | 428/216 |
| 2015/0376057 A1 | 12/2015 | Koch et al. |
| 2016/0011348 A1 | 1/2016 | Hirakoso et al. |
| 2016/0018576 A1 | 1/2016 | Yamamoto et al. |
| 2016/0076135 A1 | 3/2016 | Cheah et al. |
| 2016/0083835 A1 | 3/2016 | Adib et al. |
| 2016/0372532 A1 | 12/2016 | Song et al. |
| 2017/0075039 A1 | 3/2017 | Hart et al. |
| 2017/0087144 A1 | 3/2017 | Rowe et al. |
| 2017/0184762 A1 | 6/2017 | Fujii et al. |
| 2017/0199307 A1 | 7/2017 | Hart et al. |
| 2017/0317217 A1 | 11/2017 | Ito et al. |
| 2017/0355172 A1 | 12/2017 | Paulson |
| 2019/0077352 A1 | 3/2019 | Bhatia et al. |

FOREIGN PATENT DOCUMENTS

| | | |
|---|---|---|
| CA | 2141536 A1 | 2/1994 |
| CN | 1134555 A | 10/1996 |
| CN | 1423682 A | 6/2003 |
| CN | 1575970 A | 2/2005 |
| CN | 101019043 A | 8/2007 |
| CN | 100360449 | 1/2008 |
| CN | 101236264 A | 8/2008 |
| CN | 101295030 A | 10/2008 |
| CN | 101349769 | 1/2009 |
| CN | 101356455 A | 1/2009 |
| CN | 101400619 A | 4/2009 |
| CN | 101724812 A | 6/2010 |
| CN | 101734867 A | 6/2010 |
| CN | 101809512 A | 8/2010 |
| CN | 102278833 A | 12/2011 |
| CN | 102681042 A | 9/2012 |
| CN | 202661651 U | 1/2013 |
| CN | 102967947 A | 3/2013 |
| CN | 103073196 | 5/2013 |
| CN | 103395247 | 11/2013 |
| CN | 103499852 A | 1/2014 |
| CN | 103508678 | 1/2014 |
| CN | 103707578 | 4/2014 |
| CN | 104040016 A | 9/2014 |
| CN | 104422971 A | 3/2015 |
| CN | 102736136 B | 4/2015 |
| CN | 104553126 A | 4/2015 |
| CN | 105142900 A | 12/2015 |
| CN | 105593705 A | 5/2016 |
| CN | 105764866 A | 7/2016 |
| CN | 105848883 A | 8/2016 |
| CN | 106604900 A | 4/2017 |
| CN | 107076874 A | 8/2017 |
| CN | 107735697 A | 2/2018 |
| DE | 102014104798 | 10/2015 |
| DE | 102015114877 A1 | 3/2017 |
| EP | 0566271 A | 10/1993 |
| EP | 0592986 B1 | 7/1998 |
| EP | 1289898 B1 | 8/2012 |
| EP | 2328818 B1 | 12/2012 |
| EP | 1490715 B1 | 1/2013 |
| EP | 2711744 A1 | 3/2014 |
| EP | 2628818 B1 | 10/2016 |
| GB | 1517585 A | 7/1978 |
| JP | 63238260 | 10/1988 |

(56) References Cited

FOREIGN PATENT DOCUMENTS

| | | |
|---|---|---|
| JP | 04-250834 A | 9/1992 |
| JP | 07035267 | 4/1995 |
| JP | 09-068602 A | 3/1997 |
| JP | 10-000009 A | 1/1998 |
| JP | 11-311702 A | 11/1999 |
| JP | 02974879 | 11/1999 |
| JP | 02974879 B2 | 11/1999 |
| JP | 2000171601 A | 6/2000 |
| JP | 2000171605 A | 6/2000 |
| JP | 2000214302 | 8/2000 |
| JP | 2001-511539 A | 8/2001 |
| JP | 2001303246 A | 10/2001 |
| JP | 2002-116303 A | 4/2002 |
| JP | 2002174810 A | 6/2002 |
| JP | 2002-267835 A | 9/2002 |
| JP | 2003131011 A | 5/2003 |
| JP | 2003236970 A | 8/2003 |
| JP | 2003-266607 A | 9/2003 |
| JP | 2003285343 | 10/2003 |
| JP | 2004138662 A | 5/2004 |
| JP | 2004-163549 A | 6/2004 |
| JP | 2005114649 A | 4/2005 |
| JP | 2005-219223 A | 8/2005 |
| JP | 2005274527 A | 10/2005 |
| JP | 2006-079067 A | 3/2006 |
| JP | 2006-116754 A | 5/2006 |
| JP | 2006-208726 A | 8/2006 |
| JP | 2007099557 A | 4/2007 |
| JP | 2007156017 | 6/2007 |
| JP | 2007-527328 A | 9/2007 |
| JP | 2007271958 | 10/2007 |
| JP | 2008033348 | 2/2008 |
| JP | 2008-133535 A | 6/2008 |
| JP | 2008-242425 A | 10/2008 |
| JP | 04250834 B2 | 4/2009 |
| JP | 2009-109850 A | 5/2009 |
| JP | 2009116218 | 5/2009 |
| JP | 2009116219 | 5/2009 |
| JP | 2009116220 | 5/2009 |
| JP | 2009-529715 A | 8/2009 |
| JP | 2009-204506 A | 9/2009 |
| JP | 2009199022 A | 9/2009 |
| JP | 2009265601 | 11/2009 |
| JP | 2010-037115 A | 2/2010 |
| JP | 04421142 B2 | 2/2010 |
| JP | 2010202514 | 9/2010 |
| JP | 04612827 B2 | 1/2011 |
| JP | 2011017782 A | 1/2011 |
| JP | 2011057547 | 3/2011 |
| JP | 2011093728 | 5/2011 |
| JP | 04707656 B2 | 6/2011 |
| JP | 2011133800 | 7/2011 |
| JP | 2011134464 | 7/2011 |
| JP | 2011-150821 A | 8/2011 |
| JP | 04765069 B2 | 9/2011 |
| JP | 04790396 B2 | 10/2011 |
| JP | 2011-237789 A | 11/2011 |
| JP | 2012171866 | 9/2012 |
| JP | 2012-194546 A | 10/2012 |
| JP | 2012-203187 A | 10/2012 |
| JP | 2012189760 | 10/2012 |
| JP | 2012230290 | 11/2012 |
| JP | 2013-025318 A | 2/2013 |
| JP | 2013-097356 A | 5/2013 |
| JP | 2013-122516 A | 6/2013 |
| JP | 2013-142817 A | 7/2013 |
| JP | 2013-205634 A | 10/2013 |
| JP | 2013-224964 A | 10/2013 |
| JP | 2013-258209 A | 12/2013 |
| JP | 2013252992 | 12/2013 |
| JP | 2014-056215 A | 3/2014 |
| JP | 2014194530 A | 10/2014 |
| JP | 2015-058606 A | 3/2015 |
| JP | 2015058605 | 3/2015 |
| JP | 2018-010275 A | 1/2018 |
| KR | 1103041 | 1/2012 |
| KR | 1194257 | 10/2012 |
| KR | 2013031689 | 3/2013 |
| KR | 2014034172 | 3/2014 |
| TW | 200600824 A | 1/2006 |
| TW | 201815720 A | 5/2018 |
| WO | 1997013003 | 4/1997 |
| WO | 1998037254 | 8/1998 |
| WO | 0037384 | 6/2000 |
| WO | 02/42834 A2 | 5/2002 |
| WO | 0242843 | 5/2002 |
| WO | 2013001023 | 1/2003 |
| WO | 2006099765 | 9/2006 |
| WO | 2008/108332 A1 | 9/2008 |
| WO | 2009/041528 A1 | 4/2009 |
| WO | 2012/043341 A1 | 4/2012 |
| WO | 2012144499 | 10/2012 |
| WO | 2012/157719 A1 | 11/2012 |
| WO | 2013088856 | 6/2013 |
| WO | 2013098641 | 7/2013 |
| WO | 2013160233 | 10/2013 |
| WO | 2014/041257 A1 | 3/2014 |
| WO | 2014167293 | 10/2014 |
| WO | 2014/182693 A1 | 11/2014 |
| WO | 2014182639 | 11/2014 |
| WO | 2015/000534 A1 | 1/2015 |
| WO | 2015/009377 A1 | 1/2015 |
| WO | 2015/031428 | 3/2015 |
| WO | 2015041257 | 3/2015 |
| WO | 2015/070254 A1 | 5/2015 |
| WO | 2015076914 | 5/2015 |
| WO | 2015085283 | 6/2015 |
| WO | WO-2015085283 A1 * | 6/2015 ............ G02B 1/115 |
| WO | 2015/142837 | 9/2015 |
| WO | 2015/179739 | 11/2015 |
| WO | 2016/118462 A2 | 7/2016 |

OTHER PUBLICATIONS

Aissa et al; "Comparison of the structural properties and residual stress of AlN films deposited by dc magnetron sputtering and high power impulse magnetron sputtering at different working pressures." Elsevier, Thin Solid Films, 550 (2014) 264-267.

Assouar et al; "Study of Acoustical and Optical Properties of AlN Films for SAW and BAW Devices: Correlation Between These Properties." Integrated Ferroelectrics, 82: 45-54, 2006.

Boichot et al; "Epitaxial growth of AlN on c-plane sapphire by High Temperature Hydride Vapor Phase Epitaxy Incluence of the gas phase N/Al ratio and low temperature protective layer." Elsevier, Surface & Coatings Technology 237 (2013) 118-125.

Carniero et al. "Hardness Evaluation of Nanolayered PVD Coatings Using Nanoindentation", Rev. Adv. Mater. Sci., 2014 p. 83-90.

Chi et al. "Cracking in coating-substrate composites with multi-layered and FGM coatings," Engineering Fracture Mechanics 70 (2003) p. 1227.

Easwarakhanthan et al; "Spectroellipsometric investigation of optical, morphological, and structural properties of reactively sputtered polycrystalline AlN films." J. Vac. Sci. Technology A 28 (3), pp. 495-501, May/Jun. 2010.

Goldman et al., "Scale Up of Large ALON Windows", Window and Dome Technologies and Materials XIII, edited by Randal W. Tustison, Brian J. Zelinski,Proc. of SPIE vol. 8708, 870804 (Jun. 4, 2013) (See Copy).

Gpi: http://generalplasma.com/products/large-area-pecvd/.

Inkin et al; "Properties of aluminium nitride coating obtained by vacuum arc discharge method with plasma flow separation." Elsevier, Diamond and Related Materials, 10 (2001) 1314-1316.

Ishiguro et al; "Solar Light Absorption Property of Sputtered Al-N Films with Enhanced Surface Roughness during Film Growth." Jpn. J. Appl. Phys. vol. 41 (2002) pp. 292-300.

Krupitskaya "Optical Characatization of AlN Films Grown by Plasma Source Molecular Beam Epitaxy." Journal of Applied Physics 84, 2861-2865, 1998.

Mania et al; "Magnetron Sputtering for Deposition of Aluminum Nitride Thin Films." Prace Komisji Nauk Ceramiczynych, 54, 429-433, 1997.

(56) References Cited

OTHER PUBLICATIONS

Martinet er al; "Deposition of SiO2 and TiO2 thin films by plasma enhanced chemical vapors deposition for antireflection coating", J. Non-Crystalline Solids; 216 (1997) 77-82.
McCauley, et al., "AION: A brief history of its emergence and evolution." Journal of the European Ceramic Society 29 (2009), 223-236. (See Copy).
Miao et al; "Optical Properties and Reactive Sputtering Conditions of AIN and AISiN Thin Films for Magneto-Optical Applications." Journal of Electronic Materials, vol. 26, No. 1, 1997.
Moore, "Gradient Index Optics: A Review," Applied Optics, vol. 19, No. 7, Apr. 1, 1980.
Pantano; "Al2O3 Coating by Atomic Layer Deposition (ALD) on various glass substrates for Surface Strength Improvement".
PCT/US2014/036873 PCT Search Report and Written Opinion dated Aug. 26, 2014.
PCT/US2014/055282 PCT Search Report and Written Opinion dated Nov. 20, 2014.
PCT/US2014/036090 PCT Search Report and Written Opinion dated Aug. 22, 2014.
PCT/US2014/036872 PCT Search Report and Written Opinion dated Aug. 26, 2014.
PCT/US2014/055281 PCT Search Report and Written Opinion dated Mar. 13, 2015.
Tsui, et al., "Effects of Adhesion on the Measurement of Thin Film Mechanical Properties by Nanoindentation." Mat. Res. Soc. Symp. Proc. vol. 473 1997.
Urushidani et al; "Etalon-Type Optical Filters, Their Modules, Spectrometers, and Optical Devices." Jpn. Kokai Tokkyo Koho, 2012.
Urushidani et al; "Optical Filters Including Optical Films Covered with Thickness-Controlled Dielectric Films, and Optical Filter Modules, Spectrometers and Optical Apparatus Containing Them." 2012.
Wang et al; "Study of ALON and CRON films deposited by arc ion plating as diffusion barriers." Jinshu Xuebao (2004) 40, 1, 83-87.
Wang et al; "Roughness Improvement and Hardness Enhancement in Nanoscale Al/AIN Multilayered Thin Films." Applied Physics Letters vol. 71, No. 14, 1951-1953, Oct. 6, 1997.
Watanabe et al; "Surface Oxidation of Aluminum Nitride Thin Films."Surface Modification Technologies XIII, Edited by Sudarshan, Khor, Jeandin, ASM International, Materials Park, Ohio, 1999. pp. 209-215.
Wen et al. "The AIN layer thickness dependent coherent epitaxial growth, stress and hardness in NbN/AIN nanostructured multi-layer films." Surface and Coatings Technology 235 (2013) 367-375.
Xi et al; "The Preparation and Optical properties of AIN Thin Films." Diwen Wuli Xuebao (2012), 34)6), 467-470.
Yamamoto et al; "Manufacture of IR-Reflecting Bent Plate Glass." Jpn. Kokai Tokkyo Koho, 1988.
Yan et al; "The Preparation and Properties of Y2O3/AIN Anti-Reflection Films on Chemical Vapor Deposition Diamond." Elsevier, Thin Solid Films, 520, pp. 734-738, 2011.
Yang et al; "Preparation and Properties of C-Axis Preferred Orientation AIN Thin Films by Pure Nitrogen Reactive Sputtering." Xianjiang Daxue Xuebao, Ziran Kexueban, 26 (4), pp. 444-449, 2009.
Yang et al; "Preparation and Properties of AIN Thin Films by Pure Nitrogen Reactive Sputtering." Rengong Jingti Xuebao, 39 (1), pp. 190-196, 2010.
Yun, et al.. "Optical and Structural Investigation of AIN Grown on Sapphire with Reactive MBE Using RF Nitrogen or Ammonia." Mat. Res. Soc. Symp. Proc., vol. 764, 2003.
Zabinski et al; "Stoichiometry and characterization of aluminium oxynitride thin films grown by ion-beam assisted pulsed laser deposition." Elsevier, Thin Solid Films, 516, pp. 6215-6219, 2008.
Zayats et al; "Optical Studies of AIN/n-Si(100) Films Obtained by the Method of High-Frequency Magnetron Sputtering."
Southwell, "Coating design using very thin high-and low-index layers," Applied Optics, vol. 24, Issue 4, p. 457, (1985).

Madocks et al., "Durable neutral color anti-reflective coating for mobile displays", SVC Bulletin Fall 2014.
Godeker et al., "Antireflection coating for sapphire with consideratino of mechanical properties", Surface & Coatings Technology, 241 (2014) 59-63.
Portinha et al., "Hard Zr02/Al2O3 nanolamianted PVD coatings evaluated by nanoindentation", Surface & Coatings Technology 200 (2005) 765-768.
Li et al, "Low-temperature magnetron sputter deposition, hardness and electrical resistivity of amorphous and crystalline alumina thin films" Journal of Vacuum Science & Technology A 18, 2333 (2000).
Moghal et al., "Nanomechanical study of thin film nanocomposite and PVD thin films on polymer substrate for optical applications", J. Phys. D: Appl. Phys. 46 (2013).
Normand D. Corbin, Aluminum Oxynitride Spinel (ALON): A Review, Jul. 1987. Journal of the European Ceramic Society vol. 5, Issue 3, 1989, pp. 143-154.
Atul Vir Singh, Sudhir Chandra, AK Srivastava, BR Chakraborty, G Sehgal, MK Dalai, G Bose. "Structural and optical properties of RF magnetron sputtered aluminium nitride films without external substrate heating." Elsevier, Applied Surface Sceince 257 (2011) 9568-9573.
B. Reinhold, H.J. Spies. "Plasma Nitriding of Aluminum Alloys." Proceedings of the 1st International Automotive Heat Treating Conference. Jul. 13-15, 1998.
Bernd Schroter, Aimo Winkelmann, Wolfgang Richter. "X-ray photoelectron diffraction on SiC and AIN epitaxial films polytype structure and polarity." Elsevier, Journal of Electron Spectroscopy and Related Phenomena. 114-116 (2001) 443-450.
B. Bitterlich, K. Friederich. "Particle-reinforced SiAlONs for Cutting Tools." Materials Science Forum vol. 554 (2007) pp. 129-134.
Borges, J.; Alves, E.: Vax, F.; Marques, L. "Optical Properties of AINxOy Thin Films Deposited by DC Magnetron Sputtering." Proceedings of SPIE, 2011.
Chen, Skromme, Chen, Sun, Yang, Khan, Nakarmi, Lin, Jiang, Reitmeyer, Davis, Dalmau, Schlesser, and Sitar. "Optical Reflectance of Bulk AIN Crystals and AIN Epitaxial Films." AIP Conference Proceedings, 772, 297-298, 2005.
Cinzia Caliendo and Patrizia Imperatori. "Structural, optical, and acoustic characterization of high-quality AIN thick films sputtered on Al2O3 (001) at temperature for GHz-band electroacoustic devices applications." Journal of Applied Physics 96, No. 5, 2610 (2004).
D. Chen, X.L. Ma, Y.M. Wang. "Thickness-dependent structural transformation in the AIN film." Elsevier, Acta Materialia 53 (2005) 5223-5227.
Danylyuk, et al. "Optical and Electrical Properties of Al 1-x InxN Films Grown on Sapphire (0001) by Plasma Source Molecular Beam Epitaxy." Mat. Res. Soc. Symp., vol. 639, 2001.
Fatemeh Hajakbari, Majid Mojtahedzadeh Larijani, Mahmood Ghoranneviss, Morteza Aslaninejad, and alireza Hojabri. "Optical Properties of Amorphous AIN Thin Films on Glass and Silicon Substrates Grown by Single Ion Beam Sputtering." Jpn. J. Appl. Phys. 49, 095802 (2010).
Hirai, Shinji; Miwa, Tetsuya; Iwata, Tsutomu; Ozawa, Masayoshi; Katayama, Hiroshi G."Formation of Aluminum Nitride by Carbothermic Reduction of Alumina in a Flowing Nitrogen Atmosphere." Nippon Kinzoku Gakkaishi (1989, 53 (10), 1035-40.
Hiroshi Yamashita and Akira Yamaguchi. "Preparation and Properties of AlON-SiAlON Composites." Journal of the Ceramic Society of Japan 109, pp. 434-439, 2001.
Huang, Meidong; Zhang, Linlin; Wang, Lige; Tong, Lina; Li, Xiaona; Dong, Chuang. "Effects of Substrate Temperature on Aluminum Nitride Films by Reactive Magnetron Sputtering." Xiyou Jinshu, 35 (5), pp. 715-718, 2011.
J. Gazda, J. Zhao, P.Smith, and R.A. White. "Formation of ALN films on Ti/TiN Arc-Layer Interface with Al-0.5% Cu Interconects evaluated by XPS and Energy-filtered-TEM." Mat. Res. Soc. Symp. Proc. vol. 589, 365-370, 2001.
JA Savage. "Preparation and properties of hard crystalline materials for optical applications—a review." Journal of Crystal Growth 113 (1991) 698-715.
Jonghoon Baek, James Ma, Michael F. Becker, John W.Keto, Desiderio Kovar. "Correlations between optical properties, micro-

(56) References Cited

OTHER PUBLICATIONS structure, and processing conditions of Aluminum nitride thin films fabricated by pulsed laser deposition." Elsevier, Thin Solid Films 515 (2007) 7096-7104.
English Translation of JP2016512997 First Office Action dated Jul. 5, 2016; 6 Pages; Japanese Patent Office.
Chinese First Office Action CN201480037881.2 dated Aug. 3, 2016.
Chinese First Office Action CN20140038909.4 dated Aug. 3, 2016.
Corning, Corning Gorilla Glass for Large Cover-Glass Applications, 2013, pp. 1-3.
Coming, Corning Eagle2000 Glass, Material Information, Revised Aug. 2000, pp. 1-5.
Corning, Corning Eagle XG AMLCD Glass Substrates Material Information, Mie 301, Issued: Jan. 2006, pp. 1-3.
CN201480061989.5 First Office Action dated Jan. 4, 2017, China Patent Office.
Wand et al. "Tribological and optical properties of crystalline and amorphous alumina thin films grown by low temperature reactive magnetron sputter-deposition", Surface and coatings technology, pp. 146-147 (2001) p. 189-194.
English Translation of CN201480037881.2 Office Action dated Mar. 24, 2017, China Patent Office.
Oliver et al. "An improved technique for determining hardness and elastic modulus using load and displacement sensing indentation experiments", J. Mater. Res., vol. 7, No. 6, 1992, 1564-1583.
Oliver et al. "Measurement of Hardness and Elastic Modulus by Instrument Indentation: Advances in Understanding and Refinements to Methodology". J. Mater. Res., vol. 19, No. 1, 2004, 3-20.
International Search Report and Written Opinion PCT/US2016/051488 dated Nov. 21, 2016.
Chang et al. "Characteristics of Si-C-N films deposited by microwave plasma CVD on Si wafers with various buffer layer materials", Diamond and Related Material, 2001, vol. 10, pp. 1910-1915. (Year: 2001.
Corning, "Corning Gorilla Glass 5," Product Info Sheet, 2 pgs. 2016. retrieved from: https://www.corning.com/microsites/csm/gorillaglass/PI_sheets/Corning%20Gorilla%2-Glass%205%20PI%20Sheet.pdf.
English Translation of CN201580037781.4 Office Action dated Mar. 3, 2020; 11 Pages; Chinese Patent Office.
I.V. Afanasyev-Charkin et al. "Hard Si-N-C films with a tunable band gap produced by pulsed glow discharge deposition", Surface & Coatings Technology, 1999, pp. 38-42 (Year: 1999.
Invitation to Pay Additional Fees and Partial Search Report of the European International Searching Authority; PCT/US2019/058547; dated Feb. 19, 2020; 11 Pgs.
Tang et al. "Optical, structural, and mechanical properties of silicon oxyynitride films sputtering by pulsed magnetron sputtering," Applied Optics 56(4) 2016, pp. C168-C174.
Xu et al. "Chemical control of physical properties in silicon nitride films", Applied Physics A: Materials Science & Processing, 2012, vol. III, pp. 867-876 (Year: 2012.
Caceres and Prieto, "Mechanical properties of sputtered silicon notride thin films", Journal of Applied Physics 94(12) 2003, pp. 7868-7873.
Chan et al; "Fracture Toughness Improvements of Dental Ceramic Through Use of Ytiria-Stabilized Zirconia (YSZ) Thin-Film Coating"; Dental Materials, 29 (2013) pp. 881-887.
Fischer-Cripps; "Critical Review of Analysis and Interpretation of Nanoindentation Test Data"; Surface & Coatings Technology 200 (2006) pp. 4153-4165.
Fraunhofer IWS, Available online at <https://www.iws.fraunhofer.de/content/dam/iws/en/documents/publications/product_sheets/200-1a_large_en.pdf>, retrieved in 2020, 1 page.

Harding et al; "Cracking During Indentation and Its Use in the Measurement of Fracture Toughness"; Mat. Res. Soc. Symp. Proc.; vol. 356, 1995, pp. 663-668.
Hay et al; "Continuous Stiffness Measurement During Instrumented Indentation Testing" Experimental Techniques; May/Jun. 2010; pp. 86-94.
Hu et al; "Dynamic Fracturing of Strengthened Glass Under Biaxial Tensile Loading" Journal of Non-Crystalline Solids; 405 (2014); pp. 153-158.
International Search Report and Written Opinion of the European International Searching Authority; PCT/US2019/046502; dated Nov. 18, 2019; 12 Pgs.
International Search Report and Written Opinion of the International Searching Authority; PCT/US2018/034586; dated Aug. 10, 2018; 12 Pages; European Patent Office.
Kitiel, "Introduction to Solid State Physics." Seventh Edition, John Wiley & Sons, Inc., NY, 1996, pp. 611-627.
Liaoning Provincial Popular Science Writers Association, "High Technology Around Your Life", Popular Science Press, p. 217, Oct. 1992 (English Translation Attached.
Park et al; "Atomic Layer Deposition of YTTRia-Stabilized Zirconia Thin Films for Enhanced Reactivity and Stability of Solid Oxide Fuel Cells"; Energy; vol. 116; (2016); pp. 170-176.
Ruddell et al; "The Effect of Deposition Parameters on the Properties of YTTRIA-Stabilzed Zrconia Thin Films"; Thin Solid Films, 445 (2003) pp. 14-19.
Shackelford, Introduction to Materials Science for Engineers,"Sixth Edition, Pearson Prentice Hall, New Jersey, 2005, pp. 404-418".
Smart and Moore; "Solid State Chemistry, An Introduction," Chapman & Hall University and Professional Division, London, 1992, pp. 136-151.
Sonderby et al; "Deposition of YTTRIA-Stabilized Zirconia Thin Films by High Power Impulse Magnetron Sputiering and Pulsed Magnetron Sputiering"; Surface & Coatings Technology; 240; (2014) pp. 1-6.
Wang et al; "Towards Hard yet Touch Ceramic Coatings", Surface & Coatings Technology 258 (2014) pp. 1-16.
Japanese Patent Application No. 2018-219122 Decision of Refusal dated Dec. 2, 2020; 12 Pages; (6 Pages of English Translation and 6 Pages of Original Document) Japanese Patent Office.
Paradis, Suzanne, Characterization and optimization of SiO2 and Si3N4 thin films. 2013, Defence Research and Development Canada (Year: 2013).
Chinese Patent Application No. 201580037781.4, Office Action dated Jul. 28, 2021; 14 pages (English Translation only); Chinese Patent Office.
Afanasyev-Charkin et al; "Hard Si-N-C films with a tunable band gap produced by pulsed glow discharge deposition"; Surface & Coatings Technology; 199 (2005) 38-42.
Chang et al; "Characteristics of Si-C-N films deposited by microwave plasma CVD on Si wafers with various buffer layer materials" Diamond and Related Materials; 10 (2001) 1910-1915.
Huang et al; "Effect of deposition conditions on mechanical properties of low-temperature PECVD silicon nitride films"; Materials Science and Engineering A 435-436 (2006) 453-459.
PCT/US2015/043161 Search Report dated Dec. 3, 2015.
PCT/US2015/030116 PCT Search dated Jan. 12, 2016.
Koch III et al; U.S. Appl. No. 14/828,114 titled "Scratch-Resistant Laminates With Retained Optical Properties" filed Aug. 17, 2015.
Adib et al; U.S. Appl. No. 14/812,562 titled "Scratch-Resistant Materials and Articles Including the Same" filed Jul. 29, 2015.
Xu et al; "Chemical control of physical properties in silicon nitride films"; Appl Phys A (20163) 111: 867-876.

\* cited by examiner

DURABLE ANTI-REFLECTIVE ARTICLES

CROSS-REFERENCE TO RELATED APPLICATIONS

This application claims the benefit of priority under 35 U.S.C. § 119 of U.S. Provisional Application Ser. No. 62/098,836 filed Dec. 31, 2014, U.S. Provisional Application Ser. No. 62/098,819 filed Dec. 31, 2014, U.S. Provisional Application Ser. No. 62/028,014 filed Jul. 23, 2014, U.S. Provisional Application Ser. No. 62/010,092 filed Jun. 10, 2014, and U.S. Provisional Application Ser. No. 61/991,656 filed May 12, 2014, the contents of which are s relied upon and incorporated herein by reference in their entirety.

BACKGROUND

The disclosure relates to durable anti-reflective articles and methods for making the same, and more particularly to articles with multi-layer anti-reflective coatings exhibiting abrasion resistance, low reflectivity, and colorless transmittance and/or reflectance.

Cover articles are often used to protect critical devices within electronic products, to provide a user interface for input and/or display, and/or many other functions. Such products include mobile devices, such as smart phones, mp3 players and computer tablets. Cover articles also include architectural articles, transportation articles (e.g., articles used in automotive applications, trains, aircraft, sea craft, etc.), appliance articles, or any article that requires some transparency, scratch-resistance, abrasion resistance or a combination thereof. These applications often demand scratch-resistance and strong optical performance characteristics, in terms of maximum light transmittance and minimum reflectance. Furthermore, some cover applications require that the color exhibited or perceived, in reflection and/or transmission, does not change appreciably as the viewing angle is changed. In display applications, this is because, if the color in reflection or transmission changes with viewing angle to an appreciable degree, the user of the product will perceive a change in color or brightness of the display, which can diminish the perceived quality of the display. In other applications, changes in color may negatively impact the aesthetic requirements or other functional requirements.

The optical performance of cover articles can be improved by using various anti-reflective coatings; however known anti-reflective coatings are susceptible to wear or abrasion. Such abrasion can compromise any optical performance improvements achieved by the anti-reflective coating. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, such as hardness, for use in mobile devices, architectural articles, transportation articles or appliance articles. Nitrides and diamond-like coatings may exhibit high hardness values but such materials do not exhibit the transmittance needed for such applications.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials disposed experiencing abrasion damage can also oxidize, which further degrades the durability of the coating.

Accordingly, there is a need for new cover articles, and methods for their manufacture, which are abrasion resistant and have improved optical performance.

SUMMARY

Embodiments of durable, anti-reflective articles are described. In one or more embodiments, the article includes a substrate and an anti-reflective coating having a thickness of about 1 µm or less (e.g., about 800 nm or less) disposed on the major surface forming an anti-reflective surface. The article exhibits an abrasion resistance as measured on the anti-reflective surface after a 500-cycle abrasion using a Taber Test, as described herein. In one or more embodiments, the article exhibits an abrasion resistance (as measured on the anti-reflective surface) comprising about 1% haze or less, as measured using a hazemeter having an aperture, wherein the aperture has a diameter of about 8 mm. In one or more embodiments, the article exhibits an abrasion resistance (as measured on the anti-reflective surface) comprising an average roughness Ra, as measured by atomic force microscopy, of about 12 nm or less. In one or more embodiments, the article exhibits an abrasion resistance (as measured on the anti-reflective surface) comprising a scattered light intensity of about 0.05 (in units of 1/steradian) or less, at a polar scattering angle of about 40 degrees or less, as measured at normal incidence in transmission using an imaging sphere for scatter measurements, with a 2 mm aperture at 600 nm wavelength. In some instances, the article exhibits an abrasion resistance (as measured on the anti-reflective surface) comprising a scattered light intensity of about 0.1 (in units of 1/steradian) or less, at a polar scattering angle of about 20 degrees or less, as measured at normal incidence in transmission using an imaging sphere for scatter measurements, with a 2 mm aperture at 600 nm wavelength.

The article of one or more embodiments exhibits superior optical performance in terms of light transmittance and/or light reflectance. In one or more embodiments, the article exhibits an average light transmittance (measured on the anti-reflective surface) of about 94% or greater (e.g., about 98% or greater) over an optical wavelength regime (e.g., in the range from about 400 nm to about 800 nm or from about 450 nm to about 650 nm). In some embodiments, the article exhibits an average light reflectance (measured at the anti-reflective surface) of about 2% or less (e.g., about 1% or less) over the optical wavelength regime. The article may exhibits an average light transmittance or average light reflectance having an average oscillation amplitude of about 1 percentage points or less over the optical wavelength regime. In some instances, the article exhibits an angular color shift of less than about less than about 10 (e.g., 5 or less, 4 or less, 3 or less, 2 or less or about 1 or less) from a reference illumination angle to an incident illumination angle in the range from about 2 degrees to about 60 degrees, when viewed at the anti-reflective surface using an illuminant. Exemplary illuminants include any one of CIE F2, CIE F10, CIE F11, CIE F12 and CIE D65. In one or more embodiment, the article may exhibit a b* value of in the range from about −5 to about 1, from about −5 to about 0 or from about −4 to about 0, in the CIE L*, a*, b* colorimetry system at all incidence illumination angles in the range from about 0 to about 60 degrees. Alternatively or additionally, the article of some embodiments exhibits a transmittance color (or transmittance color coordinates) and/or a reflectance color (or reflectance color coordinates) measured at the anti-reflective surface having a reference point color shift of less than about 2 from a reference point, as defined herein. In one or more embodiments, the reference point may be the origin (0, 0) in the L*a*b* color space (or the color coordinates a*=0, b*=0), the coordinates (a*=−2, b*=−2) or the transmittance or reflectance color coordinates of the substrate. The angular color shift, reference color shift and color coordinates (a* and/or b*) described herein are observed under a D65 and/or F2 illuminant.

In one or more embodiments, the anti-reflective coating may include a plurality of layers. For example, in some embodiments, the anti-reflective coating includes a period comprising a first low RI layer and a second high RI layer. The period may include a first low RI layer and a second high RI disposed on the first low RI layer or vice versa. In some embodiments, the period may include a third layer. The anti-reflective coating may include a plurality of periods such that the first low RI layer and the second high RI layer alternate. The anti-reflective coating can include up to about 10 periods.

In one or more embodiments, at least one of the first low RI layer and the second high RI layer includes an optical thickness (n*d) in the range from about 2 nm to about 200 nm. In some embodiments, the anti-reflective coating includes a plurality of layers with one or more second high RI layer(s) such that the combined thickness of the second high RI layer(s) is less than about 500 nm or less.

In some embodiments, the article may include a layer having a refractive index greater than about 1.9. Materials that may be utilized in that layer include $SiN_x$, $SiO_xN_y$, $Si_nAl_yO_xN_y$, $AlN_x$, $AlO_xN_y$ or a combination thereof.

In some instances, the article may include an additional layer, such as an easy-to-clean coating, a diamond-like carbon ("DLC") coating, a scratch-resistant coating or a combination thereof. Such coatings may be disposed on the anti-reflective coating or between layers of the anti-reflective coating. Where scratch resistant coatings are included, such coatings may be disposed on the anti-reflective coating and may form a scratch resistant surface. Exemplary scratch resistant coatings may exhibit a hardness in the range from about 8 GPa to about 50 GPa as measured by a Berkovitch Indenter Hardness Test, as defined herein.

In some embodiments, the article may include a layer having a refractive index greater than about 1.9. Materials that may be utilized in that layer include $SiN_x$, $SiO_xN_y$, $Si_nAl_yO_xN_y$, $AlN_x$, $AlO_xN_y$ or a combination thereof.

The substrate utilized in one or more embodiments of the article can include an amorphous substrate or a crystalline substrate. An of an amorphous substrate includes glass that may be selected from the group consisting of soda lime glass, alkali aluminosilicate glass, alkali containing borosilicate glass and alkali aluminoborosilicate glass. In some embodiments, the glass may be strengthened and may include a compressive stress (CS) layer with a surface CS of at least 250 MPa extending within the strengthened glass from a surface of the chemically strengthened glass to a depth of layer (DOL) of at least about 10 μm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiments, examples of which are illustrated in the accompanying drawings.

Figure 1:
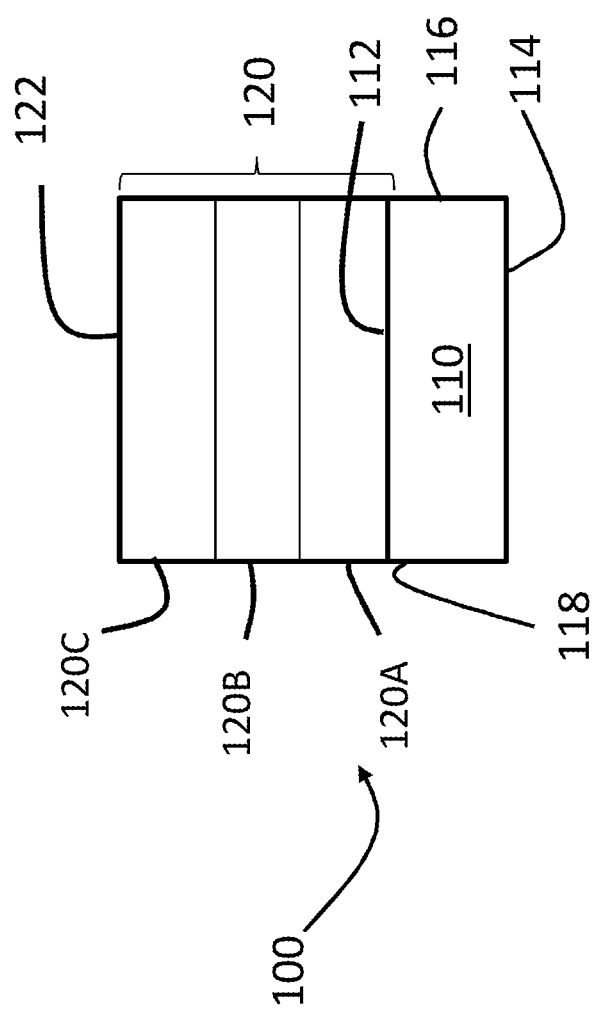
FIG. 1 is a side view of an article, according to one or more embodiments.

Referring to FIG. 1, the article 100 according to one or more embodiments may include a substrate 110, and an anti-reflective coating 120 disposed on the substrate. The substrate 110 includes opposing major surfaces 112, 114 and opposing minor surfaces 116, 118. The anti-reflective coating 120 is shown in FIG. 1 as being disposed on a first opposing major surface 112; however, the anti-reflective coating 120 may be disposed on the second opposing major surface 114 and/or one or both of the opposing minor surfaces, in addition to or instead of being disposed on the first opposing major surface 112. The anti-reflective coating 120 forms an anti-reflective surface 122.

The anti-reflective coating 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein.

The anti-reflective coating 120 of one or more embodiments may be described as abrasion resistant as measured by various methods, after being abraded according to a Taber Test after at least about 500 cycles. Various forms of abrasion test are known in the art, such as the test method specified in ASTM D1044-99, using abrasive media supplied by Taber Industries. Modified abrasion methods related to ASTM D1044-99 can be created using different types of abrading media, abradant geometry and motion, pressure, etc. in order to provide repeatable and measurable abrasion or wear tracks to meaningfully differentiate the abrasion resistance of different samples. For example, different test conditions will usually be appropriate for soft plastics vs. hard inorganic test samples. The embodiments described herein were subjected to a Taber Test, as defined herein, which is a specific modified version of ASTM D1044-99 that gives clear and repeatable differentiation of durability between different samples which comprise primarily hard inorganic materials, such as oxide glasses and oxide or nitride coatings. As used herein, the phrase "Taber Test" refers to a test method using a Taber Linear Abraser 5750 (TLA 5750) and accessories supplied by Taber Industries, in an environment including a temperature of about 22° C.±3° C. and Relative Humidity of up to about 70%. The TLA 5750 includes a CS-17 abraser material having a 6.7 mm diameter abraser head. Each sample was abraded according to the Taber Test and the abrasive damage was evaluated using both Haze and Bidirectional Transmittance Distribution Function (CCBTDF) measurements, among other methods. In the Taber Test, the procedure for abrading each sample includes placing the TLA 5750 and a flat sample support on a rigid, flat surface and securing the TLA 5750 and the sample support to the surface. Before each sample is abraded under the Taber Test, the abraser is refaced using a new S-14 refacing strip adhered to glass. The abraser is subjected to 10 refacing cycles using a cycle speed of 25 cycles/minute and stroke length of 1 inch, with no additional weight added (i.e., a total weight of about 350 g is used during refacing, which is the combined weight of the spindle and collet holding the abraser). The procedure then includes operating the TLA 5750 to abrade the sample, where the sample is placed in the sample support in contact with the abraser head and supporting the weight applied to the abraser head, using a cycle speed of 25 cycles/minute, and a stroke length of 1 inch, and a weight such that the total weight applied to the sample is 850 g (i.e., a 500 g auxiliary weight is applied in addition to the 350 g combined weight of the spindle and collet). The procedure includes forming two wear tracks on each sample for repeatability, and abrading each sample for 500 cycle counts in each of the two wear tracks on each sample.

In one or more embodiments, the anti-reflective coating 120 of the article 100 is abraded according to the above Taber Test and the article exhibits a haze of about 10% of less, as measured on the abraded side using a hazemeter supplied by BYK Gardner under the trademark Haze-Gard Plus®, using an aperture over the source port, the aperture having a diameter of 8 mm.

The article 100 of one or more embodiments exhibits such abrasion resistance with and without any additional coatings (including the additional coating 140, which will be described herein). In some embodiments, the haze may be about 9% or less, about 8% or less, about 7% or less, about 6% or less, about 5% or less, about 4% or less, about 3% or less, about 2% or less, about 1% or less, about 0.5% or less or about 0.3% or less. In some specific embodiments, the article 100 exhibits a haze in the range from about 0.1% to about 10%, from about 0.1% to about 9%, from about 0.1% to about 8%, from about 0.1% to about 7%, from about 0.1% to about 6%, from about 0.1% to about 5%, from about 0.1% to about 4%, from about 0.1% to about 3%, from about 0.1% to about 2%, from about 0.1% to about 1%, 0.3% to about 10%, from about 0.5% to about 10%, from about 1% to about 10%, from about 2% to about 10%, from about 3% to about 10%, from about 4% to about 10%, from about 5% to about 10%, from about 6% to about 10%, from about 7% to about 10%, from about 1% to about 8%, from about 2% to about 6%, from about 3% to about 5%, and all ranges and sub-ranges therebetween.

Alternate methods for quantifying the abrasion resistance are also contemplated here. In one or more embodiments, article 100 abraded by the Taber Test on the anti-reflective coating 120 may exhibit an abrasion resistance as measured by atomic force microscopy (AFM) surface profiling, which may be carried out for example over an 80×80 micron area, or multiple 80×80 micron areas (to sample a larger portion of the abraded area) of the anti-reflective coating 120. From these AFM surface scans, surface roughness statistics such as RMS roughness, Ra roughness, and peak-to-valley surface height may be evaluated. In one or more embodiments, the article 100 (or specifically, the anti-reflective coating 120) may exhibit average surface roughness (Ra) values of about 50 nm or less, about 25 nm or less, about 12 nm or less, about 10 nm or less, or about 5 nm or less, after being abraded under the Taber Test described above.

In one or more embodiments, the article 100 may exhibit an abrasion resistance, after being abraded by the Taber Test as measured by a light scattering measurement. In one or more embodiments, the light scattering measurement includes a bi-directional reflectance distribution function (BRDF) or bi-directional transmittance distribution function (BTDF) measurement carried out using a Radiant Zemax IS-SA™ instrument. This instrument has the flexibility to measure light scattering using any input angle from normal to about 85 degrees incidence in reflection, and from normal to about 85 degrees incidence in transmission, while also capturing all scattered light output in either reflection or transmission into 2*Pi steradians (a full hemisphere in reflection or transmission). In one embodiment, the article 100 exhibits an abrasion resistance, as measured using BTDF at normal incidence and analyzing the transmitted scattered light at a selected angular range, for example from about 10° to about 80° degrees in polar angles and any angular range therein. The full azimuthal range of angles can be analyzed and integrated, or particular azimuthal angular slices can be selected, for example from about 0° and 90° azimuthally. In the case of linear abrasion, it may be desired to choose an azimuthal direction that is substantially orthogonal to the abrasion direction so as to increase signal-to-noise of the optical scattering measurement. In one or more embodiments, the article 100 may exhibit a scattered light intensity as measured at the anti-reflective coating 120, of about less than about 0.1, about 0.05 or less, about 0.03 or less, about 0.02 or less, about 0.01 or less, about 0.005 or less, or about 0.003 or less (in units of 1/steradian), when using the Radiant Zemax IS-SA tool in CCBTDF mode at normal incidence in transmission, with a 2 mm aperture and a monochrometer set to 600 nm wavelength, and when evaluated at polar scattering angles in the range from about 15° to about 60° (e.g. specifically, about 20° or about 40°). Normal incidence in transmission may be otherwise known as zero degrees in transmission, which may be denoted as 180° incidence by the instrument software. In one or more embodiments, the scattered light intensity may be measured along an azimuthal direction substantially orthogonal to the abraded direction of a sample abraded by the Taber Test. In one example, the Taber Test may use from about 10 cycles to about 1000 cycles, and all values in between. These optical intensity values may also correspond to less than about 1%, less than about 0.5%, less than about 0.2%, or less than about 0.1% of the input light intensity that is scattered into polar scattering angles greater than about 5 degrees, greater than about 10 degrees, greater than about 30 degrees, or greater than about 45 degrees.

Generally speaking, BTDF testing at normal incidence, as described herein, is closely related to the transmission haze measurement, in that both are measuring the amount of light that is scattered in transmission through a sample (or, in this case the article 100, after abrading the anti-reflective coating 120). BTDF measurements provide more sensitivity as well as more detailed angular information, compared to haze measurements. BTDF allows measurement of scattering into different polar and azimuthal angles, for example allowing us to selectively evaluate the scattering into azimuthal angles that are substantially orthogonal to the abrasion direction in the linear Taber test (these are the angles where light scattering from linear abrasion is the highest). Transmission haze is essentially the integration of all scattered light measured by normal incidence BTDF into the entire hemisphere of polar angles greater than about +/−2.5 degrees.

The anti-reflective coating 120 and the article 100 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the anti-reflective surface 122 of the article or the surface of the anti-reflective coating 120 (or the surface of any one or more of the layers in the anti-reflective coating) with the diamond Berkovich indenter to form an indent to an indentation depth in the range from about 50 nm to about 1000 nm (or the entire thickness of the anti-reflective coating or layer, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, hardness refers to a maximum hardness, and not an average hardness.

Typically, in nanoindentation measurement methods (such as by using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

Figure 40:
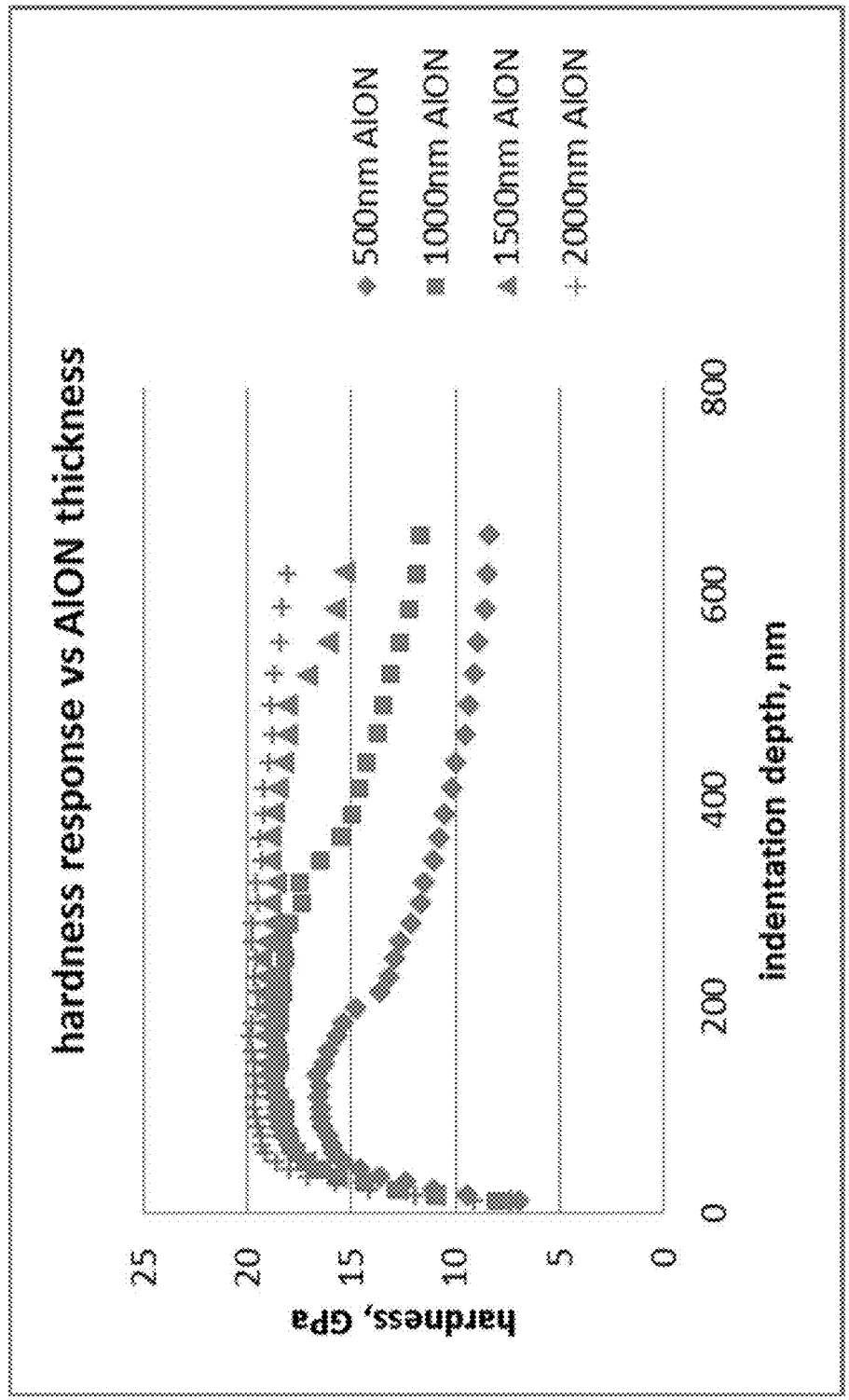
FIG. 40 is a graph illustrating the hardness measurements as a function of indentation depth and coating thickness.

FIG. 40 illustrates the changes in measured hardness value as a function of indentation depth and thickness of a coating. As shown in FIG. 40, the hardness measured at intermediate indentation depths (at which hardness approaches and is maintained at maximum levels) and at deeper indentation depths depends on the thickness of a material or layer. FIG. 40 illustrates the hardness response of four different layers of $AlO_xN_y$ having different thicknesses. The hardness of each layer was measured using the Berkovich Indenter Hardness Test. The 500 nm-thick layer exhibited its maximum hardness at indentation depths from about 100 nm to 180 nm, followed by a dramatic decrease in hardness at indentation depths from about 180 nm to about 200 nm, indicating the hardness of the substrate influencing the hardness measurement. The 1000 nm-thick layer exhibited a maximum hardness at indentation depths from about 100 nm to about 300 nm, followed by a dramatic decrease in hardness at indentation depths greater than about 300 nm. The 1500 nm-thick layer exhibited a maximum hardness at indentation depths from about 100 nm to about 550 nm and the 2000-nm thick layer exhibited a maximum hardness at indentation depths from about 100 nm to about 600 nm. Although FIG. 40 illustrates a thick single layer, the same behavior is observed in thinner coatings and those including multiple layers such as the anti-reflective coating 120 of the embodiments described herein.

In some embodiments, the anti-reflective coating 120 may exhibit a hardness of greater than about 5 GPa, as measured on the anti-reflective surface 122, by a Berkovitch Indenter Hardness Test. The antireflective coating 120 may exhibit a hardness of about 8 GPa or greater, about 10 GPa or greater or about 12 GPa or greater. The article 100, including the anti-reflective coating 120 and any additional coatings, as described herein, may exhibit a hardness of about 5 GPa or greater, about 8 GPa or greater, about 10 GPa or greater or about 12 GPa or greater, as measured on the anti-reflective surface 122, by a Berkovitch Indenter Hardness Test. Such measured hardness values may be exhibited by the anti-reflective coating 120 and/or the article 100 along an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

Figure 2:
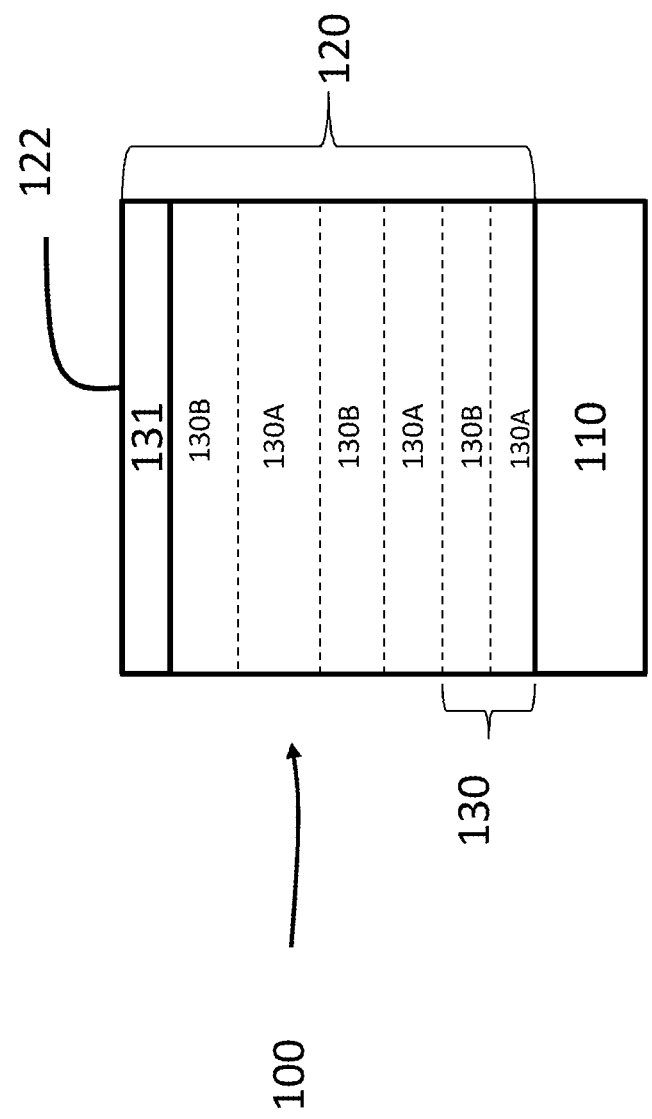
FIG. 2 is a side view of an article, according to one or more specific embodiments.

The anti-reflective coating 120 may have at least one layer having a hardness (as measured on the surface of such layer, e.g., surface of the second high RI layer 130B of FIG. 2) of about 12 GPa or greater, about 13 GPa or greater, about 14 GPa or greater, about 15 GPa or greater, about 16 GPa or greater, about 17 GPa or greater, about 18 GPa or greater, about 19 GPa or greater, about 20 GPa or greater, about 22 GPa or greater, about 23 GPa or greater, about 24 GPa or greater, about 25 GPa or greater, about 26 GPa or greater, or about 27 GPa or greater (up to about 50 GPa), as measured by the Berkovich Indenter Hardness Test. The hardness of such layer may be in the range from about 18 GPa to about 21 GPa, as measured by the Berkovich Indenter Hardness Test. Such measured hardness values may be exhibited by the at least one layer along an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article exhibits a hardness that is greater than the hardness of the substrate (which can be measured on the opposite surface from the anti-reflective surface).

In one or more embodiments, the anti-reflective coating 120 or individual layers within the anti-reflective coating may exhibit an elastic modulus of about 75 GPa or greater, about 80 GPa or greater or about 85 GPa or greater, as measured on the anti-reflective surface 122, by indenting that surface with a Berkovitch indenter. These modulus values may represent a modulus measured very close to the anti-reflective surface 122, e.g. at indentation depths of 0-50 nm, or it may represent a modulus measured at deeper indentation depths, e.g. from about 50-1000 nm.

Optical interference between reflected waves from the anti-reflective coating 120/air interface and the anti-reflective coating 120/substrate 110 interface can lead to spectral reflectance and/or transmittance oscillations that create apparent color in the article 100. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. In one or more embodiments, the spectral resolution of the characterization of the transmittance and reflectance is less than 5 nm or 0.02 eV. The color may be more pronounced in reflection. The angular color shifts in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features such as fluorescent lighting and some LED lighting. Angular color shifts in transmission may also play a factor in angular color shift in reflection and vice versa. Factors in angular color shifts in transmission and/or reflection may also include angular color shifts due to viewing angle or color shifts away from a certain white point that may be caused by material absorption (somewhat independent of angle) defined by a particular illuminant or test system.

The oscillations may be described in terms of amplitude. As used herein, the term "amplitude" includes the peak-to-valley change in reflectance or transmittance. The phrase "average amplitude" includes the peak-to-valley change in reflectance or transmittance averaged within the optical wavelength regime. As used herein, the "optical wavelength regime" includes the wavelength range from about 400 nm to about 800 nm (and more specifically from about 450 nm to about 650 nm).

The embodiments of this disclosure include an anti-reflective coating to provide improved optical performance, in terms of colorlessness and/or smaller angular color shifts with viewed at varying incident illumination angles from normal incidence under different illuminants.

One aspect of this disclosure pertains to an article that exhibits colorlessness in reflectance and/or transmittance even when viewed at different incident illumination angles under an illuminant. In one or more embodiments, the article exhibits an angular color shift in reflectance and/or transmittance of about 5 or less or about 2 or less between a reference illumination angle and any incidental illumination angles, in the ranges provided herein. As used herein, the phrase "color shift" (angular or reference point) refers to the change in both a* and b*, under the CIE L*, a*, b* colorimetry system in reflectance and/or transmittance. It should be understood that unless otherwise noted, the L* coordinate of the articles described herein are the same at any angle or reference point and do not influence color shift. For example, angular color shift may be determined using the following Equation (1):

$$\sqrt{((a^*_2-a^*_1)^2+(b^*_2-b^*_1)^2)} \quad (1)$$

with $a^*_1$, and $b^*_1$ representing the a* and b* coordinates of the article when viewed at a reference illumination angle (which may include normal incidence) and $a^*_2$, and $b^*_2$ representing the a* and b* coordinates of the article when viewed at an incident illumination angle, provided that the incident illumination angle is different from reference illumination angle and in some cases differs from the reference illumination angle by at least about 1 degree, 2 degrees or about 5 degrees. In some instances, an angular color shift in reflectance and/or transmittance of about 10 or less (e.g., 5 or less, 4 or less, 3 or less, or 2 or less) is exhibited by the article when viewed at various incident illumination angles from a reference illumination angle, under an illuminant. In some instances the angular color shift in reflectance and/or transmittance is about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the angular color shift may be about 0. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit an angular color shift in reflectance and/or transmittance of about 2 or less when viewed at incident illumination angle from the reference illumination angle under a CIE F2, F10, F11, F12 or D65 illuminant or more specifically under a CIE F2 illuminan.

The reference illumination angle may include normal incidence (i.e., 0 degrees), or 5 degrees from normal incidence, 10 degrees from normal incidence, 15 degrees from normal incidence, 20 degrees from normal incidence, 25 degrees from normal incidence, 30 degrees from normal incidence, 35 degrees from normal incidence, 40 degrees from normal incidence, 50 degrees from normal incidence, 55 degrees from normal incidence, or 60 degrees from normal incidence, provided the difference between the reference illumination angle and the difference between the incident illumination angle and the reference illumination angle is at least about 1 degree, 2 degrees or about 5 degrees. The incident illumination angle may be, with respect to the reference illumination angle, in the range from about 5 degrees to about 80 degrees, from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from normal incidence. The article may exhibit the angular color shifts in reflectance and/or transmittance described herein at and along all the incident illumination angles in the range from about 2 degrees to about 80 degrees, when the reference illumination angle is normal incidence. In some embodiments, the article may exhibit the angular color shifts in reflectance and/or transmittance described herein at and along all the incident illumination angles in the range from about 2 degrees to about 80 degrees, when the difference between the incident illumination angle and the reference illumination angle is at least about 1 degree, 2 degrees or about 5 degrees. In one example, the article may exhibit an angular color shift in reflectance and/or transmittance of 2 or less at any incident illumination angle in the range from about 2 degrees to about 60 degrees, from about 5 degrees to about 60 degrees, or from about 10 degrees to about 60 degrees away from a reference illumination angle equal to normal incidence. In other examples, the article may exhibit an angular color shift in reflectance and/or transmittance of 2 or less when the reference illumination angle is 10 degrees and the incident illumination angle is any angle in the range from about 12 degrees to about 60 degrees, from about 15 degrees to about 60 degrees, or from about 20 degrees to about 60 degrees away from the reference illumination angle.

In some embodiments, the angular color shift may be measured at all angles between a reference illumination angle (e.g., normal incidence) and an incident illumination angle in the range from about 20 degrees to about 80 degrees. In other words, the angular color shift may be measured and may be less than about 5 or less than about 2, at all angles in the range from about 0 degrees and 20 degrees, from about 0 degrees to about 30 degrees, from about 0 degrees to about 40 degrees, from about 0 degrees to about 50 degrees, from about 0 degrees to about 60 degrees or from about 0 degrees to about 80 degrees.

In one or more embodiments, the article exhibits a color in the CIE L*, a*, b* colorimetry system in reflectance and/or transmittance such that the distance or reference point color shift between the transmittance color or reflectance coordinates from a reference point is less than about 5 or less than about 2 under an illuminant (which can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting)). In specific examples, the articles exhibit a color shift in reflectance and/or transmittance of about 2 or less when viewed at incident illumination angle from the reference illumination angle under a CIE F2, F10, F11, F12 or D65 illuminant or more specifically under a CIE F2 illuminant. Stated another way, the article may exhibit a transmittance color (or transmittance color coordinates) and/or a reflectance color (or reflectance color coordinates) measured at the anti-reflective surface 122 having a reference point color shift of less than about 2 from a reference point, as defined herein. Unless otherwise noted, the transmittance color or transmittance color coordinates are measured on two surfaces of the article including at the anti-reflective surface 122 and the opposite bare surface of the article (i.e., 114). Unless otherwise noted, the reflectance color or reflectance color coordinates are measured on only the anti-reflective surface 122 of the article.

In one or more embodiments, the reference point may be the origin (0, 0) in the CIE L*, a*, b* colorimetry system (or the color coordinates a*=0, b*=0), color coordinates (−2, −2) or the transmittance or reflectance color coordinates of the substrate. It should be understood that unless otherwise noted, the L* coordinate of the articles described herein are the same as the reference point and do not influence color shift. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate.

In one or more specific embodiments, the reference point color shift of the transmittance color and/or the reflectance color may be less than 1 or even less than 0.5. In one or more specific embodiments, the reference point color shift for the transmittance color and/or the reflectance color may be 1.8, 1.6, 1.4, 1.2, 0.8, 0.6, 0.4, 0.2, 0 and all ranges and sub-ranges therebetween. Where the reference point is the color coordinates a*=0, b*=0, the reference point color shift is calculated by Equation (2).

$$\text{reference point color shift} = \sqrt{((a^*_{article})^2 + (b^*_{article})^2)} \quad (2)$$

Where the reference point is the color coordinates a*=−2, b*=−2, the reference point color shift is calculated by Equation (3).

$$\text{reference point color shift} = \sqrt{(a^*_{article}+2)^2 + (b^*_{article}+2)^2} \quad (3)$$

Where the reference point is the color coordinates of the substrate, the reference point color shift is calculated by Equation (4).

$$\text{reference point color shift} = \sqrt{((a^*_{article}-a^*_{substrate})^2 + (b^*_{article}-b^*_{substrate})^2)} \quad (4)$$

In some embodiments, the article may exhibit a transmittance color (or transmittance color coordinates) and a reflectance color (or reflectance color coordinates) such that the reference point color shift is less than 2 when the reference point is any one of the color coordinates of the substrate, the color coordinates a*=0, b*=0 and the coordinates a*=−2, b*=−2.

In one or more embodiment, the article may exhibit a b* value in reflectance (as measured at the anti-reflective surface only) in the range from about −5 to about 1, from about −5 to about 0, from about −4 to about 1, or from about −4 to about 0, in the CIE L*, a*, b* colorimetry system at all incidence illumination angles in the range from about 0 to about 60 degrees (or from about 0 degrees to about 40 degrees or from about 0 degrees to about 30 degrees).

In one or more embodiment, the article may exhibit a b* value in transmittance (as measured at the anti-reflective surface and the opposite bare surface of the article) in the range from about −2 to about 2, from about −1 to about 2, from about −0.5 to about 2, from about 0 to about 2, from about 0 to about 1, from about −2 to about 0.5, from about −2 to about 1, from about −1 to about 1, or from about 0 to about 0.5, in the CIE L*, a*, b* colorimetry system at all incidence illumination angles in the range from about 0 to about 60 degrees (or from about 0 degrees to about 40 degrees or from about 0 degrees to about 30 degrees).

In some embodiments, the article exhibits an a* value in transmittance (at the anti-reflective surface and the opposite bare surface) in the range from about −1.5 to about 1.5 (e.g., −1.5 to −1.2, −1.5 to −1, −1.2 to 1.2, −1 to 1, −1 to 0.5, or −1 to 0) at incident illumination angles in the range from about 0 degrees to about 60 degrees under illuminants D65, A, and F2. In some embodiments, the article exhibits a b* value in transmittance (at the anti-reflective surface and the opposite bare surface) in the range from about −1.5 to about 1.5 (e.g., −1.5 to −1.2, −1.5 to −1, −1.2 to 1.2, −1 to 1, −1 to 0.5, or −1 to 0) at incident illumination angles in the range from about 0 degrees to about 60 degrees under illuminants D65, A, and F2.

In some embodiments, the article exhibits an a* value in reflectance (at only the anti-reflective surface) in the range from about −5 to about 2 (e.g., −4.5 to 1.5, −3 to 0, −2.5 to 0.25) at incident illumination angles in the range from about 0 degrees to about 60 degrees under illuminants D65, A, and F2. In some embodiments, the article exhibits a b* value in reflectance (at only the anti-reflective surface) in the range from about −7 to about −1.5 at incident illumination angles in the range from about 0 degrees to about 60 degrees under illuminants D65, A, and F2.

The article of one or more embodiments, or the anti-reflective surface 122 of one or more articles, may exhibit an average light transmittance of about 95% or greater (e.g., about 9.5% or greater, about 96% or greater, about 96.5% or greater, about 97% or greater, about 97.5% or greater, about 98% or greater, about 98.5% or greater or about 99% or greater) over the optical wavelength regime in the range from about 400 nm to about 800 nm. In some embodiments, the article, or the anti-reflective surface 122 of one or more articles, may exhibit an average light reflectance of about 2% or less (e.g., about 1.5% or less, about 1% or less, about 0.75% or less, about 0.5% or less, or about 0.25% or less) over the optical wavelength regime in the range from about 400 nm to about 800 nm. These light transmittance and light reflectance values may be observed over the entire optical wavelength regime or over selected ranges of the optical wavelength regime (e.g., a 100 nm wavelength range, 150 nm wavelength range, a 200 nm wavelength range, a 250 nm wavelength range, a 280 nm wavelength range, or a 300 nm wavelength range, within the optical wavelength regime). In some embodiments, these light reflectance and transmittance values may be a total reflectance or total transmittance (taking into account reflectance or transmittance on both the anti-reflective surface 122 and the opposite major surfaces, 114). Unless otherwise specified, the average reflectance or transmittance is measured at an incident illumination angle of 0 degrees (however, such measurements may be provided at incident illumination angles of 45 degrees or 60 degrees).

In some embodiments, the article of one or more embodiments, or the anti-reflective surface 122 of one or more articles, may exhibit an average visible photopic reflectance of about 1% or less, about 0.7% or less, about 0.5% or less, or about 0.45% or less over the optical wavelength regime. These photopic reflectance values may be exhibited at incident illumination angles in the range from about 0° to about 20°, from about 0° to about 40° or from about 0° to about 60°. As used herein, photopic reflectance mimics the response of the human eye by weighting the reflectance versus wavelength spectrum according to the human eye's sensitivity. Photopic reflectance may also be defined as the luminance, or tristimulus Y value of reflected light, according to known conventions such as CIE color space conventions. The average photopic reflectance is defined in Equation (5) as the spectral reflectance, $R(\lambda)$ multiplied by the illuminant spectrum, $I(\lambda)$ and the CIE's color matching function $\bar{y}(\lambda)$, related to the eye's spectral response:

$$\langle R_p \rangle = \int_{380\ nm}^{720\ nm} R(\lambda) \times I(\lambda) \times \bar{y}(\lambda) d(\lambda) \quad (5)$$

In a specific embodiment, the anti-reflective surface 122 of one or more articles (i.e. when measuring the anti-reflective surface 122 only through a single-sided measurement), may exhibit an average visible photopic reflectance of about 2% or less, 1.8% or less, 1.5% or less, 1.2% or less, 1% or less, 0.9% or less, 0.7% or less, about 0.5% or less, about 0.45% or less, about 0.4% or less, or about 0.35% or less. In some cases, the average visible photopic reflectance ranges are exhibited while simultaneously exhibiting a maximum reflectance color shift, over the entire incident illumination angle range from about 5 degrees to about 60 degrees (with the reference illumination angle being normal incidence) using D65 illumination, of less than about 5.0, less than about 4.0, less than about 3.0, less than about 2.0, less than about 1.5, or less than about 1.25. These maximum reflectance color shift values represent the lowest color point value measured at any angle from about 5 degrees to about 60 degrees from normal incidence, subtracted from the highest color point value measured at any angle in the same range. The values may represent a maximum change in a* value $(a^*_{highest} - a^*_{lowest})$, a maximum change in b* value $(b^*_{highest} - b^*_{lowest})$, a maximum change in both a* and b* values, or a maximum change in the quantity $\sqrt{(a_{highest} - a_{lowest})^2 + (b^*_{highest} - b^*_{lowest})^2}$.

In one or more embodiments, the article may exhibit a reflectance spectra, measured at the anti-reflective surface only, at or near normal incidence (e.g., from about 0 to about 10 degrees or from about 0 degrees to about 6 degrees) that can be characterized in terms of the following features: a maximum reflectance and a minimum reflectance over the wavelength range from about 400 nm to about 480 nm (the maximum reflectance over this range is referred to as R400-max and the minimum reflectance over this range is referred to as R400-min), a maximum reflectance and a minimum reflectance over the wavelength range from about 500 nm to about 600 nm (the maximum reflectance over this range is referred to as R500-max and the minimum reflectance over this range is referred to as R500-min, respectively), and a maximum reflectance and a minimum reflectance in the wavelength range from about 640 nm to about 710 nm (the maximum reflectance over the wavelength range from about 640 nm to about 710 nm is referred to as R640-max the minimum reflectance over the wavelength range from about 640 nm to about 710 nm is referred to as R640-min). In some embodiments, the reflectance spectra exhibit any one or more of: R400-max is greater than R500-max, R400-max is greater than R640-max, R400-min is less than R500-min; R600-min is less than R500-min. In some embodiments, the reflectance spectra exhibits any one or more of R400-max in the range from about 0.6% to about 1.5%, R400-min is in the range from about 0% to about 0.3%, R500-max is in the range of from about 0.5% to about 0.9%, R500-min is in the range from about 0.3% to about 0.7%, R640-max is in the range from about 0.5% to about 0.9% and R640-min is in the range from about 0 to 0.3%.

Substrate

The substrate 110 may include an inorganic material and may include an amorphous substrate, a crystalline substrate or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal substrates. The substrate may be characterized as alkali-including substrates (i.e., the substrate includes one or more alkalis). In one or more embodiments, the substrate exhibits a refractive index in the range from about 1.45 to about 1.55. In specific embodiments, the substrate 110 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light reflectance and transmittance values may be a total reflectance or total transmittance (taking into account reflectance or transmittance on both major surfaces of the substrate) or may be observed on a single side of the substrate (i.e., on the anti-reflective surface 122 only, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312, 739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, and depth of layer (DOL). Surface CS may be measured near the surface or within the strengthened glass at various depths. A maximum CS value may include the measured CS at the surface ($CS_s$) of the strengthened substrate. The CT, which is computed for the inner region adjacent the compressive stress layer within a glass substrate, can be calculated from the CS, the physical thickness t, and the DOL. CS and DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring CS and DOL are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass substrate. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and CT is given by the expression (1):

$$CT=(CS\cdot DOL)/(t-2DOL) \quad (1),$$

wherein t is the physical thickness (μm) of the glass article. In various sections of the disclosure, CT and CS are expressed herein in megaPascals (MPa), physical thickness t is expressed in either micrometers (μm) or millimeters (mm) and DOL is expressed in micrometers (μm).

In one embodiment, a strengthened substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOL greater than 15 μm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SiO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SiO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O)$ 18 mol. % and 2 mol. % $\leq (MgO+CaO) \leq 7$ mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)/\Sigma$ modifiers (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma$ modifiers (i.e., sum of modifiers) is greater than 1.

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass ceramic substrate, which may be strengthened or non-strengthened. Examples of suitable glass ceramics may include $Li_2O$—$Al_2O_3$—$SiO_2$ system (i.e. LAS-System) glass ceramics, $MgO$—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 μm to about 5 mm. Example substrate 110 physical thicknesses range from about 100 μm to about 500 μm (e.g., 100, 200, 300, 400 or 500 μm). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm) In one or more specific embodiments, the substrate 110 may have a physical thickness of 2 mm or less or less than 1 mm. The substrate 110 may be acid polished or otherwise treated to remove or reduce the effect of surface flaws.

Anti-Reflective Coating

As shown in FIG. 1, the anti-reflective coating 120 may include a plurality of layers 120A, 120B, 120C. In some embodiments, one or more layers may be disposed on the opposite side of the substrate 110 from the anti-reflective coating 120 (i.e., on major surface 114)(not shown).

The physical thickness of the anti-reflective coating 120 may be in the range from about 0.1 μm to about 1 μm. In some instances, the physical thickness of the anti-reflective coating 120 may be in the range from about 0.01 μm to about 0.9 μm, from about 0.01 μm to about 0.8 μm, from about 0.01 μm to about 0.7 μm, from about 0.01 μm to about 0.6 μm, from about 0.01 μm to about 0.5 μm, from about 0.01 μm to about 0.4 μm, from about 0.01 μm to about 0.3 μm, from about 0.01 μm to about 0.2 μm, from about 0.01 μm to about 0.1 μm, from about 0.02 μm to about 1 μm, from about 0.03 μm to about 1 μm, from about 0.04 μm to about 1 μm, from about 0.05 μm to about 1 μm, from about 0.06 μm to about 1 μm, from about 0.07 μm to about 1 μm, from about 0.08 μm to about 1 μm, from about 0.09 μm to about 1 μm, from about 0.2 μm to about 1 μm, from about 0.3 μm to about 1 μm, from about 0.4 μm to about 1 μm, from about 0.5 μm to about 1 μm, from about 0.6 μm to about 1 μm, from about 0.7 μm to about 1 μm, from about 0.8 μm to about 1 μm, or from about 0.9 μm to about 1 μm, and all ranges and sub-ranges therebetween.

In one or more embodiments, the anti-reflective coating 120 may include a period 130 comprising two or more layers. In one or more embodiments, the two or more layers may be characterized as having different refractive indices from each another. In one embodiment, the period 130 includes a first low RI layer 130A and a second high RI layer 130B. The difference in the refractive index of the first low RI layer and the second high RI layer may be about 0.01 or greater, 0.05 or greater, 0.1 or greater or even 0.2 or greater.

As shown in FIG. 2, the anti-reflective coating 120 may include a plurality of periods (130). A single period includes include a first low RI layer 130A and a second high RI layer 130B, such that when a plurality of periods are provided, the first low RI layer 130A (designated for illustration as "L") and the second high RI layer 130B (designated for illustration as "H") alternate in the following sequence of layers: L/H/L/H or H/L/H/L, such that the first low RI layer and the second high RI layer appear to alternate along the physical thickness of the anti-reflective coating 120. In the example in FIG. 2, the anti-reflective coating 120 includes three periods. In some embodiments, the anti-reflective coating 120 may include up to 25 periods. For example, the anti-reflective coating 120 may include from about 2 to about 20 periods, from about 2 to about 15 periods, from about 2 to about 10 periods, from about 2 to about 12 periods, from about 3 to about 8 periods, from about 3 to about 6 periods.

In the embodiment shown in FIG. 2, the anti-reflective coating 120 may include an additional capping layer 131, which may include a lower refractive index material than the second high RI layer 130B.

Figure 3:
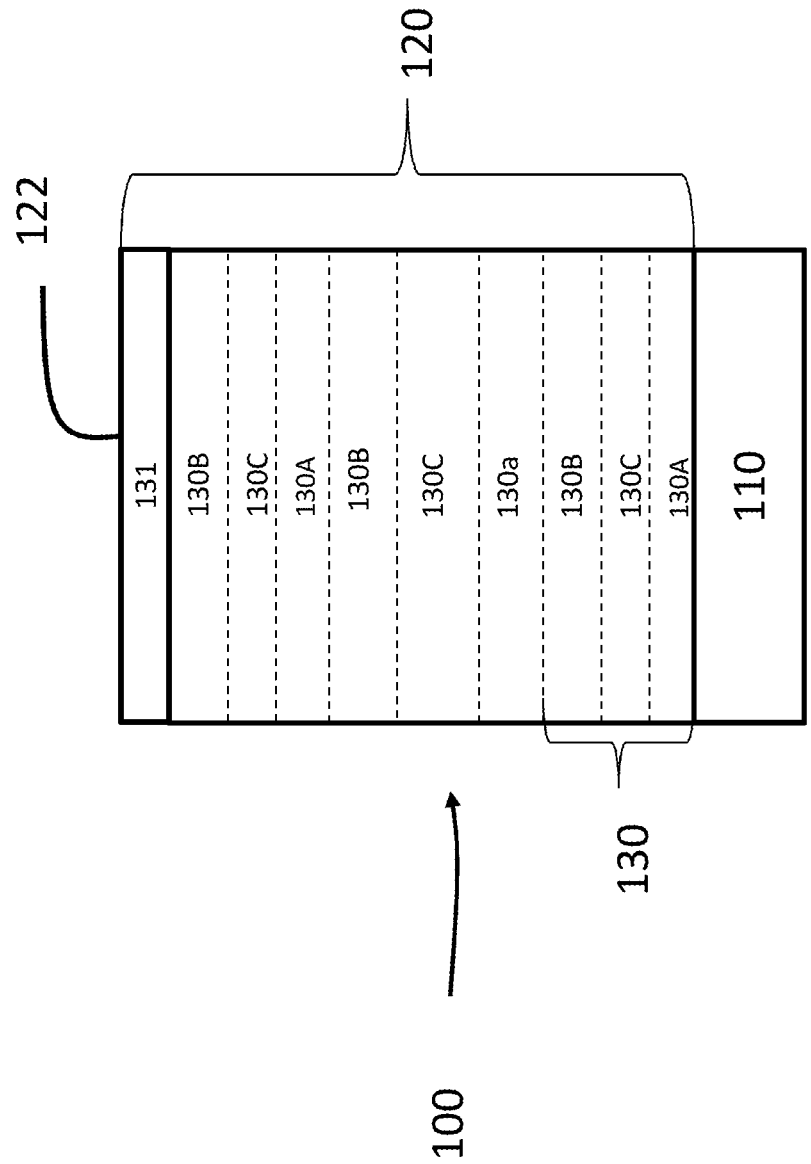
FIG. 3 is a side view of an article, according to one or more embodiments.

In some embodiments, the period 130 may include one or more third layers 130C, as shown in FIG. 3. The third layer(s) 130C may have a low RI, a high RI or a medium RI. In some embodiments, the third layer(s) 130C may have the same RI as the first low RI layer 130A or the second high RI layer 130B. In other embodiments, the third layer(s) 130C may have a medium RI that is between the RI of the first low RI layer 130A and the RI of the second high RI layer 130B. Alternatively, the third layer(s) 130C may have a refractive index greater than the $2^{nd}$ high RI layer 130B. The third layer may be provided in the anti-reflective coating 120 in the following exemplary configurations: $L_{third\ layer}$/H/L/H/L; $H_{third\ layer}$/L/H/L/H; L/H/L/H/$L_{third\ layer}$; H/L/H/L/$H_{third\ layer}$; $L_{third\ layer}$/H/L/H/L/$H_{third\ layer}$; $H_{third\ layer}$/L/H/L/H/$L_{third\ layer}$; $L_{third\ layer}$/L/H/L/H; $H_{third\ layer}$/H/L/H/L; H/L/H/L/$L_{third\ layer}$; L/H/L/H/$H_{third\ layer}$; $L_{third\ layer}$/L/H/L/H/$H_{third\ layer}$; $H_{third\ layer}$/H/L/H/L/$L_{third\ layer}$; L/$M_{third\ layer}$/H/L/M/H; H/M/L/H/M/L; M/L/H/L/M; and other combinations. In these configurations, "L" without any subscript refers to the first low RI layer and "H" without any subscript refers to the second high RI layer. Reference to "$L_{third\ sub-layer}$" refers to a third layer having a low RI, "$H_{third\ sub-layer}$" refers to a third layer having a high RI and "M" refers to a third layer having a medium RI, all relative to the $1^{st}$ layer and the $2^{nd}$ layer.

As used herein, the terms "low RI", "high RI" and "medium RI" refer to the relative values for the RI to another (e.g., low RI<medium RI<high RI). In one or more embodiments, the term "low RI" when used with the first low RI layer or with the third layer, includes a range from about 1.3 to about 1.7. In one or more embodiments, the term "high RI" when used with the second high RI layer or with the third layer, includes a range from about 1.6 to about 2.5. In some embodiments, the term "medium RI" when used with the third layer, includes a range from about 1.55 to about 1.8. In some instances, the ranges for low RI, high RI and medium RI may overlap; however, in most instances, the layers of the anti-reflective coating 120 have the general relationship regarding RI of: low RI<medium RI<high RI.

Figure 4:
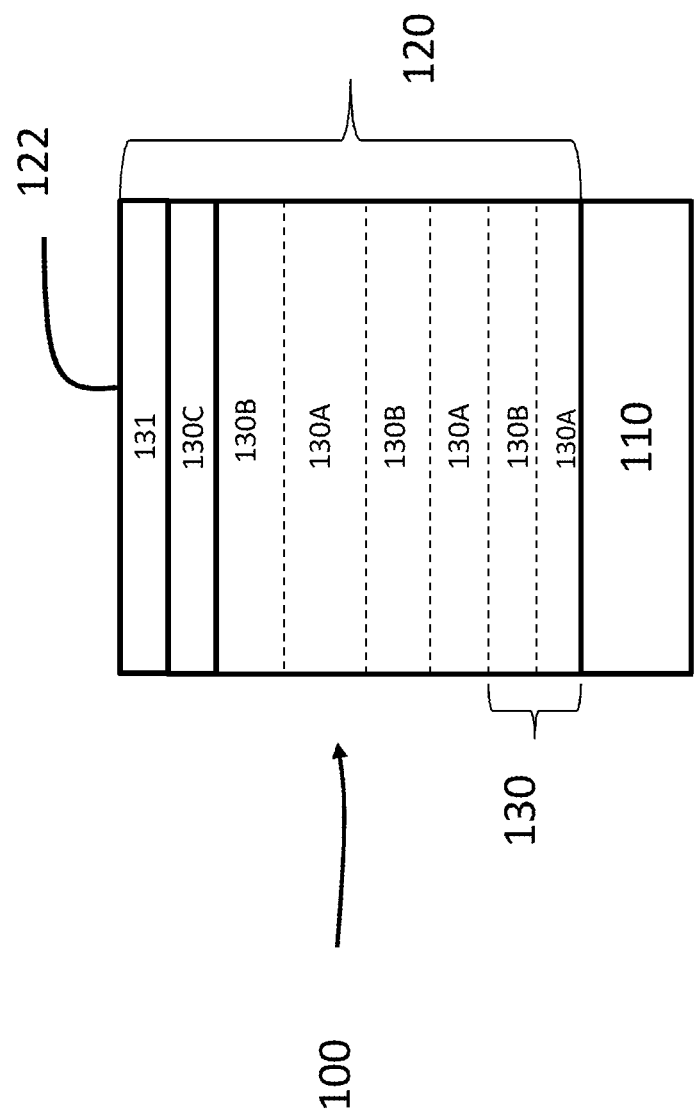
FIG. 4 is a side view of an article, according to one or more embodiments.
Figure 5:
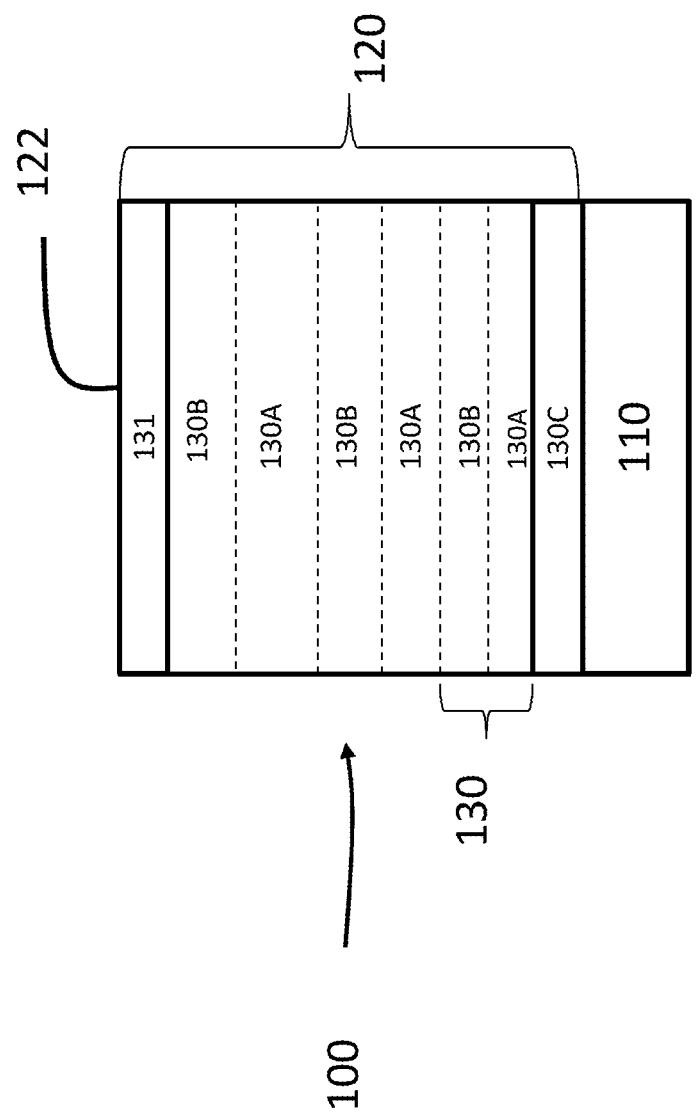
FIG. 5 is a side view of an article, according to one or more embodiments.

The third layer(s) 130C may be provided as a separate layer from a period 130 and may be disposed between the period or plurality of periods and an additional coating 140 instead of the capping 131 or in addition to the capping layer 131, as shown in FIG. 4. The third layer(s) may also be provided as a separate layer from a period 130 and may have disposed between the substrate 110 and the plurality of periods 130, as shown in FIG. 5.

Exemplary materials suitable for use in the anti-reflective coating 120 include: $SiO_2$, $Al_2O_3$, $GeO_2$, SiO, $AlOxNy$, AlN, SiNx, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in the first low RI layer include $SiO_2$, $Al_2O_3$, $GeO_2$, $SiO$, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in the first low RI layer may be minimized (e.g., in materials such as $Al_2O_3$ and $MgAl_2O_4$). Some examples of suitable materials for use in the second high RI layer include $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, $MoO_3$ and diamond-like carbon. The oxygen content of the materials for the second high RI layer may be minimized, especially in SiNx or AlNx materials. The foregoing materials may be hydrogenated up to about 30% by weight. Where a material having a medium refractive index is desired, some embodiments may utilize AlN and/or $SiO_xN_y$. The hardness of the second high RI layer may be characterized specifically. In some embodiments, the hardness, as measured by the Berkovitch Indenter Hardness Test may be about 8 GPa or greater, about 10 GPa or greater, about 12 GPa or greater, about 15 GPa or greater, about 18 GPa or greater, or about 20 GPa or greater. In some cases, the second high RI layer material may be deposited as a single layer (i.e. not as part of an anti-reflective coating), and this single layer may have a thickness between about 500 and 2000 nm for repeatable hardness determination.

In one or more embodiments at least one of the layer(s) of the anti-reflective coating 120 may include a specific optical thickness range. As used herein, the term "optical thickness" is determined by (n*d), where "n" refers to the RI of the sub-layer and "d" refers to the physical thickness of the layer. In one or more embodiments, at least one of the layers of the anti-reflective coating 120 may include an optical thickness in the range from about 2 nm to about 200 nm, from about 10 nm to about 100 nm, or from about 15 nm to about 100 nm. In some embodiments, all of the layers in the anti-reflective coating 120 may each have an optical thickness in the range from about 2 nm to about 200 nm, from about 10 nm to about 100 nm or from about 15 nm to about 100 nm. In some cases, at least one layer of the anti-reflective coating 120 has an optical thickness of about 50 nm or greater. In some cases, each of the first low RI layers have an optical thickness in the range from about 2 nm to about 200 nm, from about 10 nm to about 100 nm, or from about 15 nm to about 100 nm. In other cases, each of the second high RI layers have an optical thickness in the range from about 2 nm to about 200 nm, from about 10 nm to about 100 nm, or from about 15 nm to about 100 nm. In yet other cases, each of the third layers have an optical thickness in the range from about 2 nm to about 200 nm, from about 10 nm to about 100 nm, or from about 15 nm to about 100 nm.

In some embodiments, the thickness of one or more of the layers of the anti-reflective coating 120 may be minimized. In one or more embodiments, the thickness of the thickness of the high RI layer(s) and/or the medium RI layer(s) are minimized such that they are less than about 500 nm. In one or more embodiments, the combined thickness of the high RI layer(s), the medium RI (layers) and/or the combination of the high RI and medium RI layers is less than about 500 nm.

In one or more embodiments, the anti-reflective coating 120 has a physical thickness of about 800 nm or less. The anti-reflective coating 120 may have a physical thickness in the range from about 10 nm to about 800 nm, from about 50 nm to about 800 nm, from about 100 nm to about 800 nm, from about 150 nm to about 800 nm, from about 200 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 50 to about 300, and all ranges and sub-ranges therebetween.

In one or more embodiments, the combined physical thickness of the second high RI layer(s) may be characterized. For example, in some embodiments, the combined thickness of the second high RI layer(s) may be about 100 nm or greater, about 150 nm or greater, about 200 nm or greater, about 500 nm or greater. The combined thickness is the calculated combination of the thicknesses of the individual high RI layer(s) in the anti-reflective coating 120, even when there are intervening low RI layer(s) or other layer(s). In some embodiments, the combined physical thickness of the second high RI layer(s), which may also comprise a high-hardness material (e.g., a nitride or an oxynitride), may be greater than 30% of the total physical thickness of the anti-reflective coating. For example, the combined physical thickness of the second high RI layer(s) may be about 40% or greater, about 50% or greater, about 60% or greater, about 70% or greater, about 75% or greater, or even about 80% or greater, of the total physical thickness of the anti-reflective coating.

In some embodiments, greater proportions of hard and high-index material within the anti-reflective coating can also simultaneously be made to also exhibit low reflectance, low color, and high abrasion resistance as further described elsewhere herein.

In some embodiments, the anti-reflective coating 120 exhibits an average light reflectance of about 2% or less, 1.5% or less, 0.75% or less, 0.5% or less, 0.25% or less, 0.1% or less, or even 0.05% or less over the optical wavelength regime, when measured at the anti-reflective surface 122 (e.g., when removing the reflections from an uncoated back surface (e.g., 114 in FIG. 1) of the article, such as through using index-matching oils on the back surface coupled to an absorber, or other known methods). In some instances, the anti-reflective coating 120 may exhibit such average light reflectance over other wavelength ranges such as from about 450 nm to about 650 nm, from about 420 nm to about 680 nm, from about 420 nm to about 700 nm, from about 420 nm to about 740 nm, from about 420 nm to about 850 nm, or from about 420 nm to about 950 nm. In some embodiments, the anti-reflective surface 122 exhibits an average light transmission of about 90% or greater, 92% or greater, 94% or greater, 96% or greater, or 98% or greater, over the optical wavelength regime. Unless otherwise specified, the average reflectance or transmittance is measured at an incident illumination angle of 0 degrees (however, such measurements may be provided at incident illumination angles of 45 degrees or 60 degrees).

Figure 6:
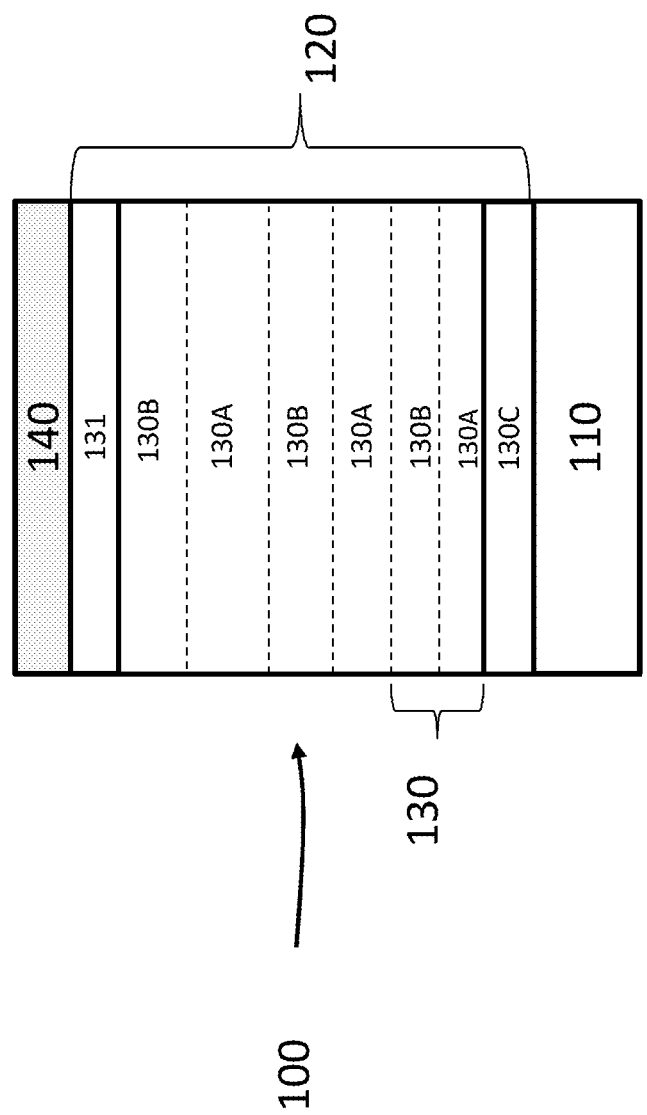
FIG. 6 is a side view of an article, according to one or more embodiments.

The article 100 may include one or more additional coatings 140 disposed on the anti-reflective coating, as shown in FIG. 6. In one or more embodiments, the additional coating may include an easy-to-clean coating. An example of a suitable an easy-to-clean coating is described in U.S. patent application Ser. No. 13/690,904, entitled "PROCESS FOR MAKING OF GLASS ARTICLES WITH OPTICAL AND EASY-TO-CLEAN COATINGS," filed on Nov. 30, 2012, which is incorporated herein in its entirety by reference. The easy-to-clean coating may have a thickness in the range from about 5 nm to about 50 nm and may include known materials such as fluorinated silanes. In some embodiments, the easy-to-clean coating may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

The additional coating 140 may include a scratch resistant coating. A scratch resistant coating may also be included in one of the layers of the anti-reflective coating 120. Exemplary materials used in the scratch resistant coating may include an inorganic carbide, nitride, oxide, diamond-like material, or combination of these. Examples of suitable materials for the scratch resistant coating include metal oxides, metal nitrides, metal oxynitride, metal carbides, metal oxycarbides, and/or combinations thereof combination thereof. Exemplary metals include B, Al, Si, Ti, V, Cr, Y, Zr, Nb, Mo, Sn, Hf, Ta and W. Specific examples of materials that may be utilized in the scratch resistant coating may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof.

In some embodiments, the additional coating 140 includes a combination of easy-to-clean material and scratch resistant material. In one example, the combination includes an easy-to-clean material and diamond-like carbon. Such additional coatings 140 may have a thickness in the range from about 5 nm to about 20 nm. The constituents of the additional coating 140 may be provided in separate layers. For example, the diamond-like carbon may be disposed as a first layer and the easy-to clean can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean may have a thickness of about 1 nm to about 10 nm (or more specifically about 6 nm). The diamond-like coating may include tetrahedral amorphous carbon (Ta—C), Ta—C:H, and/or a-C—H.

A second aspect of this disclosure pertains to a method for forming the articles described herein. In one embodiment, the method includes providing a substrate having a major surface in a coating chamber, forming a vacuum in the coating chamber, forming a durable anti-reflective coating having a thickness of about 1 μm or less on the major surface, optionally forming an additional coating comprising at least one of an easy-to-clean coating and a scratch resistant coating, on the anti-reflective coating, and removing the substrate from the coating chamber. In one or more embodiments, the anti-reflective coating and the additional coating are formed in either the same coating chamber or without breaking vacuum in separate coating chambers.

In one or more embodiments, the method may include loading the substrate on carriers which are then used to move the substrate in and out of different coating chambers, under load lock conditions so that a vacuum is preserved as the substrate is moved.

The anti-reflective coating 120 and/or the additional coating 140 may be formed using various deposition methods such as vacuum deposition techniques, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used such as spraying or slot coating. Where vacuum deposition is utilized, inline processes may be used to form the anti-reflective coating 120 and/or the additional coating 140 in one deposition run. In some instances, the vacuum deposition can be made by a linear PECVD source.

In some embodiments, the method may include controlling the thickness of the anti-reflective coating 120 and/or the additional coating 140 so that it does not vary by more than about 4% along at least about 80% of the area of the anti-reflective surface 122 or from the target thickness for each layer at any point along the substrate area. In some embodiments, the thickness of the anti-reflective layer coating 120 and/or the additional coating 140 so that it does not vary by more than about 4% along at least about 95% of the area of the anti-reflective surface 122.

EXAMPLES

Various embodiments will be further clarified by the following examples. In the Examples, it should be noted that AlOxNy and SiuAlvOxNy were found to be substantially interchangeable as the high-index material in the modeled examples, with only minor process adjustments necessary to re-create the targeted refractive index dispersion values and layer thickness designs provided, which are apparent to one of ordinary skill in the art.

Example 1

Figure 7:
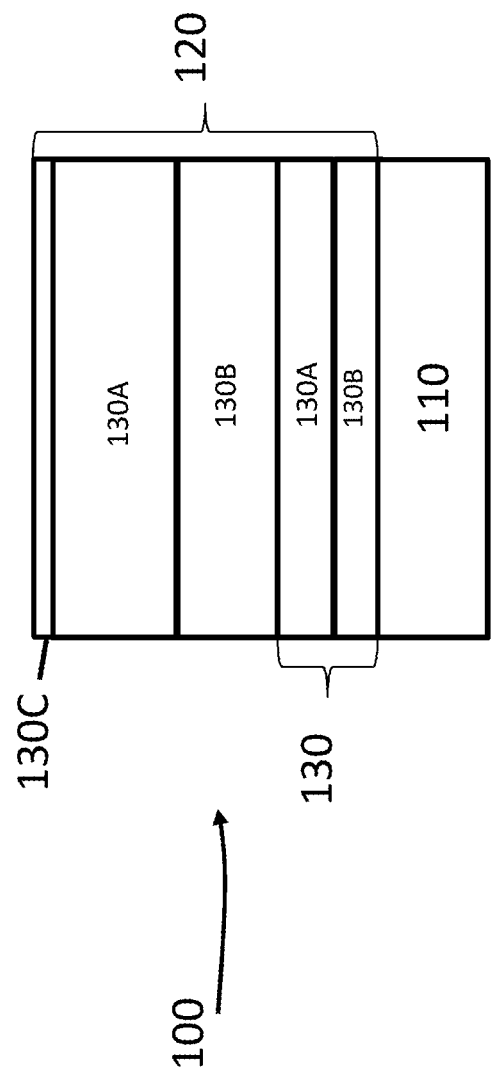
FIG. 7 is a side view of an article according Example 1.

Example 1 was formed by providing a glass substrate having a nominal composition of 69 mol % $SiO_2$, 10 mol % $Al_2O_3$, 15 mol % $Na_2O$, and 5 mol % MgO and disposing an anti-reflective coating having five layers on the glass substrate, as shown in Table 1 and in FIG. 7 using a plasma-enhanced chemical vapor deposition (PECVD) process.

TABLE 1

Anti-reflective coating attributes for Example 1.

| | Layer | Reference No. | Material | Thickness |
|---|---|---|---|---|
| | Ambient medium | — | Air | — |
| | Third layer | 131 | $SiN_x$ | 9.55 nm |
| 1st Period | 1st low RI layer | 130B | $SiO_2$ | 64.34 nm |
| | 2nd high RI layer | 130A | $SiN_x$ | 51.20 nm |
| 2nd Period | 1st low RI layer | 130B | $SiO_2$ | 28.89 nm |
| | 2nd high RI layer | 130A | $SiN_x$ | 24.10 nm |
| | Substrate | 110 | Glass | |

The refractive index of the second high RI layers was in the range from about 1.6 to about 2.1 depending on the amount of nitrogen present in those layers. The resulting article was transparent and exhibited abrasion resistance after 2000 cycles of linear abrasion test.

Figure 8:
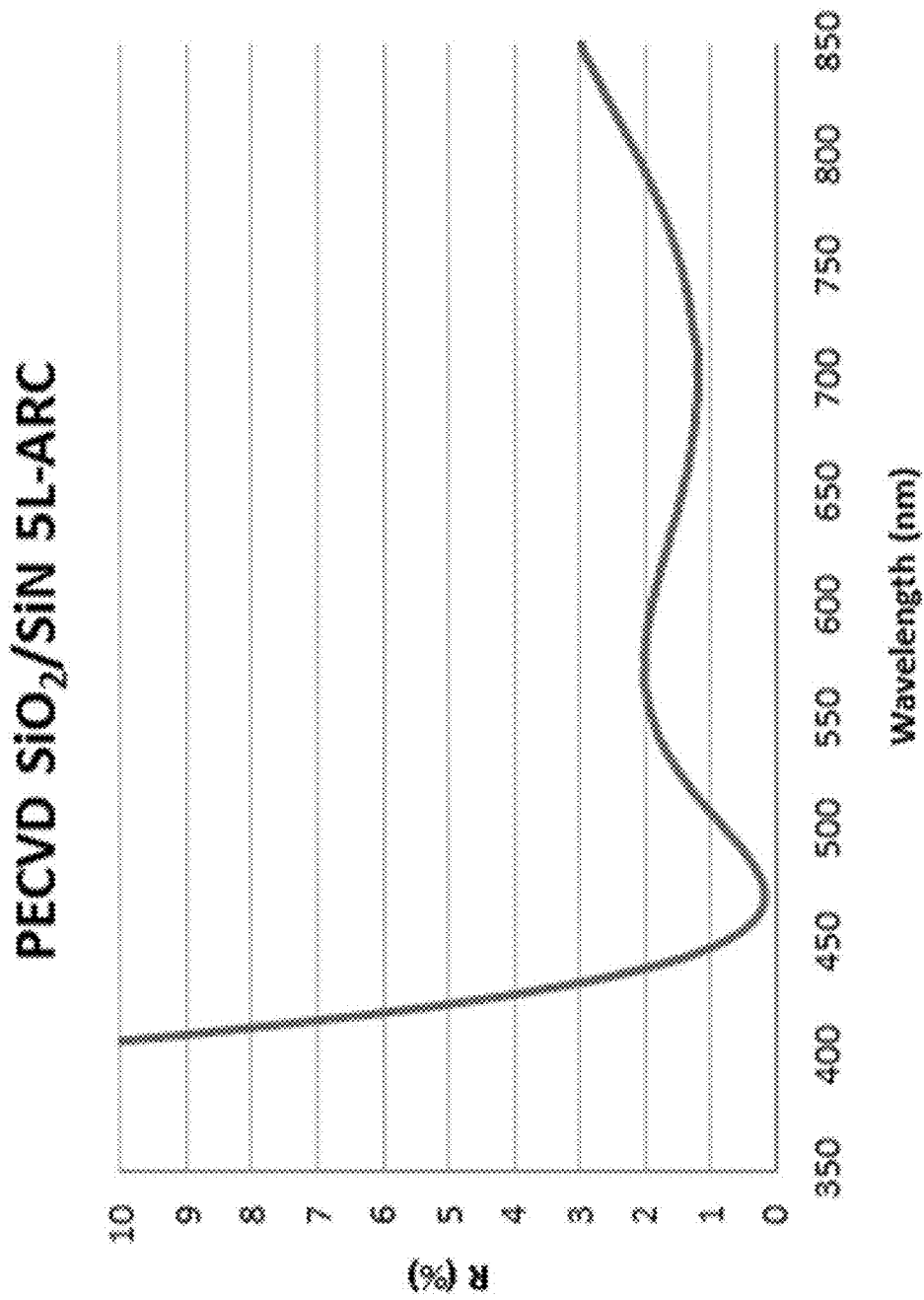
FIG. 8 is a graph showing the reflectance of the article according to Example 1.

FIG. 8 shows the reflectance spectrum for Example 1 over the optical wavelength regime. Example 1 exhibited a reflectance of less than about 0.5% along a portion of the optical wavelength regime and a reflectance of about 2% or less over the entire optical wavelength regime.

Modeled Example 2

Modeled Example 2 was prepared using the same glass substrate as used in Example 1, as shown in Table 2.

TABLE 2

Anti-reflective coating and easy-to-clean coating attributes for Modeled Example 2.

| Layer | | Material | Thickness | Refractive Index |
|---|---|---|---|---|
| Ambient medium | | Air | | 1 |
| Additional coating | | easy-to-clean | 10 nm | 1.407 |
| $1^{st}$ Period | $1^{st}$ low RI layer | $SiO_2$ | 84 nm | 1.463 |
| | $2^{nd}$ high RI layer | $SiN_x$ | 52 nm | 2.113 |
| $2^{nd}$ Period | $1^{st}$ low RI layer | $SiO_2$ | 15 nm | 1.463 |
| | $2^{nd}$ high RI layer | $SiN_x$ | 47 nm | 2.113 |
| $3^{rd}$ Period | $1^{st}$ low RI layer | $SiO_2$ | 41 nm | 1.463 |
| | $2^{nd}$ high RI layer | $SiN_x$ | 13 nm | 2.113 |
| Substrate | | Glass | | 1.523 |

Figure 9:
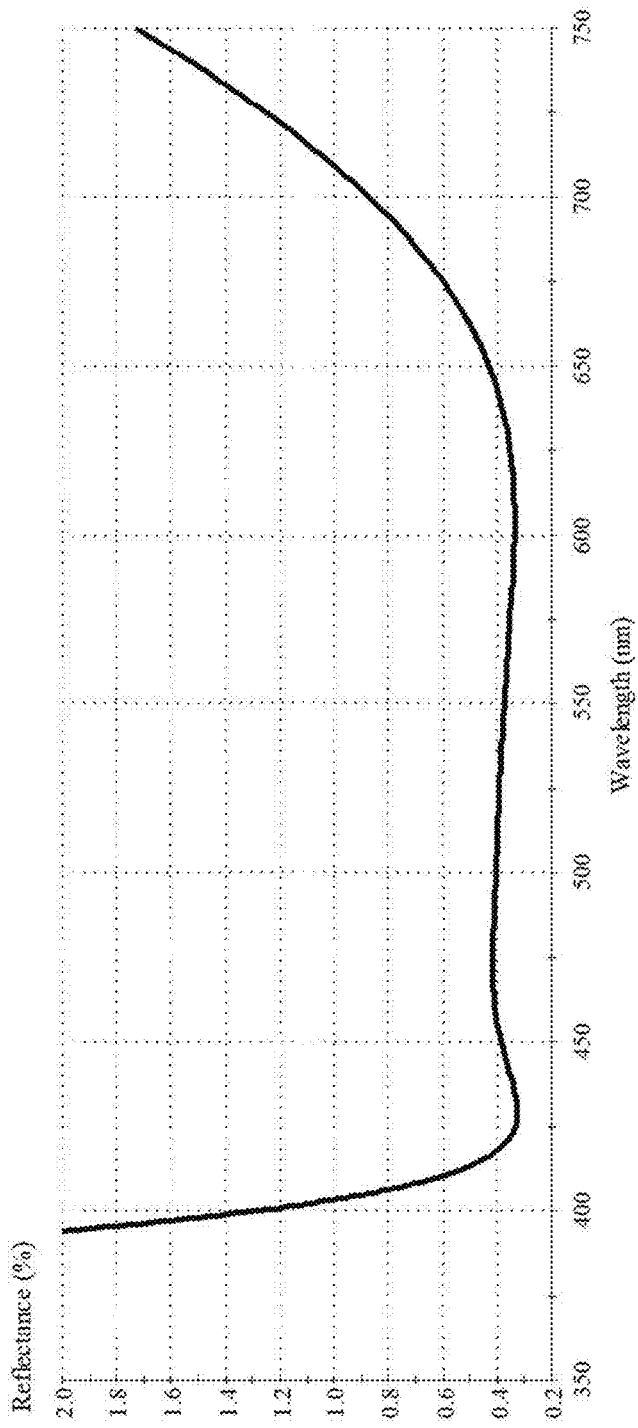
FIG. 9 is graph showing the modeled reflectance of the article according to Example 2.

The reflectance of Modeled Example 2 was simulated as shown in FIG. 9 (the thicknesses shown are not exact and intended to be illustrative). As shown in FIG. 9, the reflectance of Modeled Example 2 was less than about 0.5% over the wavelength ranges from about 420 nm to about 620 nm and was less than 1% over the entire optical wavelength regime.

It should be noted that Modeled Example 2 may be modified to include thicker or thinner additional coatings of easy-to-clean (e.g., from about 7 nm to about 15 nm), having a refractive index in the range from about 1.2 to about 1.5, depending on the materials selected and the formation process utilized.

Modeled Example 3

Modeled Example 3 was prepared using the same glass substrate as used in Example 1 and included an anti-reflective coating, a DLC coating having a thickness of 6 nm or 10 nm disposed on the anti-reflective coating, and an easy-to-clean coating on the DLC coating as shown in Table 3.

TABLE 3

Anti-reflective coating, easy-to-clean coating and DLC coating attributes for Modeled Example 3.

| Layer | | Material | Thickness | Refractive Index |
|---|---|---|---|---|
| Ambient medium | | Air | | 1 |
| Additional coating | | Easy-to-clean | | 1.407 |
| Additional coating | | DLC | 6 nm or 10 nm | 2.137 |
| $1^{st}$ Period | $1^{st}$ low RI layer | $SiO_2$ | | 1.463 |
| | $2^{nd}$ high RI layer | $TiO_2$ | | 2.457 |

TABLE 3-continued

Anti-reflective coating, easy-to-clean coating and DLC coating attributes for Modeled Example 3.

| Layer | | Material | Thickness | Refractive Index |
|---|---|---|---|---|
| $2^{nd}$ Period | $1^{st}$ low RI layer | $SiO_2$ | | 1.463 |
| | $2^{nd}$ high RI layer | $TiO_2$ | | 2.457 |
| $3^{rd}$ Period | $1^{st}$ low RI layer | $SiO_2$ | | 1.463 |
| | $2^{nd}$ high RI layer | $TiO_2$ | | 2.457 |
| Substrate | | Glass | | 1.523 |

Figure 10:
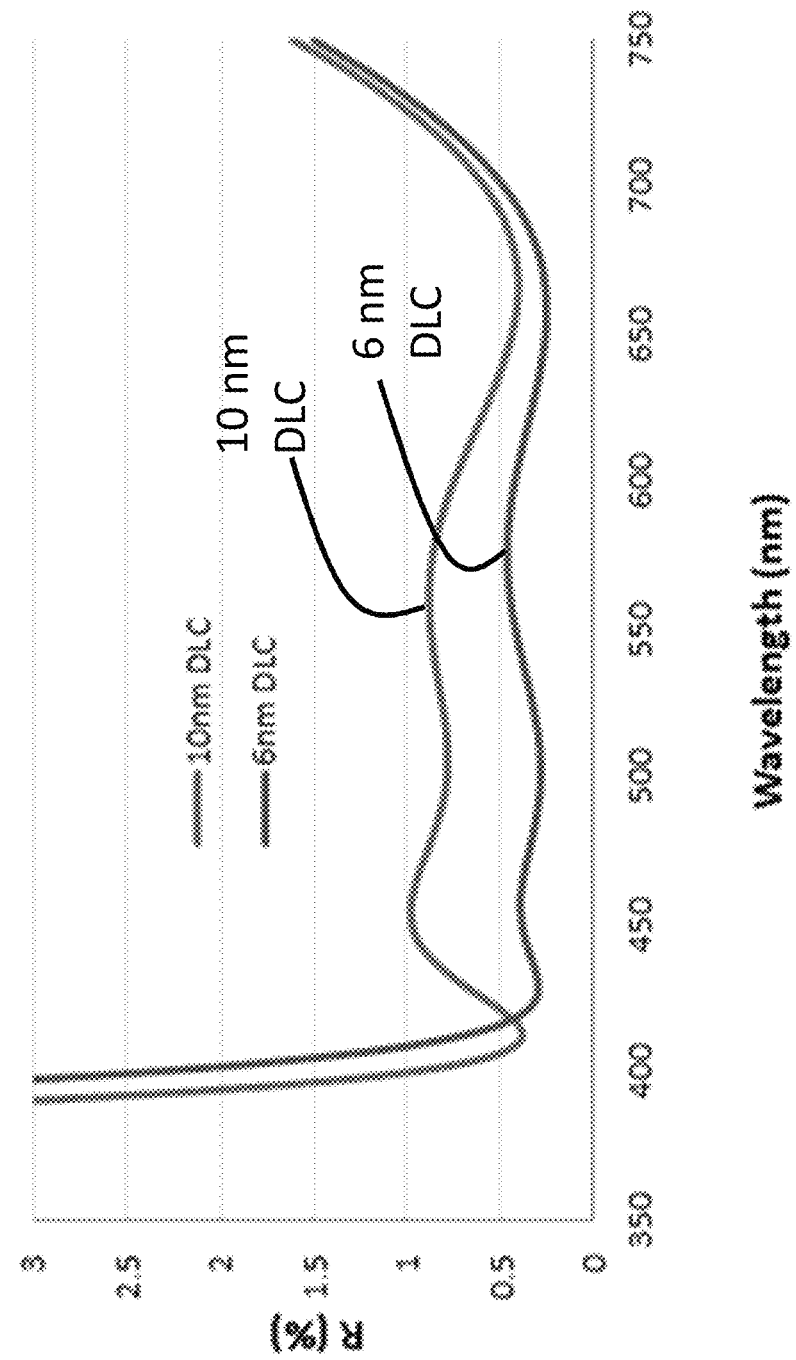
FIG. 10 is graph showing the modeled reflectance of the article according to Example 3.
Figure 11:
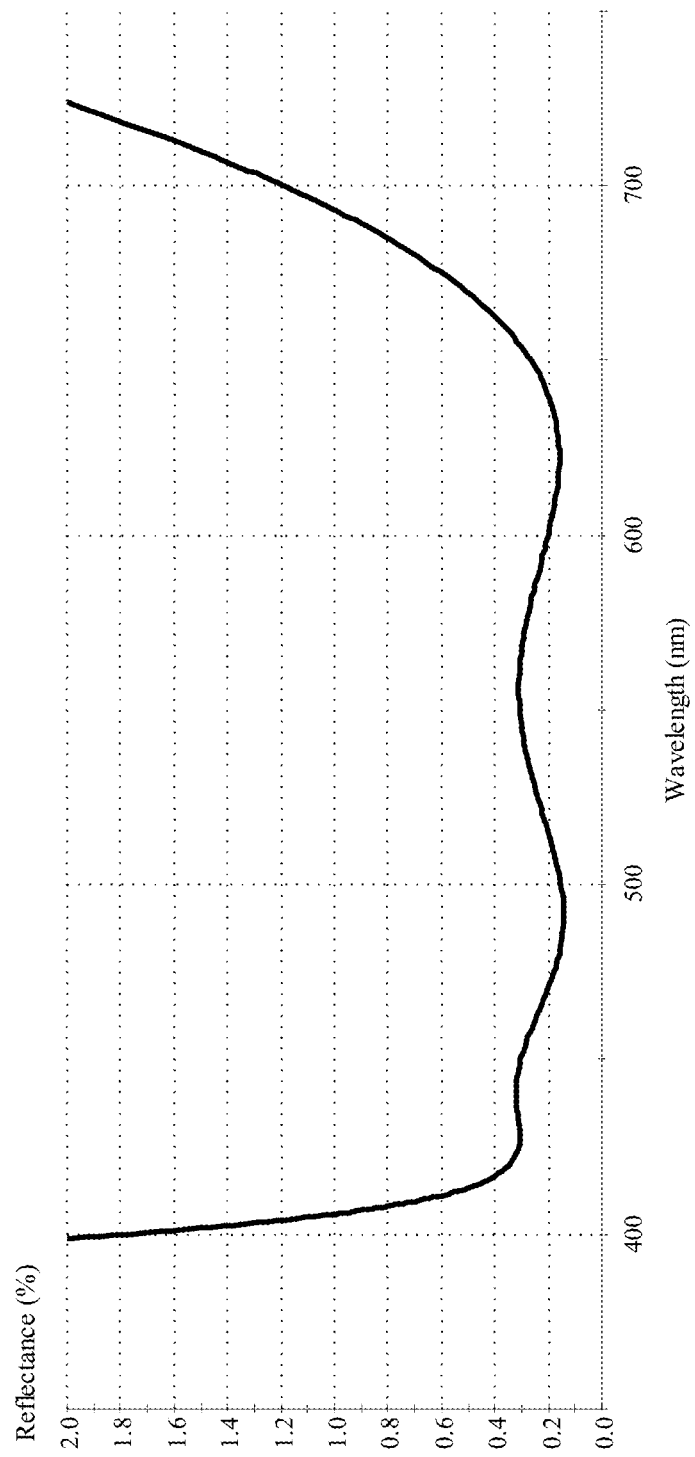
FIG. 11 is a graph showing the modeled reflectance of the article according to Example 3, with an additional DLC coating.

The reflectance of Modeled Example 3 was simulated for the different DLC coating thicknesses, and is shown together in FIG. 10. As shown in FIG. 10, the reflectance of Modeled Example 3 for both DLC coating thicknesses were both less than about 1% over the optical wavelength regime. In the embodiment where the DLC coating was about 6 nm, the reflectance was even lower (i.e., less than about 0.5%) over the entire optical wavelength regime. For clarity, the reflectance spectrum for Modeled Example 3 with the DLC coating having a thickness of 6 nm is shown in FIG. 11.

Modeled Examples 4-8

Examples 4-8 used modeling to understand the reflectance spectra of articles that included embodiments of a durable anti-reflective coating, as described herein. In Modeled Examples 4-8, $Si_nAl_yO_xN_y$ and $SiO_2$ layers, and a strengthened aluminosilicate glass substrate having a nominal composition of about 58 mol % $SiO_2$, 17 mol % $Al_2O_3$, 17 mol % $Na_2O$, 3 mol % MgO, 0.1 mol % SnO, and 6.5 mol % $P_2O_5$ were used.

To determine the refractive index dispersion curves for the coating materials, layers of each coating material were formed onto silicon wafers by DC, RF or RF superimposed DC reactive sputtering from a silicon, aluminum, silicon and aluminum combined or co-sputtered, or magnesium fluoride target (respectively) at a temperature of about 50° C. using ion assist. The wafer was heated to 200° C. during deposition of some layers and targets having a 3 inch diameter were used. Reactive gases used included nitrogen, fluorine and oxygen; argon was used as the inert gas. The RF power was supplied to the silicon target at 13.56 Mhz and DC power was supplied to the Si target, Al target and other targets.

The refractive indices (as a function of wavelength) of each of the formed layers and the glass substrate were measured using spectroscopic ellipsometry. The refractive indices thus measured were then used to calculate reflectance spectra for Modeled Examples 4-8. The modeled examples use a single refractive index value in their descriptive tables for convenience, which corresponds to a point selected from the dispersion curves at about 550 nm wavelength.

Figure 12:
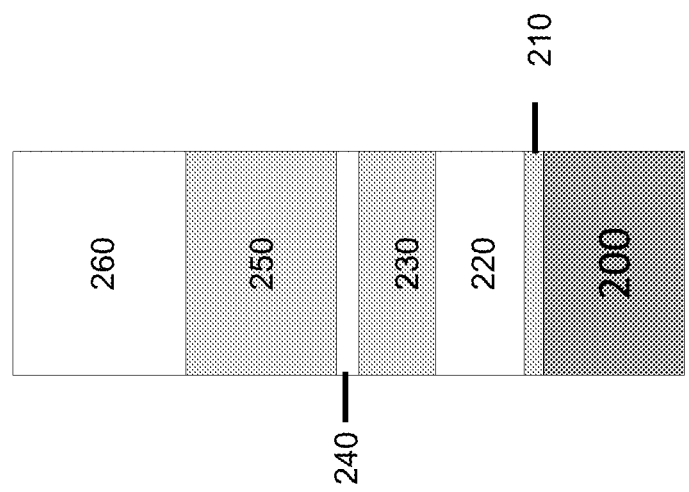
FIG. 12 is an illustration of an article according to Example 4.

Example 4 included a 6-layer anti-reflective coating, including layers 210, 220, 230, 240, 250 and 260 sequentially disposed on top of one another, disposed on a strengthened aluminosilicate glass substrate 200 as shown in FIG. 12 (the thicknesses shown are not exact and intended to be illustrative) and in Table 7.

TABLE 7

Attributes for Modeled Example 4.

| Layer | Periods | Material | Refractive Index | Modeled Physical Thickness |
|---|---|---|---|---|
| Ambient medium | — | Air | 1 | |
| Anti-reflective Coating | 1 | SiO$_2$-a (260) | 1.4826 | 90 nm |
| | | Si$_u$Al$_v$O$_x$N$_y$ (250) | 2.015 | 80 nm |
| | 2 | SiO$_2$-a (240) | 1.4826 | 12 nm |
| | | Si$_u$Al$_v$O$_x$N$_y$ (230) | 2.015 | 40 nm |
| | 3 | SiO$_2$-a (220) | 1.4826 | 46 nm |
| | | Si$_u$Al$_v$O$_x$N$_y$ (210) | 2.015 | 10 nm |
| Substrate | — | AS Glass | 1.51005 | |
| | — | | Total Coating Thickness | 278 nm |

The total thickness of the Si$_u$Al$_v$O$_x$N$_y$ layers, which have a higher hardness as measured by the Berkovitch Indenter Hardness Test, as compared to the SiO$_2$ layers, is 130 nm, which comprises about 47% of the entire thickness of the coating. Anti-reflective coatings having a structure similar to the anti-reflective coating of Modeled Example 4 were fabricated by DC/RF sputtering. These coatings were found to exhibit an abrasion resistance similar to or better than the bare glass substrate and substantially improved abrasion resistance over convention, oxide-only anti-reflective coatings, as illustrated by Example 15. The article according to Example 4 exhibited an abrasion similar to the abrasion of the bare glass substrate (without an anti-reflective coating disposed thereon).

Figure 13:
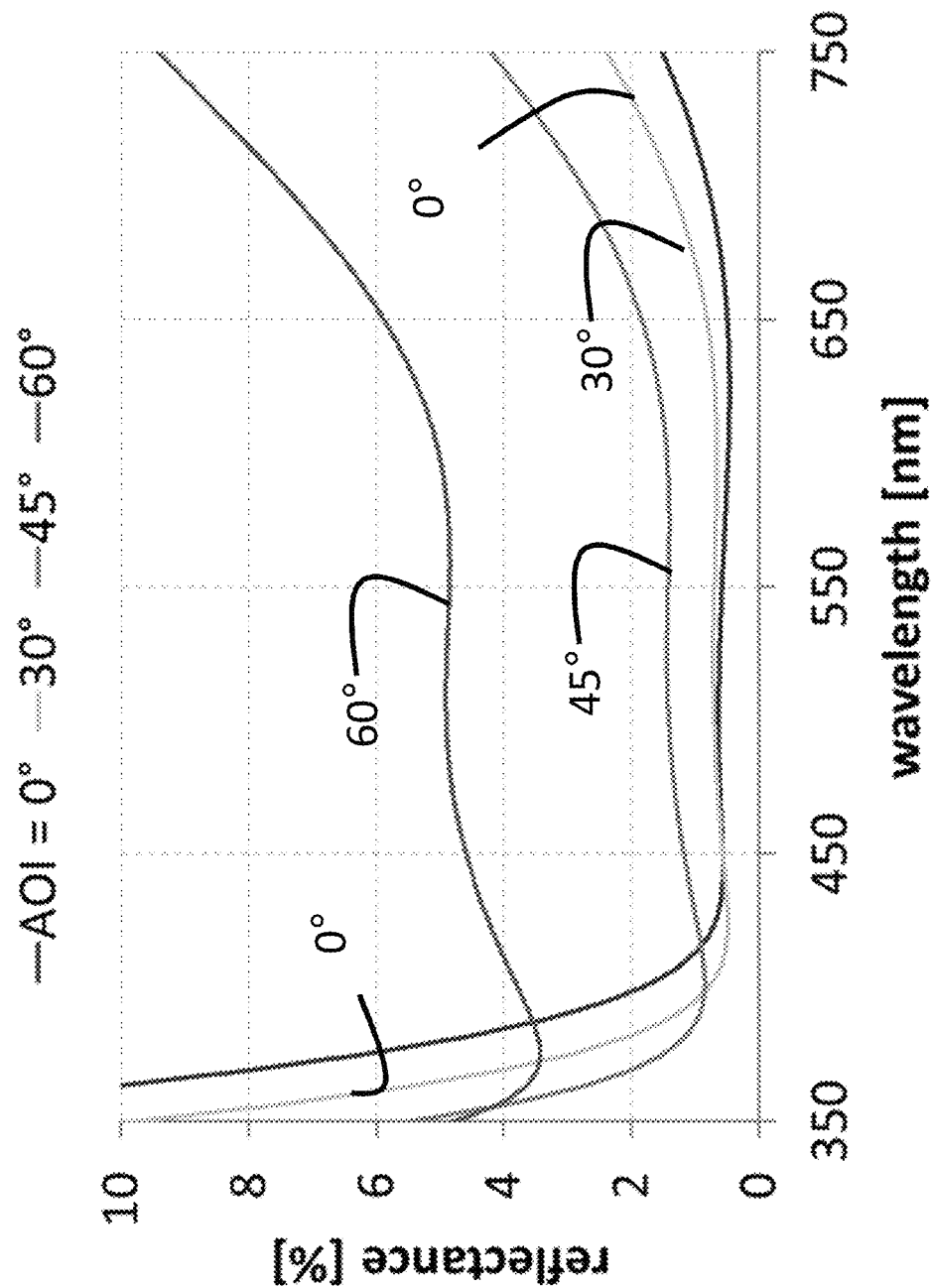
FIG. 13 is a single-sided reflectance spectra of the article of Example 4, showing the reflectance as the incident illumination angle changes from 0° to about 60°.
Figure 14:
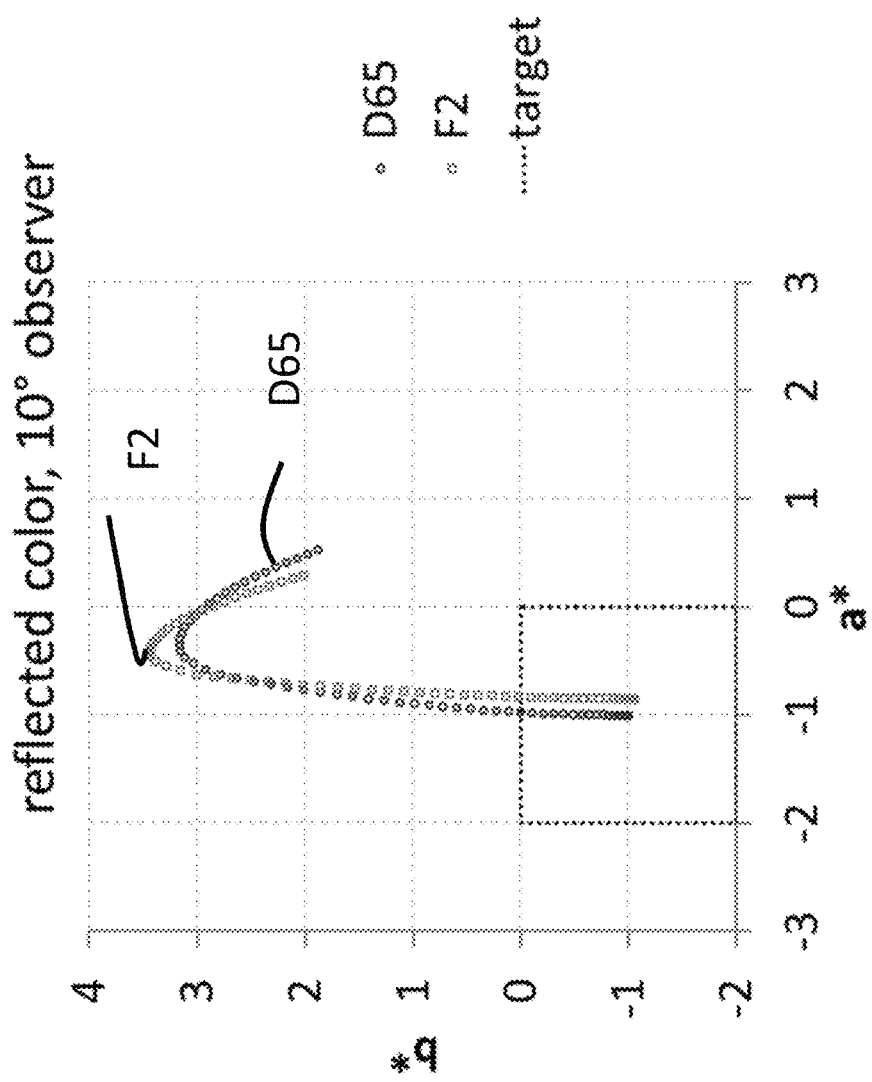
FIG. 14 is a reflected color spectra of the article of Example 4 showing the reflected color under different illuminants at different viewing angles, using a 10° observer.

The reflectance of a single side of the article of Example 4 was calculated at different viewing incident illumination angles or angle of illumination ("AOI") and the resulting reflectance spectra is shown in FIG. 13. The reflected color, based on a 10° observer under a D65 illuminant and a F2 illuminant was also measured and the a* and b* values are plotted as the incident illumination angle or AOI changed from 0 degrees to about 60 degrees from normal incidence at regular increments. The plot showing the reflected color is shown in FIG. 14.

Figure 15:
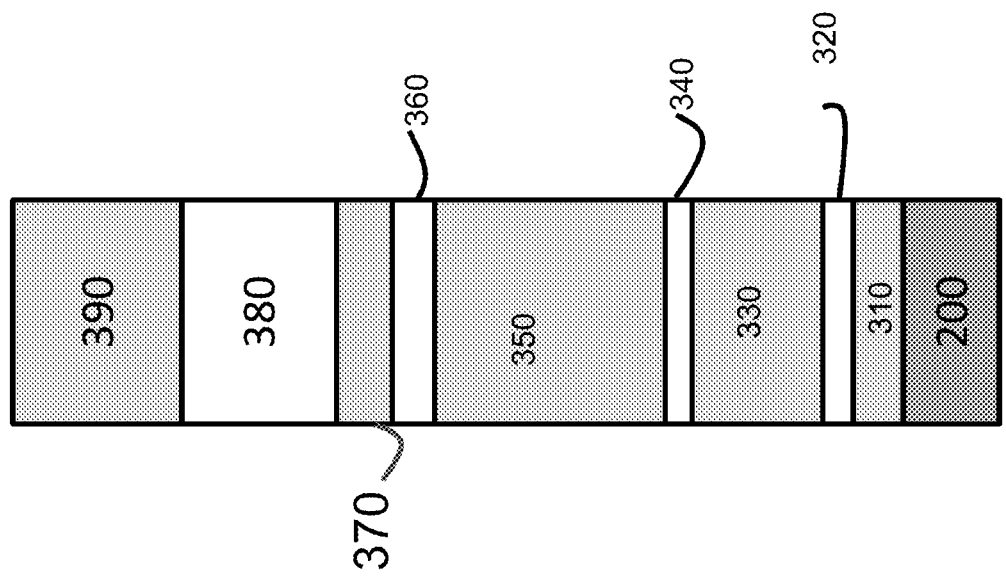
FIG. 15 is an illustration of an article according to Example 5.

Example 5 included a 9-layer anti-reflective coating, including layers 310 (third layer), 320, 330, 340, 350, 360, 370, 380, and 390 sequentially disposed on top of one another, disposed on a strengthened aluminosilicate glass substrate 200, as shown in FIG. 15 (the thicknesses shown in FIG. 15 are not exact and intended to be illustrative) and the relative thicknesses of the layers are shown in Table 8.

TABLE 8

Attributes for Modeled Example 5.

| Layer | Periods | Material | Refractive Index | Modeled Physical Thickness |
|---|---|---|---|---|
| Ambient medium | — | Air | 1 | |
| Anti-reflective coating | 1 | SiO$_2$-a (390) | 1.4826 | 88 nm |
| | | Si$_u$Al$_v$O$_x$N$_y$ (380) | 2.015 | 81 nm |
| | 2 | SiO$_2$-a (370) | 1.4826 | 29 nm |
| | | Si$_u$Al$_v$O$_x$N$_y$ (360) | 2.015 | 22 nm |
| | 3 | SiO$_2$-a (350) | 1.4826 | 120 nm |
| | | Si$_u$Al$_v$O$_x$N$_y$ (340) | 2.015 | 14 nm |
| | 4 | SiO$_2$-a (330) | 1.4826 | 68 nm |
| | | Si$_u$Al$_v$O$_x$N$_y$ (320) | 2.015 | 16 nm |
| | — | SiO$_2$-a (310) | 1.4826 | 26 nm |
| Substrate | — | AS Glass | 1.51005 | |
| | — | | Total Coating Thickness | 464 nm |

In Modeled Example 5, the total thickness of the Si$_u$Al$_v$O$_x$N$_y$ layers, which have a higher hardness as measured by the Berkovitch Indenter Hardness Test as compared to the SiO$_2$ layers, is 133 nm, which comprises about 29% of the entire thickness of the coating. The article according to Example 5 is believed to exhibit an abrasion similar to the abrasion of the bare glass substrate (without an anti-reflective coating disposed thereon).

Figure 16:
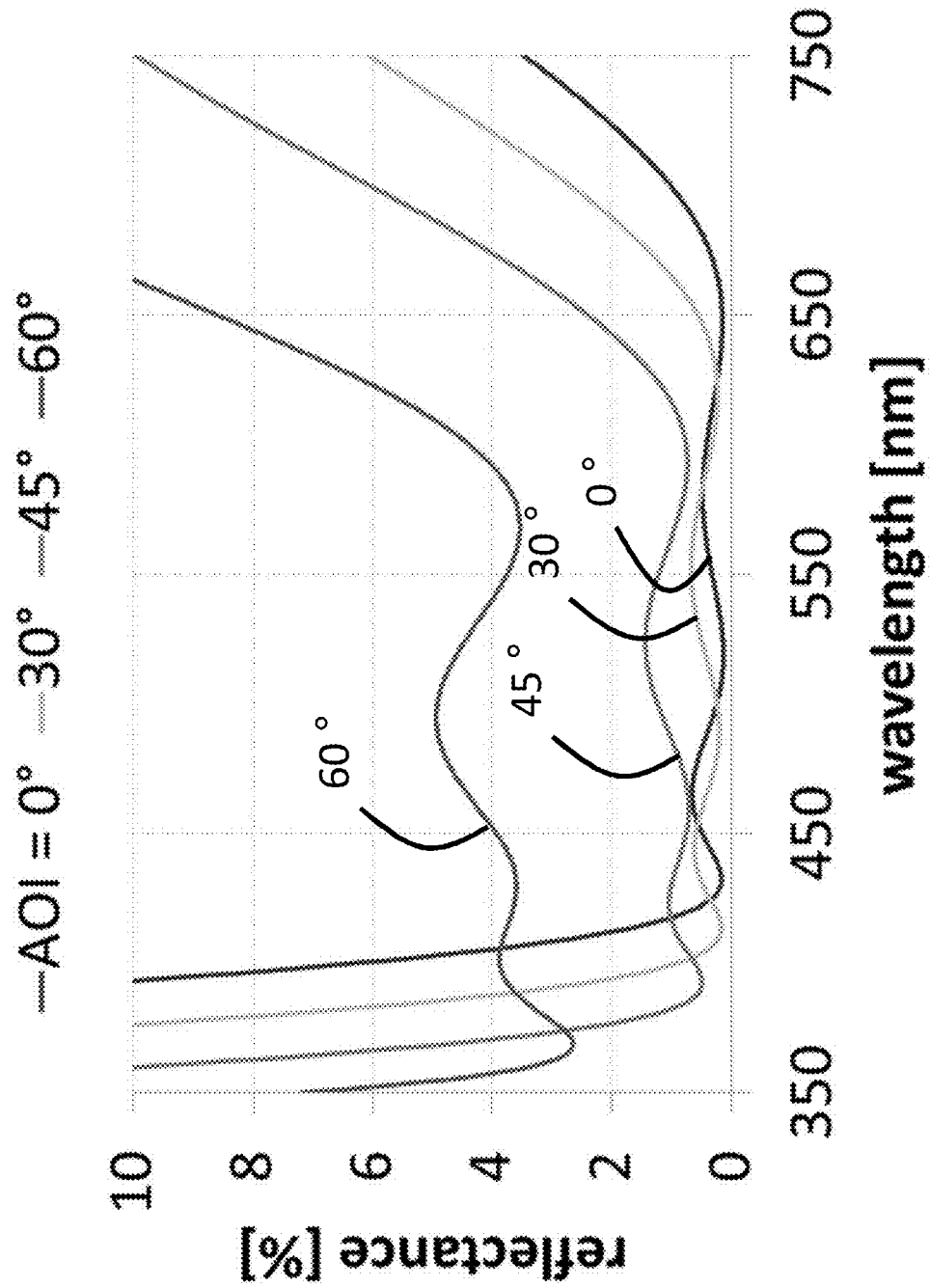
FIG. 16 is a single-sided reflectance spectra of the article of Example 5, showing the reflectance as the incident illumination angle changes from 0° to about 45°.
Figure 17:
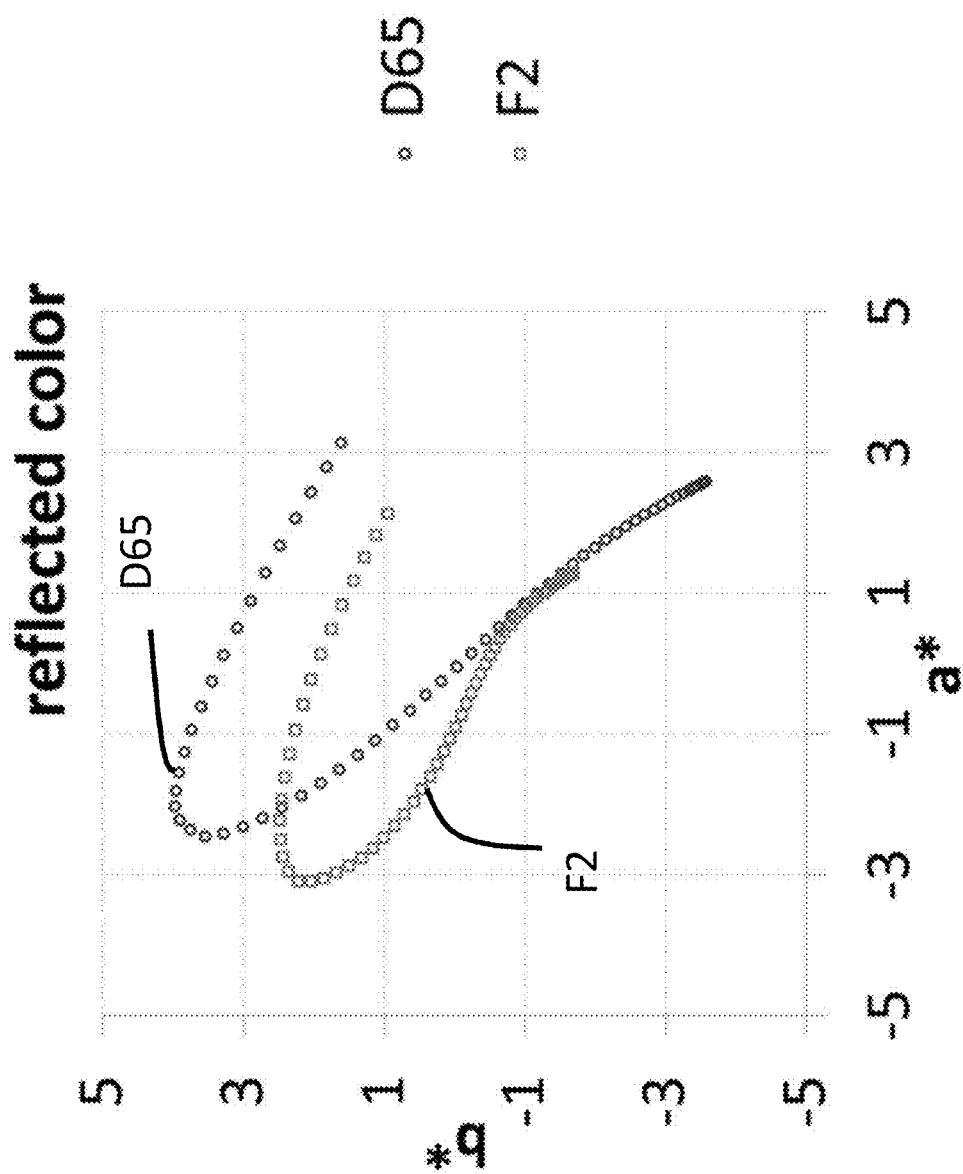
FIG. 17 is a reflected color spectra of the article of Example 5 showing the reflected color under a D65 illuminant at different viewing angles, using a 10° observer.

The reflectance of a single side of the article of Example 5 was calculated at different viewing incident illumination angles or angle of illumination ("AOI") and the resulting reflectance spectra is shown in FIG. 16. The reflected color, based on a 10° observer under a D65 illuminant was also measured and the a* and b* values are plotted as the incident illumination angle or AOI changed from 0 degrees to about 60 degrees from normal incidence at regular increments. The plot showing the reflected color is shown in FIG. 17.

Figure 18:
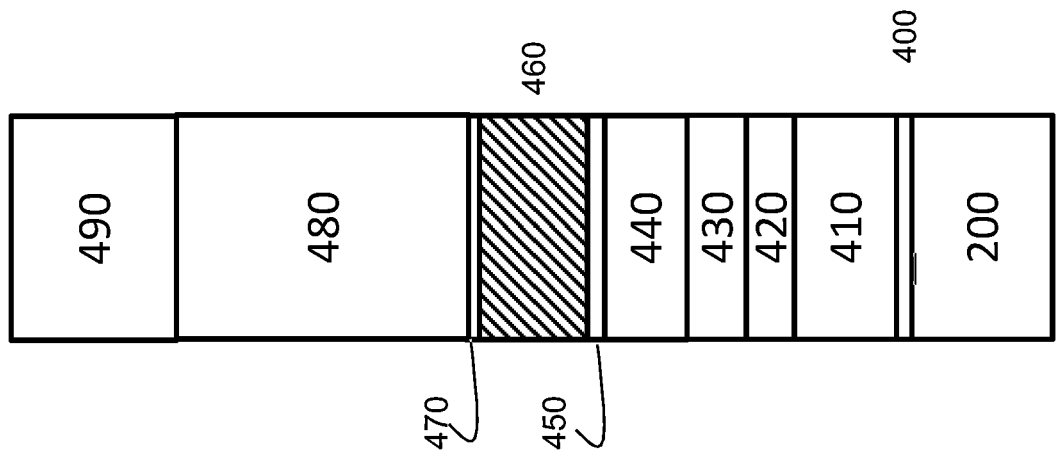
FIG. 18 is an illustration of an article according to Example 6.

Example 6 included a 10-layer anti-reflective coating, including layers 400, 410, 420, 430, 440, 450, 460, 470, 480, and 490 sequentially disposed on top of one another, disposed on a strengthened aluminosilicate glass substrate 200, as shown in FIG. 18 (the thicknesses shown in FIG. 18 are not exact and intended to be illustrative) and Table 9.

TABLE 9

Attributes for Modeled Example 16.

| Layer | Periods | Material | Refractive Index | Modeled Physical Thickness |
|---|---|---|---|---|
| Ambient medium | — | Air | 1 | |
| Anti-reflective coating | 1 | SiO$_2$-a (490) | 1.4826 | 86 nm |
| | | Si$_u$Al$_v$O$_x$N$_y$ (480) | 2.015 | 152 nm |
| | 2 | SiO$_2$-a (470) | 1.4826 | 7 nm |
| | | Si$_u$Al$_v$O$_x$N$_y$ (460) | 2.015 | 350 nm (but variable in the range from about 100 nm to about 2000 nm) |
| | 3 | SiO$_2$-a (450) | 1.4826 | 9 nm |
| | | Si$_u$Al$_v$O$_x$N$_y$ (440) | 2.015 | 43 nm |
| | 4 | SiO$_2$-a (430) | 1.4826 | 31 nm |
| | | Si$_u$Al$_v$O$_x$N$_y$ (420) | 2.015 | 25 nm |
| | 5 | SiO$_2$-a (410) | 1.4826 | 53 nm |
| | | Si$_u$Al$_v$O$_x$N$_y$ (400) | 2.015 | 8 nm |
| Substrate | — | AS Glass | 1.51005 | |
| | — | | Total Coating Thickness | 764 nm |

Layers 470, 480 and 490 are impedance matched to air and layers 400, 410, 420, 430, 440 and 450 are impedance matched to the glass substrate. Accordingly, layer 460 may be modified to have a thickness in the range from about 0 mm to about 500 nm or from about 100 nm to about 2000 nm, without influencing the optical properties of the anti-reflective coating or the article.

In Modeled Example 6, the total thickness of the Si$_u$Al$_v$O$_x$N$_y$ layers, which have a higher hardness as measured by the Berkovitch Indenter Hardness Test as compared to the SiO$_2$ layers, is 578 nm, which comprises about 76% of the entire thickness of the coating. Anti-reflective coatings having a structure very similar to Modeled Example 6 were fabricated by DC/RF sputtering, and exhibited an abrasion resistance substantially better than the bare glass substrate, and substantially better abrasion resistance than conventional oxide-only anti-reflective coatings.

Figure 19:
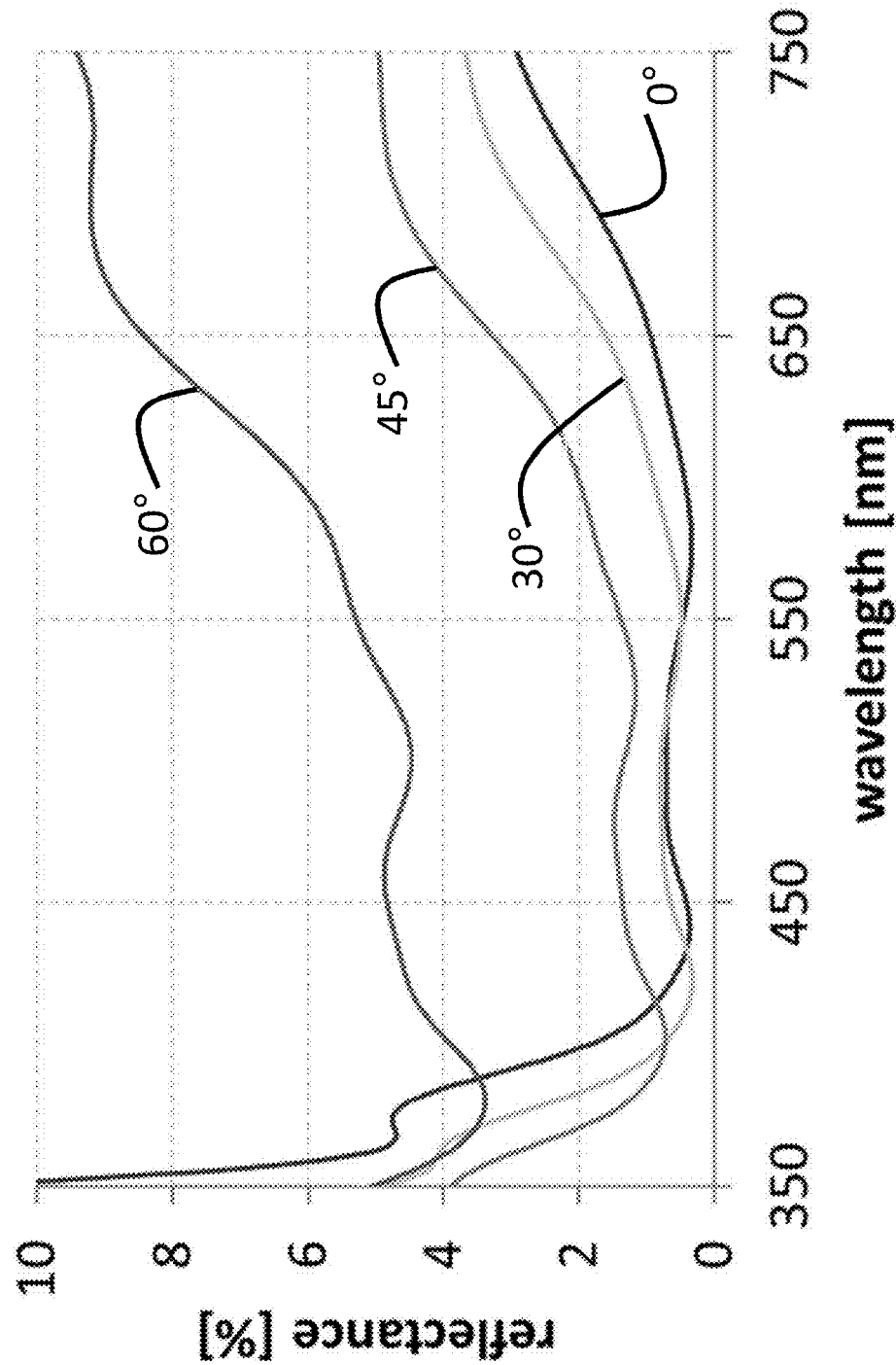
FIG. 19 is a single-sided reflectance spectra of the article of Example 6, showing the reflectance as the incident illumination angle changes from 0° to about 60°.
Figure 20:
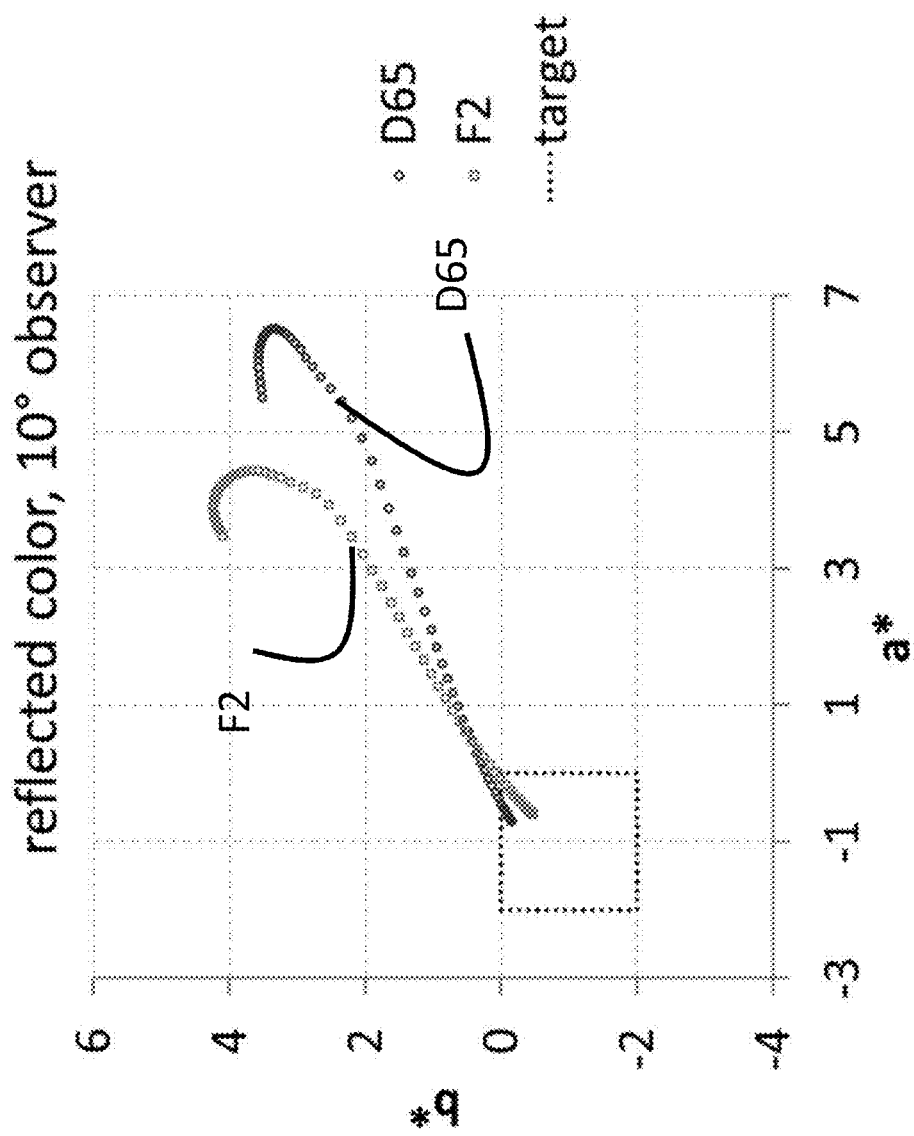
FIG. 20 is a reflected color spectra of the article of Example 6 showing the reflected color under different illuminants at different viewing angle, using a 10° observer.

The reflectance of a single side of the article of Example 6 was calculated at different viewing incident illumination angles or angle of illumination ("AOI") and the resulting reflectance spectra is shown in FIG. 19. The reflected color, based on a 10° observer under a D65 illuminant and a F2 illuminant was also measured and the a* and b* values are plotted as the incident illumination angle or AOI changed from 0 degrees to about 60 degrees from normal incidence at regular increments. The plot showing the reflected color is shown in FIG. 20.

Figure 21:
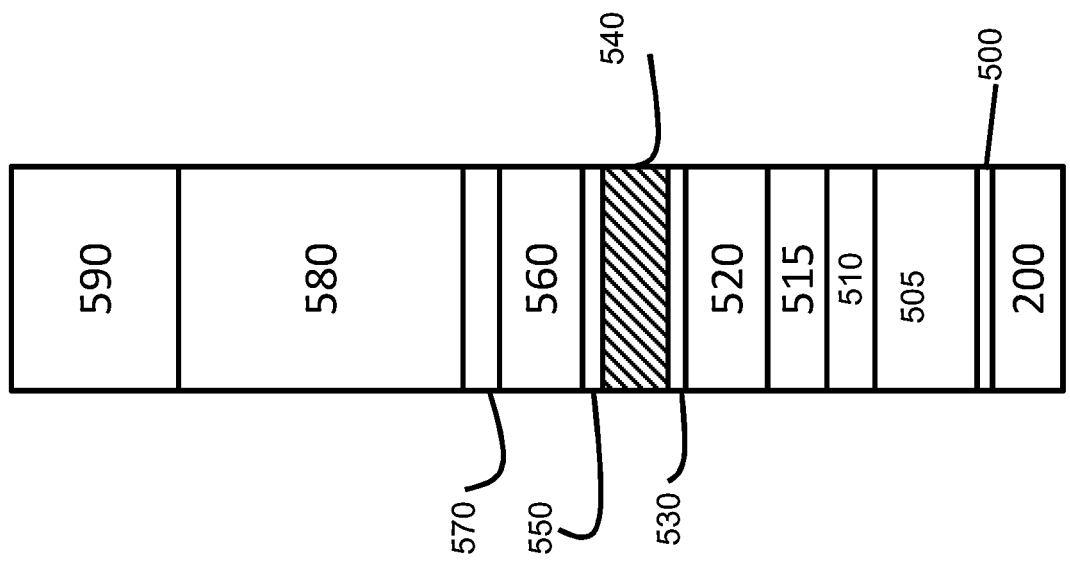
FIG. 21 is an illustration of an article according to Example 7.

Modeled Example 7 included a 12-layer anti-reflective coating, including layers 500, 505, 510, 515, 520, 530, 540, 550, 560, 570, 580, and 590 sequentially disposed on top of one another, disposed on a strengthened aluminosilicate glass substrate 200, as shown in FIG. 21 (the thicknesses shown in FIG. 21 are not exact and intended to be illustrative) and in Table 10.

TABLE 10

Attributes for Modeled Example 7.

| Layer | Periods | Material | Refractive Index | Modeled Physical Thickness |
|---|---|---|---|---|
| Ambient medium | — | Air | 1 | |
| Anti-reflective coating | 1 | SiO$_2$-a (590) | 1.4826 | 87 nm |
| | | Si$_u$Al$_v$O$_x$N$_y$ (580) | 2.015 | 148 nm |
| | 2 | SiO$_2$-a (570) | 1.4826 | 19 nm |
| | | Si$_u$Al$_v$O$_x$N$_y$ (560) | 2.015 | 49 nm |
| | 3 | SiO$_2$-a (550) | 1.4826 | 11 nm |
| | | Si$_u$Al$_v$O$_x$N$_y$ (540) | 2.015 | 500 nm (but variable in the range from about 100 nm to about 5000 nm) |
| | 4 | SiO$_2$-a (530) | 1.4826 | 10 nm |
| | | Si$_u$Al$_v$O$_x$N$_y$ (520) | 2.015 | 44 nm |
| | 5 | SiO$_2$-a (515) | 1.4826 | 32 nm |
| | | Si$_u$Al$_v$O$_x$N$_y$ (510) | 2.015 | 25 nm |
| | 6 | SiO$_2$-a (505) | 1.4826 | 56 nm |
| | | Si$_u$Al$_v$O$_x$N$_y$ (500) | 2.015 | 8 nm |
| Substrate | — | AS Glass | 1.51005 | |
| | — | | Total Coating Thickness | 989 nm |

Layers 550, 560, 570, 580, and 590 are impedance matched to air and layers and 500, 505, 510, 515, 520 and 530 are impedance matched to the glass substrate. Accordingly, layer 540 may be modified to have a thickness in the range from about 0 mm to about 5000 nm or from about 100 nm to about 2500 nm, without influencing the optical properties of the anti-reflective coating or the article.

In Modeled Example 7, the total thickness of the Si$_u$Al$_v$O$_x$N$_y$ layers, which have a higher hardness as measured by the Berkovitch Indenter Hardness Test as compared to the SiO$_2$ layers, is 774 nm, which comprises about 78% of the entire thickness of the coating. Anti-reflective coatings having a structure very similar to Modeled Example 7 were fabricated by DC/RF sputtering, and exhibited an abrasion resistance substantially better than the bare glass substrate, and substantially better abrasion resistance than conventional oxide-only anti-reflective coatings, as illustrated by Example 16 below.

Figure 22:
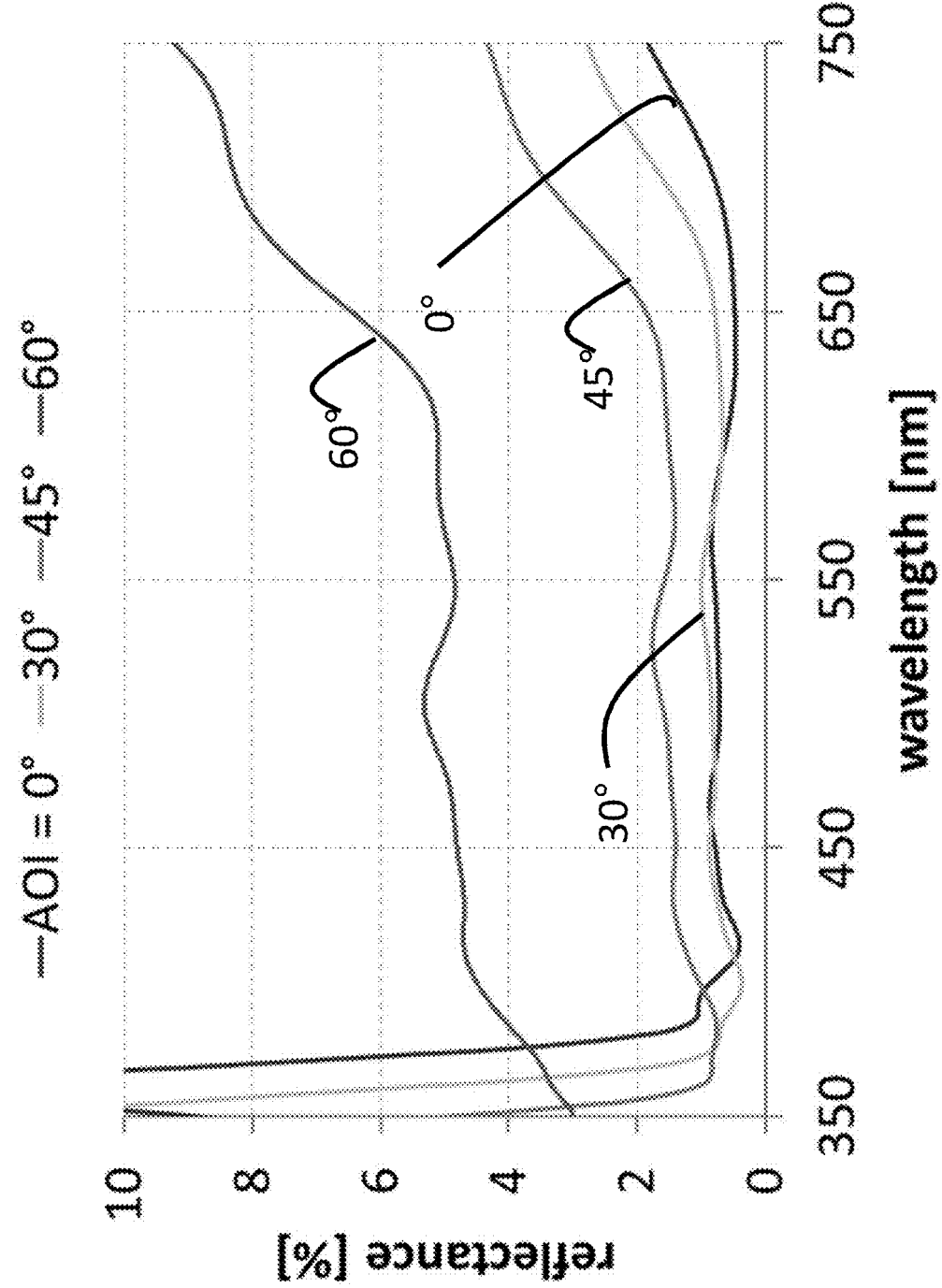
FIG. 22 is a single-sided reflectance spectra of the article of Example 7, showing the reflectance as the incident illumination angle changes from 0° to about 60°.
Figure 23:
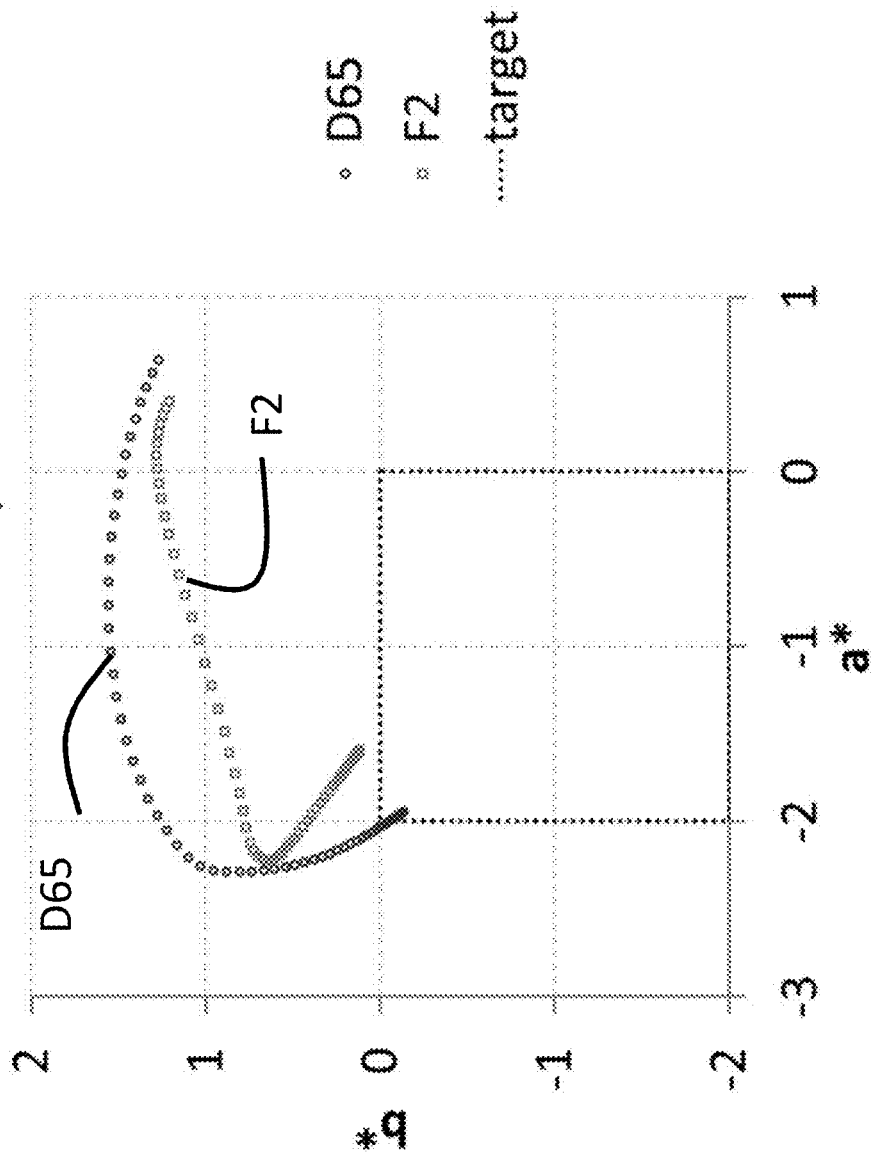
FIG. 23 is a reflected color spectra of the article of Example 7 showing the reflected color under different illuminants at different viewing angle, using a 10° observer.

The reflectance of a single side of the article of Example 7 was calculated at different viewing incident illumination angles or angle of illumination ("AOI") and the resulting reflectance spectra is shown in FIG. 22. The reflected color, based on a 10° observer under a D65 illuminant and a F2 illuminant was also measured and the a* and b* values are plotted as the incident illumination angle or AOI changed from 0 degrees to about 60 degrees from normal incidence at regular increments. The plot showing the reflected color is shown in FIG. 23.

Figure 24:
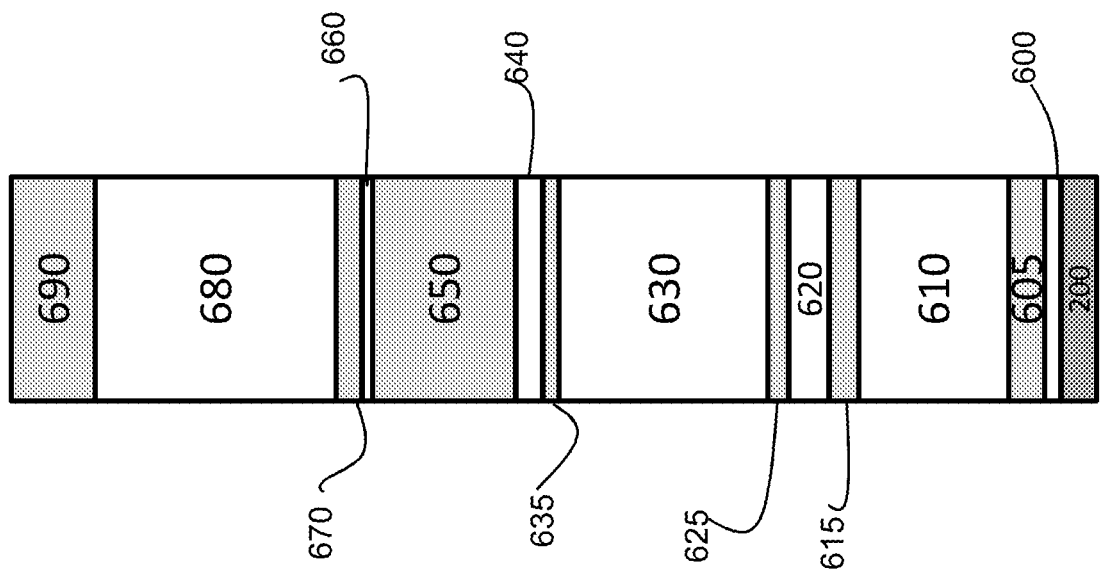
FIG. 24 is an illustration of an article according to Example 8.

Example 8 included a 14-layer anti-reflective coating, including layers 600, 605, 610, 615, 620, 625, 630, 635, 640, 650, 660, 670, 680, and 690 sequentially disposed on top of one another, disposed on a strengthened aluminosilicate glass substrate 200, as shown in FIG. 24 (the thicknesses shown in FIG. 24 are not exact and intended to be illustrative) and the relative thicknesses of the layers are shown in Table 11.

TABLE 11

Attributes for Modeled Example 8.

| Layer | Periods | Material | Refractive Index | Modeled Physical Thickness |
|---|---|---|---|---|
| Ambient medium | — | Air | 1 | |
| Anti-reflective coating | 1 | SiO$_2$-a (690) | 1.4826 | 87 nm |
| | | Si$_u$Al$_v$O$_x$N$_y$ (680) | 2.015 | 251 nm |
| | 2 | SiO$_2$-a (670) | 1.4826 | 27 nm |
| | | Si$_u$Al$_v$O$_x$N$_y$ (660) | 2.015 | 11 nm |
| | 3 | SiO$_2$-a (650) | 1.4826 | 149 nm |
| | | Si$_u$Al$_v$O$_x$N$_y$ (640) | 2.015 | 28 nm |
| | 4 | SiO$_2$-a (635) | 1.4826 | 17 nm |
| | | Si$_u$Al$_v$O$_x$N$_y$ (630) | 2.015 | 217 nm |
| | 5 | SiO$_2$-a (625) | 1.4826 | 22 nm |
| | | Si$_u$Al$_v$O$_x$N$_y$ (620) | 2.015 | 42 nm |
| | 6 | SiO$_2$-a (615) | 1.4826 | 31 nm |
| | | SiuAlvOxNy (610) | 2.015 | 156 nm |
| | 7 | SiO$_2$-a (605) | 1.4826 | 38 nm |
| | | Si$_u$Al$_v$O$_x$N$_y$ (600) | 2.015 | 17 nm |
| Substrate | — | AS Glass | 1.51005 | |
| | — | | Total Coating Thickness | 1093 nm |

Figure 25:
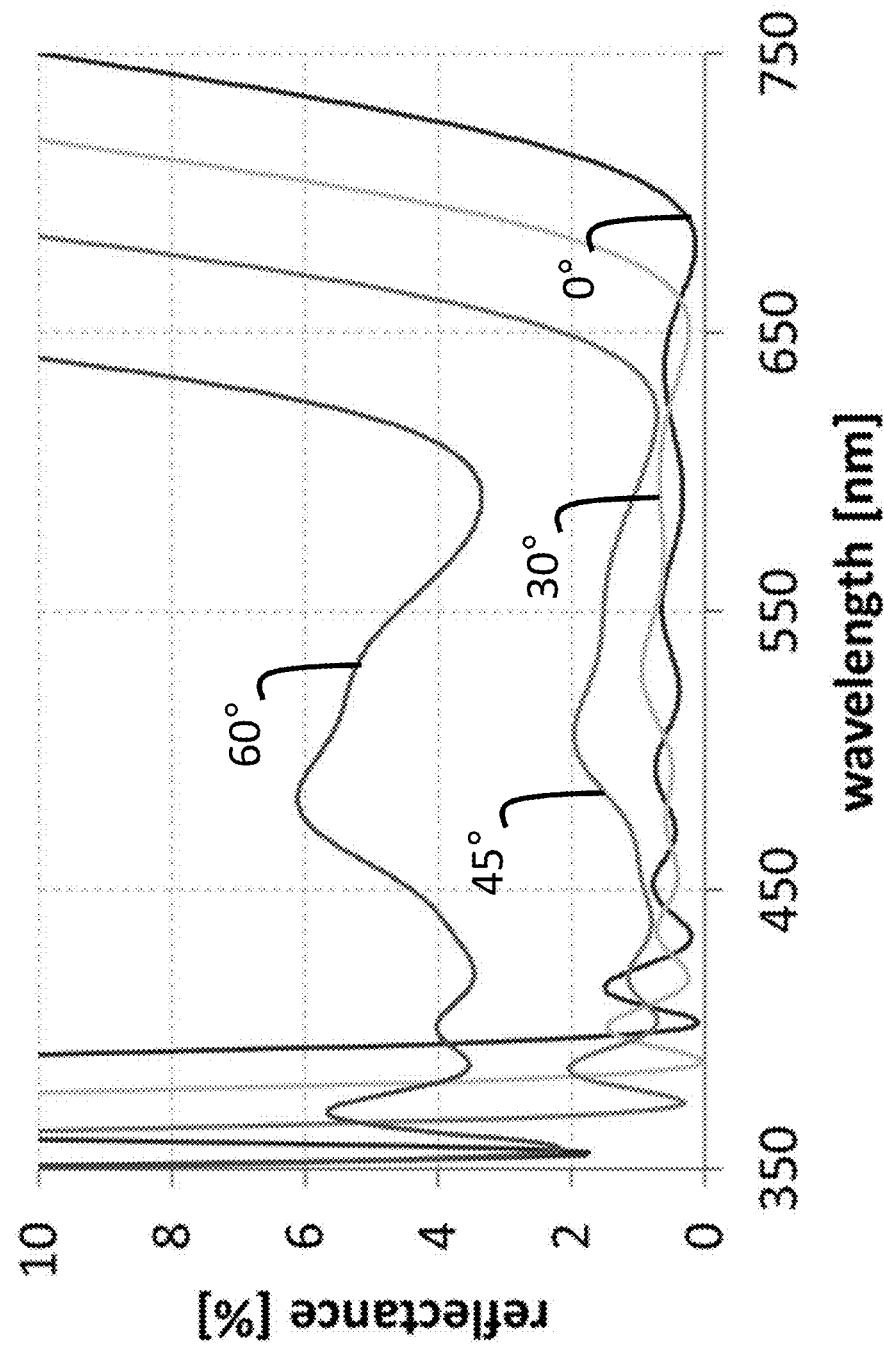
FIG. 25 is a single-sided reflectance spectra of the article of Example 8, showing the reflectance as the incident illumination angle changes from 0° to about 60°.
Figure 26:
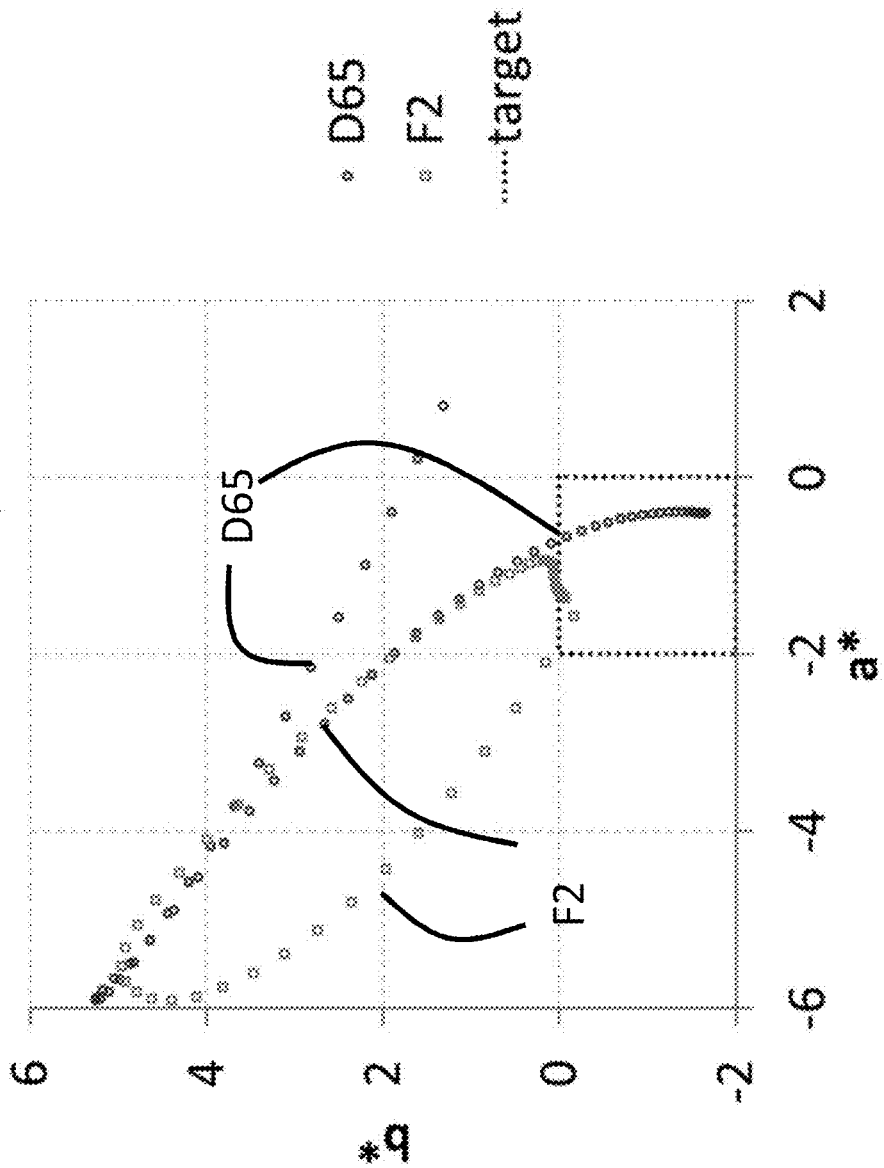
FIG. 26 is a reflected color spectra of the article of Example 8 showing the reflected color under different illuminants at different viewing angle, using a 10° observer.

The total thickness of the Si$_u$Al$_v$O$_x$N$_y$ layers, which have a higher hardness as measured by the Berkovitch Indenter Hardness Test as compared to the SiO$_2$ layers, is 722 nm, which comprises about 66% of the entire thickness of the coating The reflectance of a single side of the article of Example 8 was calculated at different viewing incident illumination angles or angle of illumination ("AOI") and the resulting reflectance spectra is shown in FIG. 25. The reflected color, based on a 10° observer under a D65 illuminant and a F2 illuminant was also measured and the a* and b* values are plotted as the incident illumination angle or AOI changed from 0 degrees to about 60 degrees from normal incidence at regular increments. The plot showing the reflected color is shown in FIG. 26.

Modeled Examples 9, 10A & 10B

Modeled Examples 9, 10A and 10B used the refractive indices and dispersion curves used for Modeled Examples 4-8, and shown above in Tables 4-5 to calculate reflectance spectra of various anti-reflective coating 120 designs.

Modeled Example 9 included a 6-layer anti-reflective coating sequentially disposed on top of one another, disposed on a strengthened aluminosilicate glass substrate 200. The relative thicknesses of the layers are shown in Table 12.

TABLE 12

Attributes for Modeled Example 9.

| Layer | Periods | Material | Refractive Index | Modeled Physical Thickness |
|---|---|---|---|---|
| Ambient medium | — | Air | 1 | |
| Anti-reflective coating | 1 | SiO$_2$-a | 1.4826 | 95 nm |
| | | Si$_u$Al$_v$O$_x$N$_y$ | 2.015 | 167 nm |
| | 2 | SiO$_2$-a | 1.4826 | 31 nm |
| | | Si$_u$Al$_v$O$_x$N$_y$ | 2.015 | 37 nm |
| | 3 | SiO$_2$-a | 1.4826 | 57 nm |
| | | Si$_u$Al$_v$O$_x$N$_y$ | 2.015 | 14 nm |
| Substrate | — | AS Glass | 1.51005 | |

Figure 27:
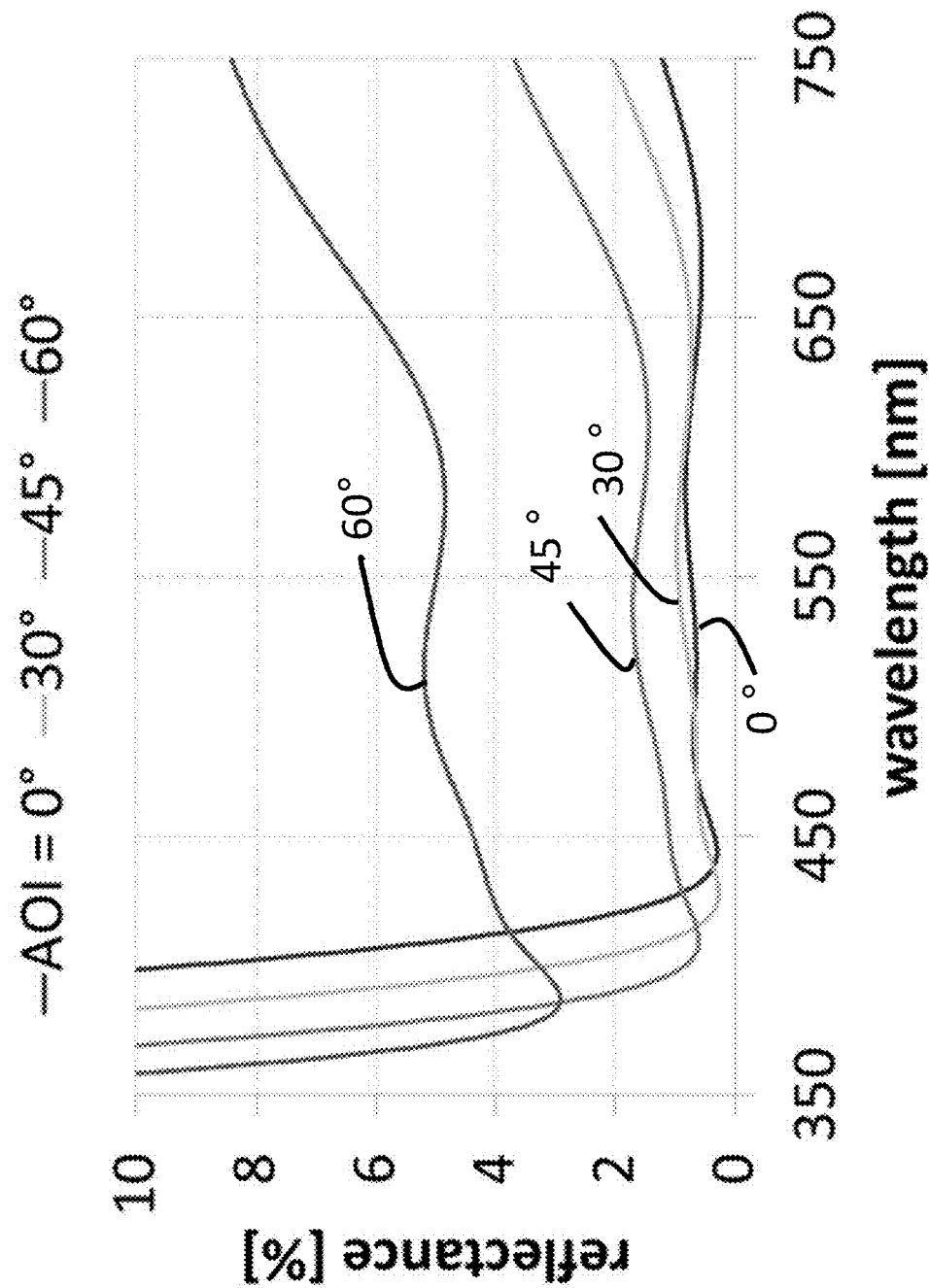
FIG. 27 is a single-sided reflectance spectra of the article of modeled Example 9, showing the reflectance as the incident illumination angle changes from 0° to about 60°.
Figure 28:
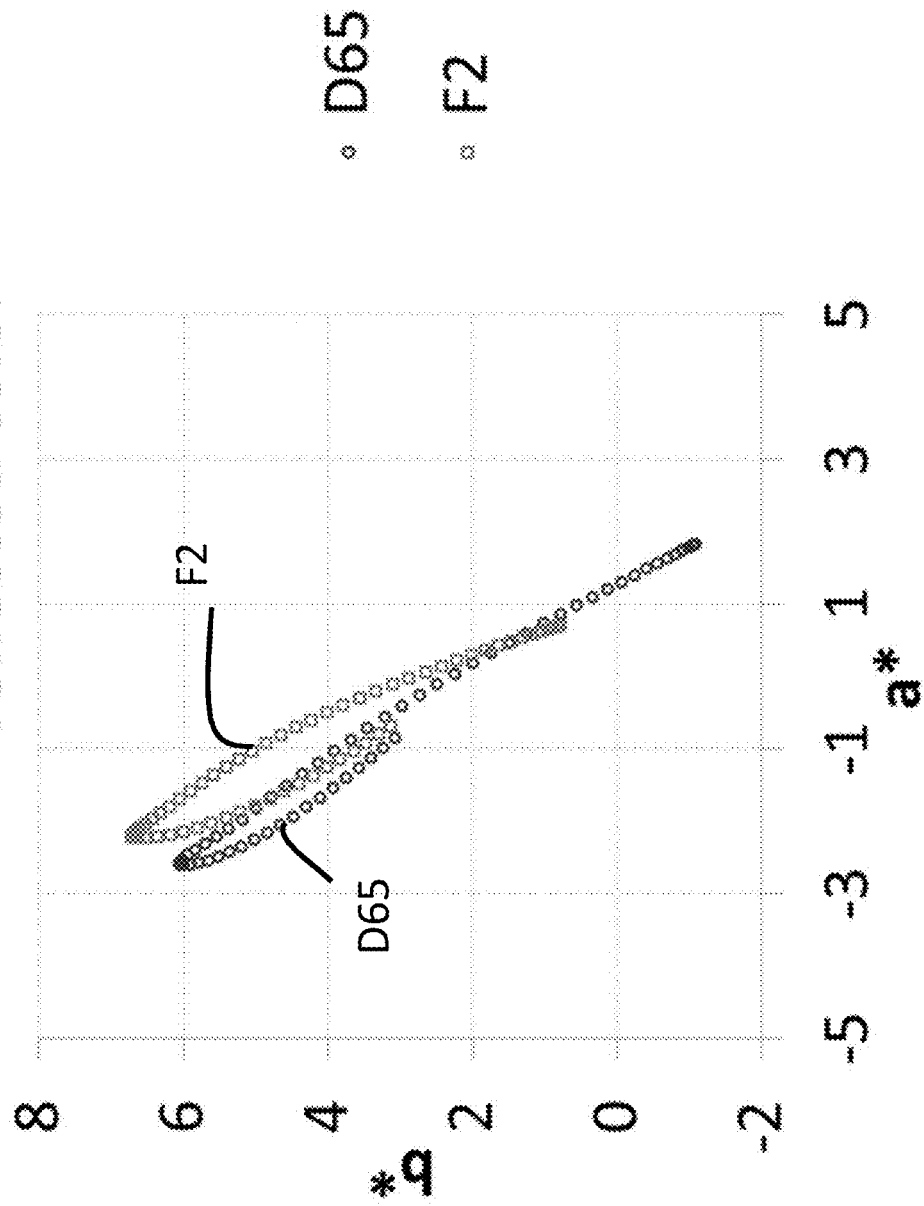
FIG. 28 is a reflected color spectra of the article of Example 9 showing the reflected color under different illuminants at different viewing angle, using a 10° observer.

The reflectance of a single side of the article of Modeled Example 9 was calculated at different viewing incident illumination angles or angle of illumination ("AOI") and the resulting reflectance spectra is shown in FIG. 27. The reflected color, based on a 10° observer under a D65 illuminant and a F2 illuminant was also measured and the a* and b* values are plotted as the incident illumination angle or AOI changed from 0 degrees to about 60 degrees from normal incidence at regular increments. The plot showing the reflected color is shown in FIG. 28.

Modeled Examples 10A and 10B each included an 8-layer anti-reflective coating. Each layer of the coating was sequentially disposed on top of one another, and disposed on a strengthened aluminosilicate glass substrate 200. The relative thicknesses of the layers are shown in Table 13.

TABLE 13

Attributes for Modeled Examples 10A and 10B.

| Layer | Periods | Material | Refractive Index | Modeled Physical Thicknesses 10A | 10B |
|---|---|---|---|---|---|
| Ambient medium | — | Air | 1 | | |
| Anti-reflective coating | 1 | SiO$_2$-a | 1.4826 | 107 nm | 106 nm |
| | | Si$_u$Al$_v$O$_x$N$_y$ | 2.015 | 44 nm | 42 nm |
| | 2 | SiO$_2$-a | 1.4826 | 10 nm | 12 nm |
| | | Si$_u$Al$_v$O$_x$N$_y$ | 2.015 | 86 nm | 84 nm |
| | 3 | SiO$_2$-a | 1.4826 | 26 nm | 27 nm |
| | | Si$_u$Al$_v$O$_x$N$_y$ | 2.015 | 27 nm | 26 nm |
| | 4 | SiO$_2$-a | 1.4826 | 47 nm | 48 nm |
| | | Si$_u$Al$_v$O$_x$N$_y$ | 2.015 | 9 nm | 7 nm |
| Substrate | — | AS Glass | 1.51005 | | |

Figure 29:
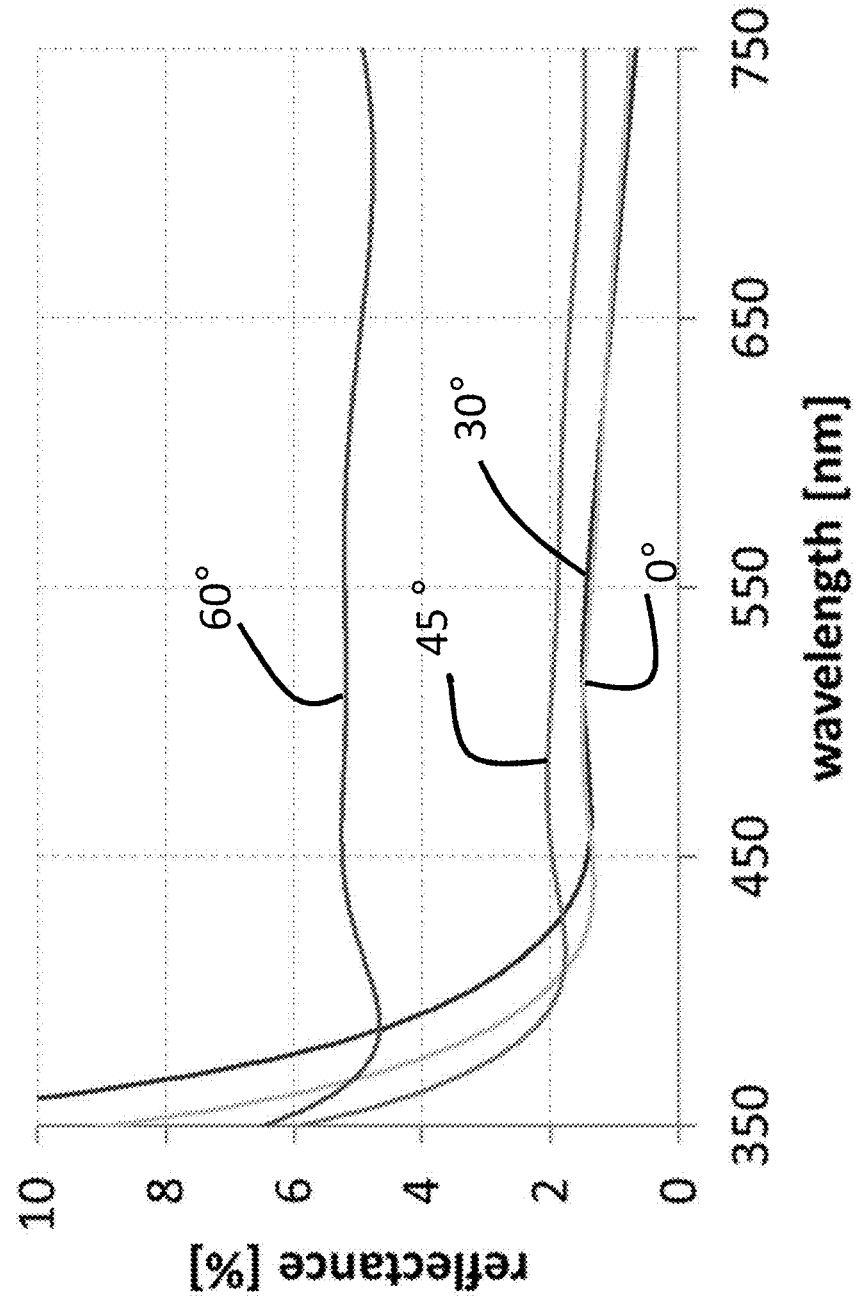
FIG. 29 is a single-sided reflectance spectra of the article of modeled Example 10A, showing the reflectance as the incident illumination angle changes from 0° to about 60°.
Figure 30:
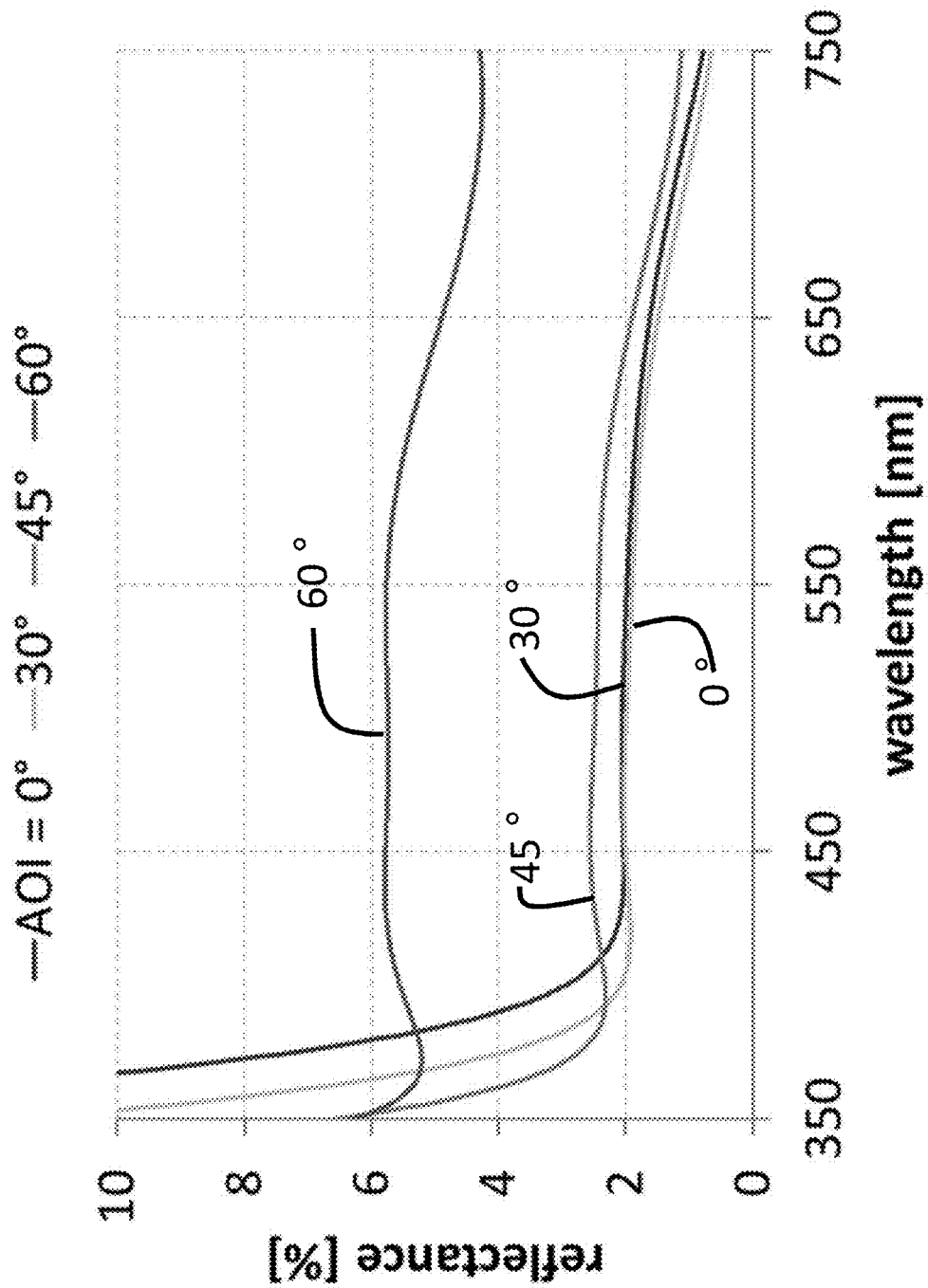
FIG. 30 is a single-sided reflectance spectra of the article of modeled Example 10B, showing the reflectance as the incident illumination angle changes from 0° to about 60°.
Figure 31:
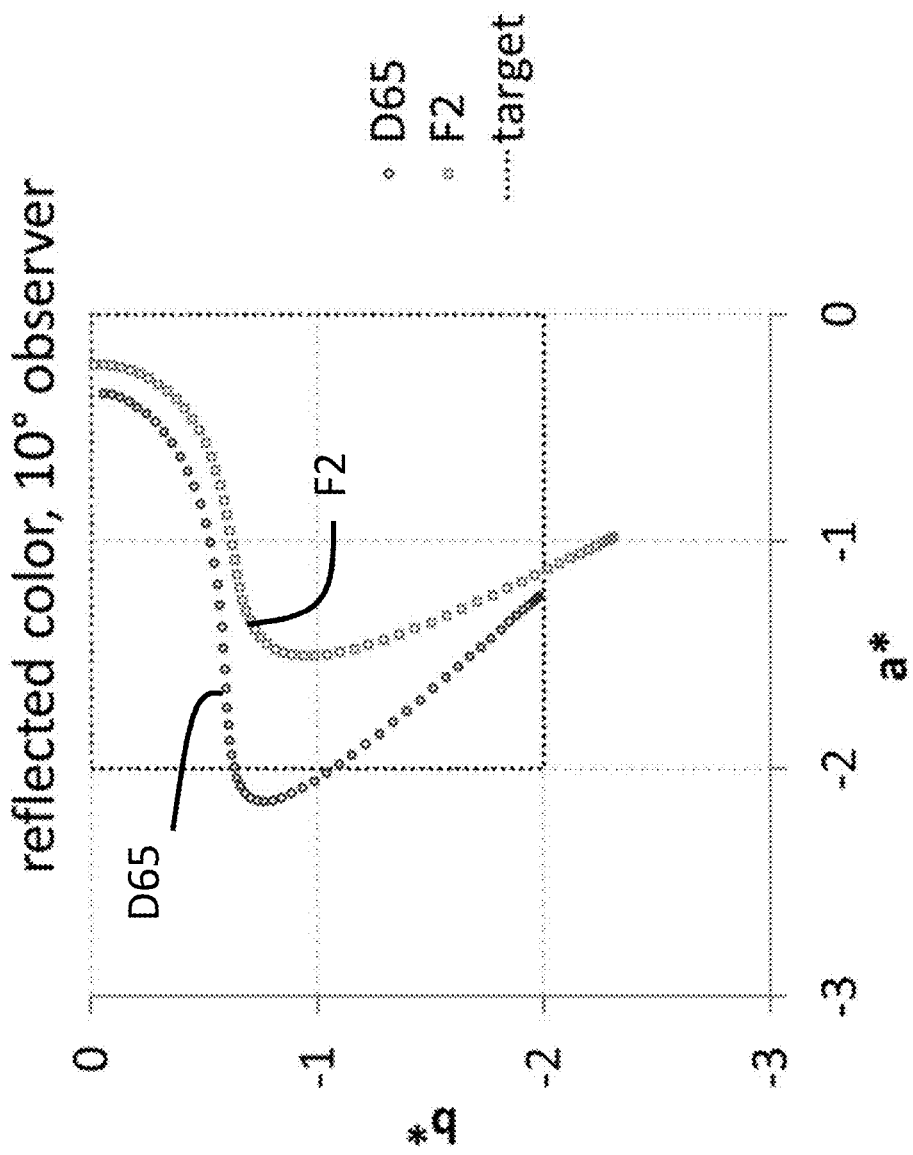
FIG. 31 is a reflected color spectra of the article of Example 10A showing the reflected color under different illuminants at different viewing angle, using a 10° observer.
Figure 32:
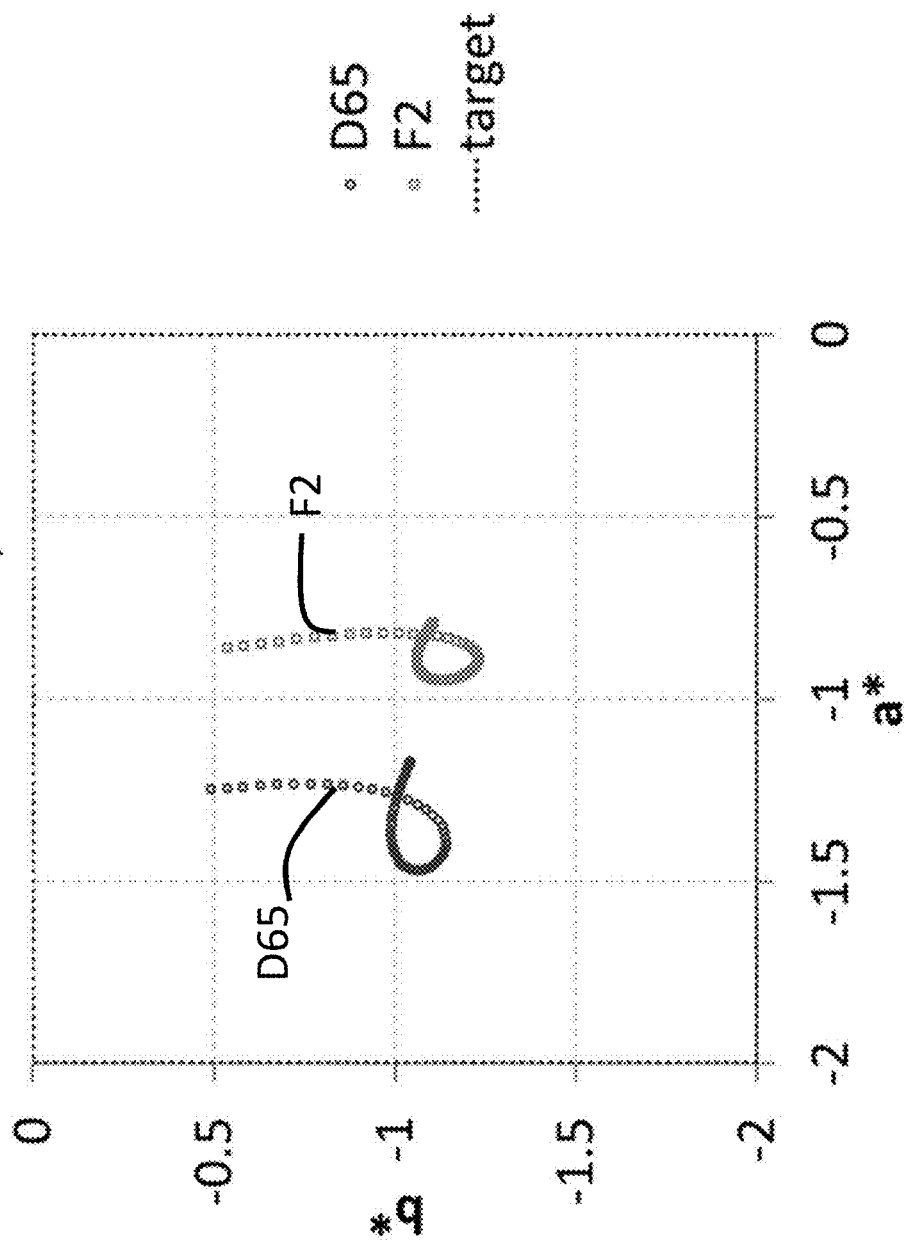
FIG. 32 is a reflected color spectra of the article of Example 10B showing the reflected color under different illuminants at different viewing angle, using a 10° observer.

The reflectance values of a single side of the article of Example 10A and Example 10B were calculated at different viewing incident illumination angles or angle of illumination ("AOI") and the resulting reflectance spectra is shown in FIGS. 29 and 30, respectively. The reflected color, based on a 10° observer under a D65 illuminant and a F2 illuminant was also measured and the a* and b* values are plotted as the incident illumination angle or AOI changed from 0 degrees to about 60 degrees from normal incidence at regular increments. The plots showing the reflected color for Examples 10A and 10B is shown in FIGS. 31-32, respectively.

The optical performance of Modeled Examples 4, 7, 9, 10A and 10B was compared to Modeled Comparative Example 11, which included a 6-layer anti-reflective coating of alternating Nb$_2$O$_5$ and SiO$_2$ layers and a hydrophobic coating disposed on the anti-reflective coating. To generate Modeled Comparative Example 11, ion-assisted e-beam deposition was used to deposit a single layer of Nb$_2$O$_5$ onto a silicon wafer and a single layer of SiO$_2$ onto a silicon wafer. The refractive indices as a function of wavelength for these layers were measured using spectroscopic ellipsometry. The measured refractive indices were then used in Modeled Comparative Example 11. The optical performance evaluated includes average reflectance over the wavelength range from about 450 nm to about 650 nm and color shift (with reference to a* and b* coordinates (−1, −1), using the equation $\sqrt{(a^*_{example}-(-1))^2+(b^*_{example}-(-1))^2})$ when viewed at an incident illumination angles in the range from about 0 degrees to about 60 degrees from normal incidence under F02 and D65 illuminants. Table 14 shows the average reflectance and the greatest color shift of Modeled Examples 4, 7, 9, 10A and 10B and Modeled Comparative Example 11.

TABLE 14

Average Reflectance and Color Shift for Modeled Examples 4, 7, 9, 10A and 10B and Modeled Comparative Example 11.

| Ex. | Avg. Reflectance 450-650 nm (%) | Color Shift Referenced to (a*, b*) = (−1, −1) |
|---|---|---|
| Modeled Example 4, 6-layer Si$_u$Al$_v$O$_x$N$_y$ or AlO$_x$N$_y$/SiO$_2$ | 0.5 | 4.0 |
| Modeled Example 7, 12-layer Si$_u$Al$_v$O$_x$N$_y$ or AlO$_x$N$_y$/SiO$_2$ | 1.0 | 2.5 |
| Modeled Example 9, 6-layer Si$_u$Al$_v$O$_x$N$_y$ or AlO$_x$N$_y$/SiO$_2$ | 0.8 | 3.6 |
| Modeled Example 10A, 8-layer Si$_u$Al$_v$O$_x$N$_y$ or AlO$_x$N$_y$/SiO$_2$ | 1.5 | 1.2 |
| Modeled Example 10B, 8-layer Si$_u$Al$_v$O$_x$N$_y$ or AlO$_x$N$_y$/SiO$_2$ | 2.0 | 0.6 |
| Modeled Comp. Ex. 11, 6-layer Nb2O5/SiO2/hydrophobic coating | 0.3 | 7.9 |

As shown in Table 14, while Modeled Comparative 11 exhibited the lowest average reflectance, it also exhibited the greatest color shift. Modeled Example 4 exhibited comparable reflectance and a significantly reduced color shift. Modeled Examples 7, 9, 10A and 10B had even less color shift though, reflectance was increased slightly.

Examples 12-18

Examples 12-18 included either bare aluminosilicate glass substrates (with no coatings) or aluminosilicate glass substrates with various anti-reflective or hard coatings as shown in Table 15. The aluminosilicate glass substrates were chemically strengthened and exhibited a compressive stress in the range from about 700 MPa to about 900 MPa and depths of compressive stress layer values in the range from about 40 μm to about 50 μm. The anti-reflective coatings were deposited using reactive DC sputtering, e-beam evaporation, and reactive DC and RF sputtering. The anti-reflective coatings included layers of SiO$_2$, Si$_u$Al$_v$O$_x$N$_y$, AlO$_x$N$_y$, and Nb$_2$O$_5$. SiO$_2$ layers were formed by either DC reactive sputtering from a Si target at about 200° C. with ion assist or by ion-assisted e-beam deposition, as indicated in Table 15. Nb$_2$O$_5$ layers were deposited by ion-assisted e-beam deposition. Layers of Si$_u$Al$_v$O$_x$N$_y$ were deposited by DC reactive sputtering combined with RF superimposed DC sputtering using a substrate heated to 200° C. substrate heating with ion assist. Si$_u$Al$_v$O$_x$N$_y$ layers were made by reactive sputtering in an AJA-Industries Sputter Deposition Tool. The targets used to form the $Si_uAl_vO_xN_y$ layers were 3" diameter Si and 3" diameter Al. The reactive gasses were nitrogen and oxygen, and the "working" (or inert) gas was Argon. The power supplied to the Si target was radio frequency (RF) at 13.56 Mhz. The power supplied to the Al target was DC. It should be noted that layers of AlOxNy could be substituted for the layers of $Si_uAl_vO_xN_y$ layers and can be formed using the same or similar process used to form such layers. Both $Si_uAl_vO_xN_y$, and AlOxNy layers can be made to exhibit a refractive index at 550 nm of about 1.95 and a measured hardness greater than 15 GPa measured using the Berkovitch Indenter Hardness Test.

TABLE 15

Anti-reflective coating structures for Examples 12-18.

| Example | Coating Structure |
|---|---|
| Ex. 12 | 6-layers, having the same structure and materials as modeled Ex. 4 |
| Ex. 13 | 12-layers, having the same structure and materials as modeled Example 7 |
| Comparative Ex. 14 | 6L having the same structure and materials as Modeled Comparative Example 11 |
| Comparative Ex. 15 | chemically strengthened glass with hydrophobic coating only |
| Comprative Ex. 16 | single layer of $Si_uAl_vO_xN_y$ having a thickness of 186 nm |
| Comparative Ex. 17 | single layer of $Si_uAl_vO_xN_y$ having a thickness of 478 nm |
| Comparative Ex. 18 | chemically strengthened glass with no coatings (bare) |

Table 16 shows the abrasion resistance of Examples 12-13 and Comparative Examples 14-18, as measured in terms of measured scattered light intensity (CCBTDF, 1/steradian) and transmission haze (with 8 mm aperture) after subjecting the samples to the Taber Test. The average reflectance was measured at the anti-reflective surface without abrasion (single surface measurement, subtracting out 4% reflectance from the opposite, uncoated surface).

As shown in Table 16, Examples 12 and 13 approached the scattered light intensity of the Comparative Ex. 18 without abrading (or without being subjected to the Taber Test) at 40 degrees, indicating superior abrasion resistance. Examples 12 and 13 also exhibited the least scattered light intensity at 20 degrees, of all the samples after being subjected to the Taber Test. The transmission haze of both Examples 12 and 13 was substantially the same as the transmission haze for Comparative Ex. 18 without abrading. The average reflectance of Examples 12 and 13 was significantly improved over Comparative Example 18, with only Comparative Example 14 exhibiting less average reflectance.

Figure 33:
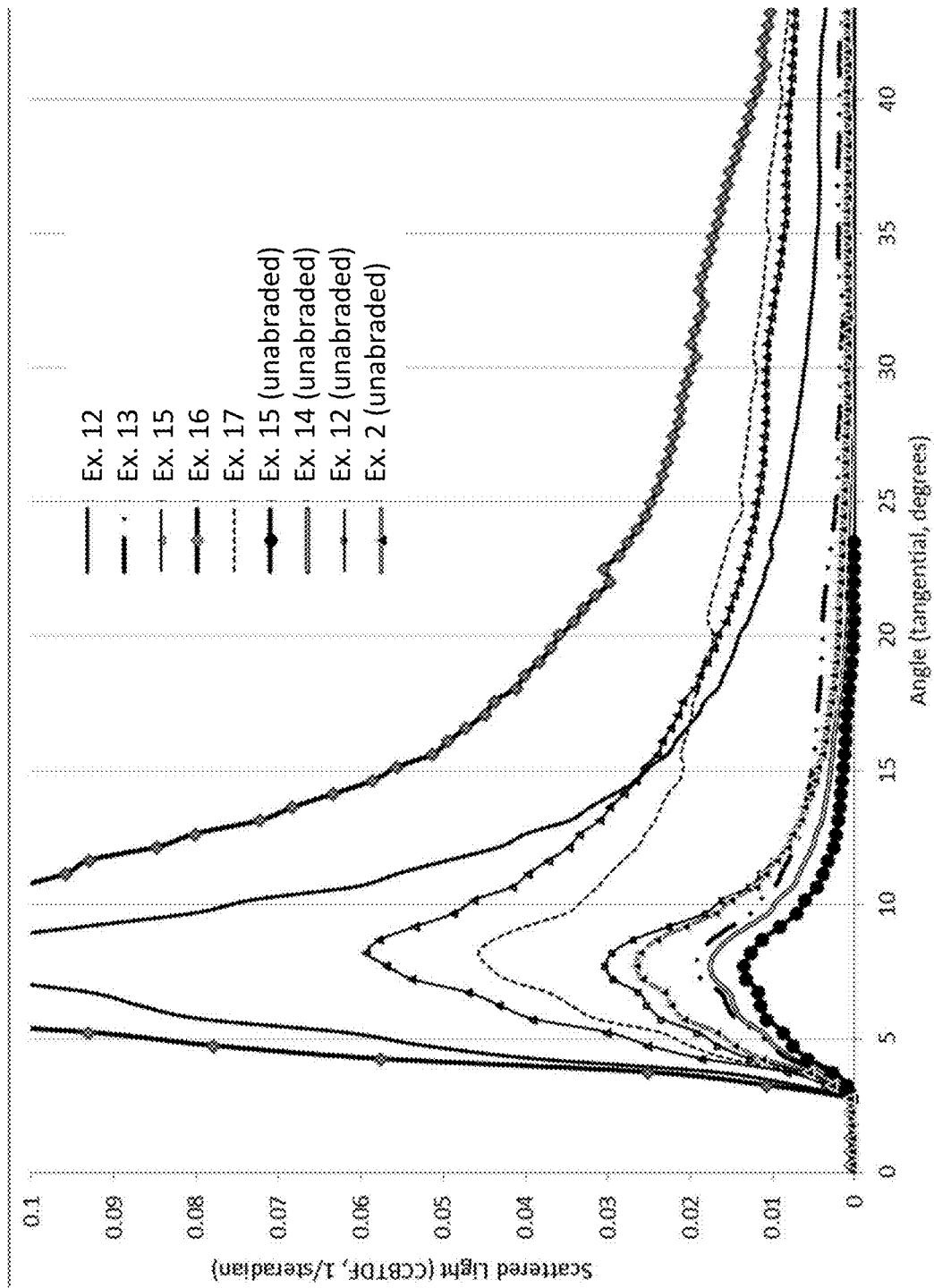
FIG. 33 is a graph showing scattered light intensity values measured for Examples 12 and 13 and Comparative Examples 15, 16, and 17 after and without being subjected to the Taber Test.

FIG. 33 is a graph shows the scattered light intensity (CCBTDF, 1/steradian) measurements of Table 16, along polar angles orthogonal to abrasion direction for Examples 12-13 and Comparative Examples 15-17, with and without being subjected to the Taber Test. Lower scattering intensity values indicate less severe abrasion and thus greater abrasion resistance (and lower abrasion visibility in human inspection trials).

The abrasion resistance of Examples 12-13 and Comparative Examples 14, 17-18 was evaluated by AFM roughness, after being subjected to the Taber Test. Table 17 shows AFM roughness statistics (average and std. dev.) reported for 5 scans of an 80×80 micron area within the abraded region. As shown in Table 17, Examples 12 and 13 exhibited very low roughness, as compared to Comparative Ex. 14 and 18. Comparative Ex. 17 exhibited low roughness but also exhibited relatively high reflectance and light scattering, as shown above in Table 17.

TABLE 16

Average Reflectance (without abrasion) and abrasion resistance, as measured by scattered light intensity and transmission haze (after being subjected to the Taber Test) for Examples 12-13 and Comparative Examples 14-18.

| Example | Scattered light intensity - Avg. +/− Std. Dev. (CCBTDF, 1/steradian) | | Range of Transmission Haze With 7 mm aperture | Avg. Reflectance (Non-abraded) 450-650 nm (%) |
|---|---|---|---|---|
| | At 20 degrees | At 40 degrees | | |
| Ex. 12 | 0.012 +/− 0.004 | 0.004 +/− 0.002 | 0.1-0.2 | 0.7 |
| Ex. 13 | 0.008 +/− 0.006 | 0.002 +/− 0.001 | 0 | 0.7 |
| Comparative Ex. 14 | 0.13 +/− 0.04 | 0.09 +/− 0.03 | 1.3-2.8 | 0.5 |
| Comparative Ex. 15 | 0.022 +/− 0.015 | 0.008 +/− 0.004 | 0.25-0.35 | 4.0 |
| Comparative Ex. 16 | 0.03 +/− 0.01 | 0.008 +/− 0.006 | 0.8 | 8.4 |
| Comparative Ex. 17 | 0.018 +/− 0.001 | 0.008 +/− 0.002 | 0.3 | 6.0 |
| Comparative Ex. 18 | 0.021 +/− 0.004 | 0.007 +/− 0.003 | 0.1-0.4 | 4.0 |
| Comparative Ex. 18(Without Abrading) | 0.002 +/− 0.001 | 0.001 +/− 0.0004 | 0-0.2 | 4.0 |

TABLE 17

Abrasion resistance, as measured by AFM roughness statistics, after being subjected to the Taber Test, for Examples 12-13 and Comparative Examples 14, 17 and 18.

| Examples | AFM roughness (Ra, nm, 5 scan average) | Std. Dev. (of Ra, nm, 5 scans) |
|---|---|---|
| Example 12 | 7.1 | 5.4 |
| Example 13 | 3.5 | 2.9 |
| Comp. Ex. 14 | 16.8 | 8.2 |
| Comp. Ex. 17 | 4.5 | 0.7 |
| Comp. Ex. 18 | 14.1 | 8.9 |

Figure 34:
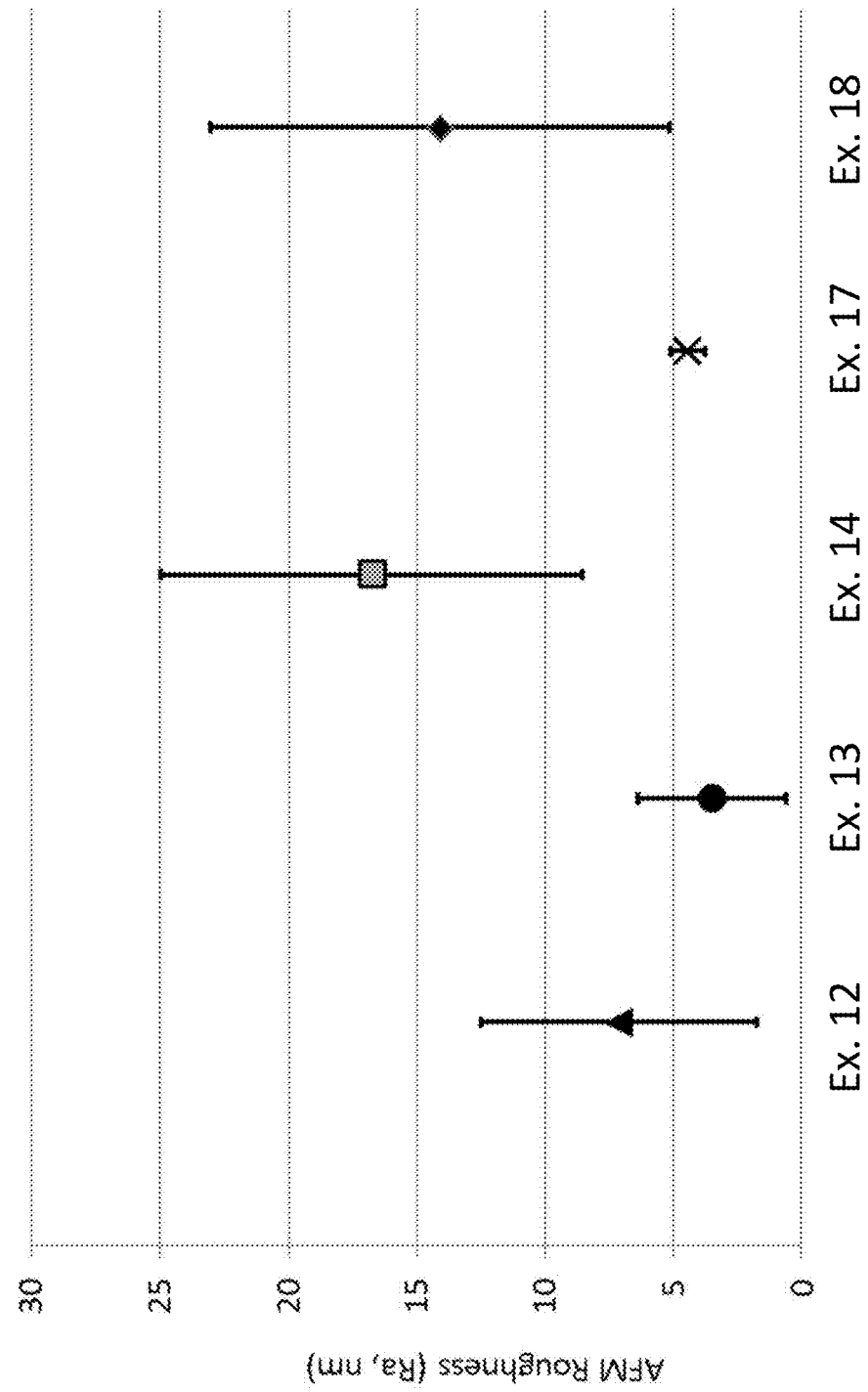
FIG. 34 is a graph showing the AFM roughness statistics measured for Examples 12 and 13 and Comparative Examples 14, 17 and 18 after being subjected to the Taber Test.

FIG. 34 is a graph showing the AFM roughness statistics from Table 22.

Example 19

Example 19 included a 10-layer anti-reflective coating disposed on a strengthened aluminosilicate glass substrate having a nominal composition of about 58 mol % $SiO_2$, 17 mol % $Al_2O_3$, 17 mol % $Na_2O$, 3 mol % MgO, 0.1 mol % SnO, and 6.5 mol % $P_2O_5$. The thicknesses of the layers are shown in Table 18.

Both $SiO_2$ and $Si_uAl_vO_xN_y$ layers were made by reactive sputtering in a coater made by AJA Industries. $SiO_2$ was deposited by DC reactive sputtering from an Si target with ion assist; $Si_uAl_vO_xN_y$ material was deposited by DC reactive sputtering combined with RF superimposed DC sputtering with ion assist. The reactive gasses were nitrogen and oxygen, and the "working" (or inert) gas was Argon.

TABLE 18

Attributes for Example 19.

| Layer | Periods | Material | Refractive Index | Physical Thickness (nm) |
|---|---|---|---|---|
| Ambient medium | — | Air | 1 | |
| Anti-reflective coating | 1 | $SiO_2$ | 1.48623 | 96.75 |
| | | $Si_uAl_vO_xN_y$ | 2.03056 | 68.92 |
| | 2 | $SiO_2$ | 1.48623 | 24.13 |
| | | $Si_uAl_vO_xN_y$ | 2.03056 | 36.64 |
| | 3 | $SiO_2$ | 1.48623 | 70.12 |
| | | $Si_uAl_vO_xN_y$ | 2.03056 | 28.12 |
| | 4 | $SiO_2$ | 1.48623 | 23.54 |
| | | $Si_uAl_vO_xN_y$ | 2.03056 | 110.49 |
| | 5 | $SiO_2$ | 1.48623 | 31.23 |
| | | $Si_uAl_vO_xN_y$ | 2.03056 | 16.82 |
| Substrate | — | AS Glass | 1.511 | |
| | — | | Total Coating Thickness | 506.75 nm |

The amount of high RI material is about 51.5% and the amount of low RI material is about 48.5% of the anti-reflective coating. The deposition conditions are shown in Table 19. The deposition temperature was 200° C. and

TABLE 19

Deposition recipe for Example 19.

| Periods | Material | Dep. Time (seconds) | Ar flow (sccm) | N2 flow (sccm) | O2 flow (sccm) | Al Wrf | Al Wdc | Si Wrf | Si shutter | P (torr) |
|---|---|---|---|---|---|---|---|---|---|---|
| 1 | $SiO_2$ | 1248 | 200 | 30 | 30 | 3.3 | 50 | 75 | 500 | 1 |
| | $Si_uAl_vO_xN_y$ | 633 | 200 | 30 | 30 | 0.5 | 200 | 300 | 500 | 1 |
| 2 | $SiO_2$ | 318 | 200 | 30 | 30 | 3.3 | 50 | 75 | 500 | 1 |
| | $Si_uAl_vO_xN_y$ | 235 | 200 | 30 | 30 | 0.5 | 200 | 300 | 500 | 1 |
| 3 | $SiO_2$ | 1011 | 200 | 30 | 30 | 3.3 | 50 | 75 | 500 | 1 |
| | $Si_uAl_vO_xN_y$ | 179 | 200 | 30 | 30 | 0.5 | 200 | 300 | 500 | 1 |
| 4 | $SiO_2$ | 305 | 200 | 30 | 30 | 3.3 | 50 | 75 | 500 | 1 |
| | $Si_uAl_vO_xN_y$ | 933 | 200 | 30 | 30 | 0.5 | 200 | 300 | 500 | 1 |
| 5 | $SiO_2$ | 429 | 200 | 30 | 30 | 3.3 | 50 | 75 | 500 | 1 |
| | $Si_uAl_vO_xN_y$ | 121 | 200 | 30 | 30 | 0.5 | 200 | 300 | 500 | 1 |

Figure 35:
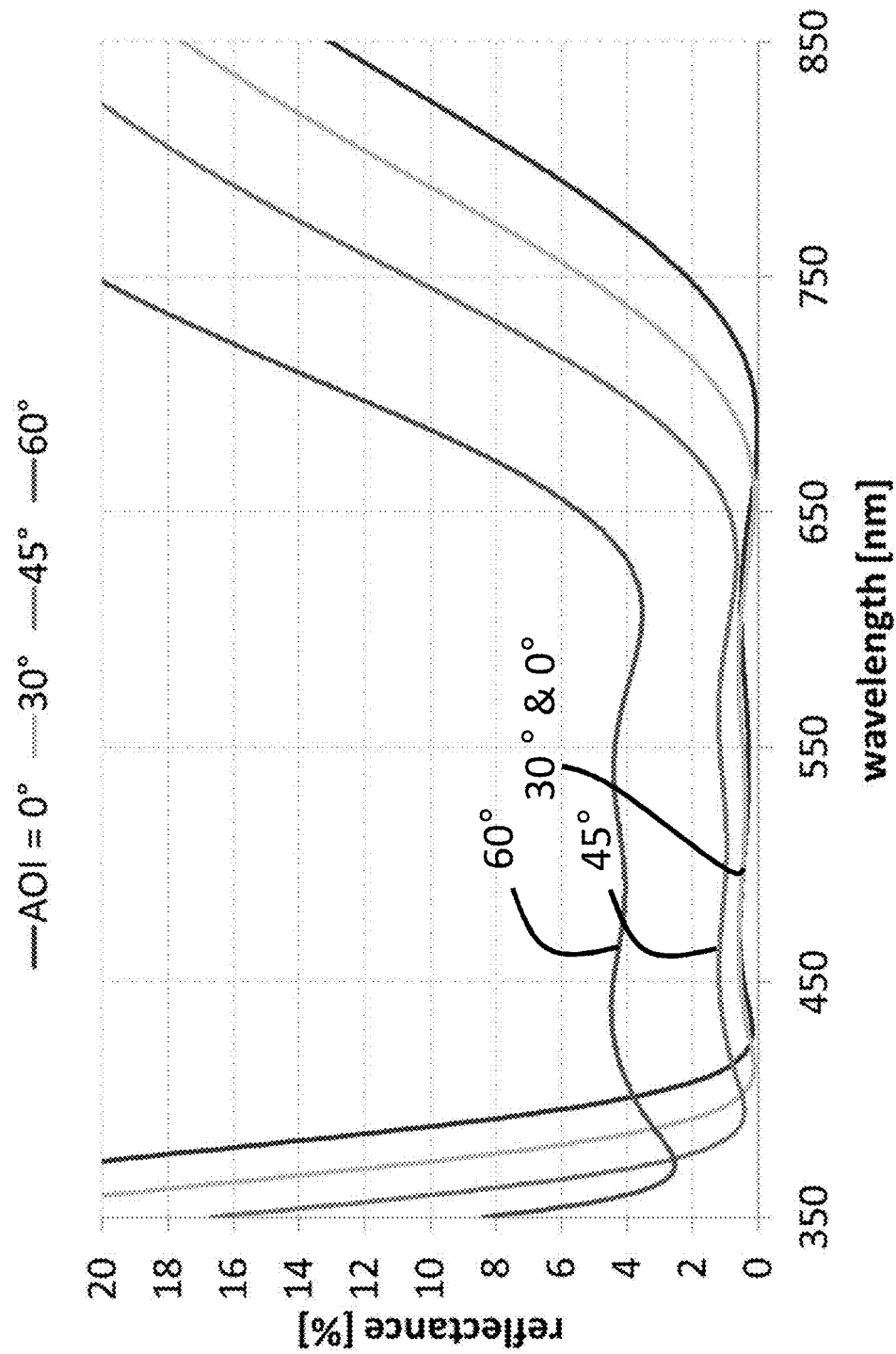
FIG. 35 is a single-sided reflectance spectra of the article of Example 19, showing the reflectance as the incident illumination angle changes from 0° to about 60°.
Figure 36:
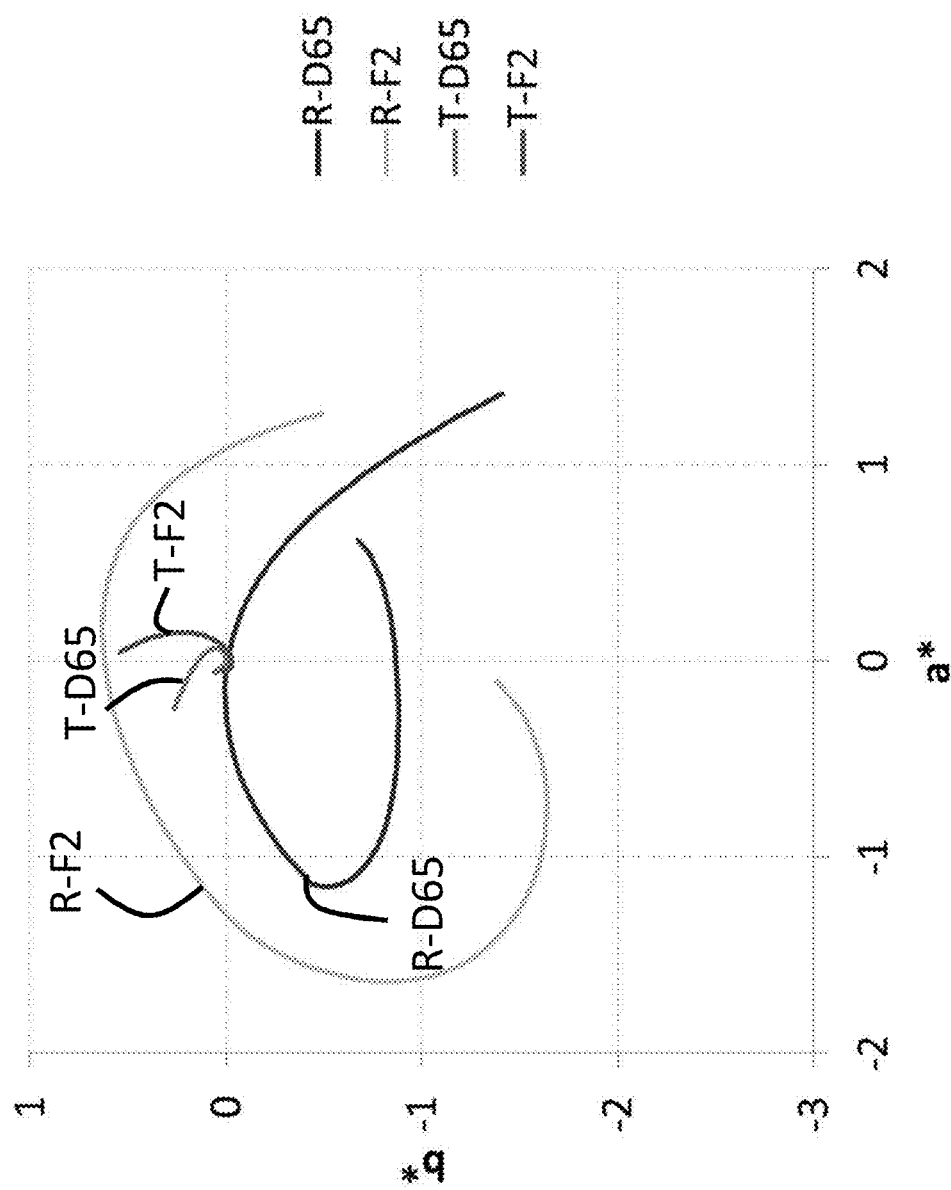
FIG. 36 is a reflected and transmitted color spectra of the article of Example 19 showing the reflected and transmitted color under different illuminants at different viewing angle, using a 10° observer.

The reflectance values of a single side of the article of Example 19 at different viewing incident illumination angles or angle of illumination ("AOI") were modeled using the dispersion curves obtained for each of the coating materials and the glass substrate. The resulting modeled reflectance spectra is shown in FIG. 35. The reflected color and transmitted color, based on a 10° observer under a D65 illuminant and a F2 illuminant were also measured and the a* and b* values are plotted as the incident illumination angle or AOI changed from 0 degrees to about 60 degrees from normal incidence at regular increments. The plot showing both the reflected color and transmitted color for Example 19 is shown in FIG. 36. As shown in FIG. 36 and in Table 21 below, both the reflected and transmitted color are less than 3 from a*=0 and b*=0, for incident illumination angles from 0 degrees to about 60 degrees. Example 19 was evaluated for photopic reflectance at different AOI. From an AOI in the range from about 0° to about 20°, the photopic reflectance may be about 0.4 or less.

TABLE 21

Photopic reflectance, reflectance color shift, thickness and percentage of hard material for Example 19 and Comparative Example 11.

| Ex. | % R (Photopic Avg., Y) (wavelengths 450-650 nm) | Refl. Color shift 5-60 degrees (max-min, D65) a* | b* | Total thickness nm | % Hard material |
|---|---|---|---|---|---|
| Comparative Example 11 | 0.4 | 7.0 | 12.4 | | |
| Ex. 19 | 0.4 | 2.5 | 1.4 | 500 | 51 |

Example 20

Example 20 included a 10-layer anti-reflective coating disposed on a strengthened aluminosilicate glass substrate having a nominal composition of about 58 mol % $SiO_2$, 17 mol % $Al_2O_3$, 17 mol % $Na_2O$, 3 mol % MgO, 0.1 mol % SnO, and 6.5 mol % $P_2O_5$. The thicknesses of the layers are shown in Table 22.

The $SiO_2$ and $Si_uAl_vO_xN_y$ layers were made by reactive sputtering in a coater made by Optorun Co. Ltd. $SiO_2$ was deposited by DC reactive sputtering from a Si target with ion assist; $Si_uAl_vO_xN_y$ material was deposited by DC reactive sputtering combined with RF superimposed DC sputtering with ion assist. The reactive gasses were nitrogen and oxygen, and the "working" (or inert) gas was Argon. The deposition conditions for the $SiO_2$ and $Si_uAl_vO_xN_y$ layers are provided in Table 23. Each layer was formed at 200° C. deposition temperature and for a deposition time sufficient to form the physical thickness of each layer.

TABLE 22

Attributes for Example 20.

| Layer | | Periods | Material | Refractive Index | Physical Thickness (nm) |
|---|---|---|---|---|---|
| | | — | Air | 1 | |
| Anti-reflective coating | | 1 | $SiO_2$ | 1.48114 | 89 |
| | | | $Si_uAl_vO_xN_y$ | 2.00605 | 87.7 |
| | | 2 | $SiO_2$ | 1.48114 | 21.9 |
| | | | $Si_uAl_vO_xN_y$ | 2.00605 | 27.6 |
| | | 3 | $SiO_2$ | 1.48114 | 72.9 |
| | | | $Si_uAl_vO_xN_y$ | 2.00605 | 23.7 |
| | | 4 | $SiO_2$ | 1.48114 | 22.9 |
| | | | $Si_uAl_vO_xN_y$ | 2.00605 | 114.9 |
| | | 5 | $SiO_2$ | 1.48114 | 30.2 |
| | | | $Si_uAl_vO_xN_y$ | 2.00605 | 15.6 |
| Substrate | | — | AS Glass | 1.50542 | |
| | | — | Total Coating Thickness | | 506.4 nm |

TABLE 23

Deposition conditions for Example 20.

| Layer | Ar Flow (sccm) | N2 flow (sccm) | O2 flow (sccm) | Al Wrf | Al Wdc | Si Wrf | Si shutter | P (torr) | Bias |
|---|---|---|---|---|---|---|---|---|---|
| $SiO_2$ | 30 | 30 | 3.3 | 50 | 75 | 500 | 1 | 4 | 0 |
| $Si_uAl_vO_xN_y$ | 30 | 30 | 0.5 | 200 | 300 | 500 | 1 | 2 | 0 |

Example 20 exhibited a single side average reflectance (i.e., measured from the anti-reflective surface 122) over the optical wavelength regime at incident illumination angles of 0°, 30°, 45° and 60°, of 0.86%, 1.04%, 1.6%, and 3.61%, respectively. Example 20 exhibited a single side average transmittance (i.e., measured from the anti-reflective surface 122) over the optical wavelength regime at incident illumination angles of 0°, 30°, 45° and 60°, of 99.14%, 98.95%, 98.4%, and 96.39%, respectively.

Example 20 exhibited a total average reflectance (i.e., measured from the anti-reflective surface 122 and the opposite major surface 114) over the optical wavelength regime at incident illumination angles of 0°, 30°, 45° and 60°, of 4.85%, 3.56%, 2.44%, and 3.77%, respectively. Example 20 exhibited a single side average transmittance (i.e., measured from the anti-reflective surface 122) over the optical wavelength regime at incident illumination angles of 0°, 30°, 45° and 60°, of 95.15%, 96.44%, 97.56%, and 96.23%, respectively.

The reflectance and transmitted color coordinates for a single surface (i.e., anti-reflective surface 122) and two surfaces (i.e., anti-reflective surface 122 and major surface 114, of FIG. 1) of Example 20, under incident illumination angles or AOI from 0 degrees to 60 degrees (or 75 degrees) and illuminants D65 and F2 are shown in Tables 24A-24D. Single surface color coordinates were measured by eliminating transmission or reflectance from the major surface 114, as is known in the art. The color shift is calculated using the following equation: $\sqrt{((a^*_2-a^*_1)^2+(b^*_2-b^*_1)^2)}$, with $a^*_1$, and $b^*_1$ representing the a* and b* coordinates of the article when viewed at normal incidence (i.e., AOI=0) and $a^*_2$, and $b^*_2$ representing the a* and b* coordinates of the article when viewed at an incident illumination angle different or away from normal incidence (i.e., AOI=1-60 or 1-75).

TABLE 24A

One surface reflectance and transmitted color coordinates (Y, L*, a* and b*) using illuminant D65 for Example 20.

| | Reflectance, D65 | | | | | Transmittance, D65 | | | |
|---|---|---|---|---|---|---|---|---|---|
| AOI | Y | L* | a* | b* | AOI | Y | L* | a* | b* |
| 0 | 0.5366 | 4.8468 | −2.8959 | −1.6828 | 0 | 99.4622 | 99.7917 | 0.1231 | 0.0761 |
| 1 | 0.5365 | 4.8462 | −2.8956 | −1.681 | 1 | 99.4623 | 99.7917 | 0.1231 | 0.076 |
| 2 | 0.5363 | 4.8443 | −2.8947 | −1.6757 | 2 | 99.4625 | 99.7918 | 0.123 | 0.0758 |
| 3 | 0.5359 | 4.8412 | −2.893 | −1.667 | 3 | 99.4628 | 99.7919 | 0.123 | 0.0754 |
| 4 | 0.5355 | 4.8369 | −2.8905 | −1.6551 | 4 | 99.4633 | 99.7921 | 0.1228 | 0.0749 |
| 5 | 0.5349 | 4.8315 | −2.8872 | −1.6403 | 5 | 99.4639 | 99.7923 | 0.1227 | 0.0742 |
| 6 | 0.5342 | 4.8251 | −2.8827 | −1.6229 | 6 | 99.4646 | 99.7926 | 0.1225 | 0.0735 |
| 7 | 0.5334 | 4.8178 | −2.8771 | −1.6033 | 7 | 99.4654 | 99.7929 | 0.1223 | 0.0727 |
| 8 | 0.5325 | 4.8099 | −2.87 | −1.582 | 8 | 99.4663 | 99.7933 | 0.122 | 0.0717 |
| 9 | 0.5315 | 4.8014 | −2.8612 | −1.5596 | 9 | 99.4672 | 99.7936 | 0.1216 | 0.0708 |
| 10 | 0.5306 | 4.7926 | −2.8506 | −1.5366 | 10 | 99.4682 | 99.794 | 0.1211 | 0.0698 |
| 11 | 0.5296 | 4.7838 | −2.8378 | −1.5136 | 11 | 99.4692 | 99.7944 | 0.1206 | 0.0688 |
| 12 | 0.5286 | 4.7751 | −2.8227 | −1.4913 | 12 | 99.4701 | 99.7948 | 0.1199 | 0.0679 |
| 13 | 0.5277 | 4.7669 | −2.8049 | −1.4703 | 13 | 99.4711 | 99.7951 | 0.1192 | 0.067 |
| 14 | 0.5269 | 4.7596 | −2.7842 | −1.4513 | 14 | 99.4719 | 99.7954 | 0.1183 | 0.0661 |
| 15 | 0.5262 | 4.7534 | −2.7604 | −1.4351 | 15 | 99.4725 | 99.7957 | 0.1172 | 0.0655 |
| 16 | 0.5257 | 4.7488 | −2.7333 | −1.4223 | 16 | 99.4731 | 99.7959 | 0.1161 | 0.0649 |
| 17 | 0.5254 | 4.7463 | −2.7026 | −1.4136 | 17 | 99.4733 | 99.796 | 0.1148 | 0.0645 |
| 18 | 0.5254 | 4.7463 | −2.6681 | −1.4097 | 18 | 99.4733 | 99.796 | 0.1133 | 0.0644 |
| 19 | 0.5258 | 4.7495 | −2.6297 | −1.4113 | 19 | 99.473 | 99.7959 | 0.1116 | 0.0644 |
| 20 | 0.5266 | 4.7563 | −2.5871 | −1.4191 | 20 | 99.4722 | 99.7956 | 0.1098 | 0.0648 |
| 21 | 0.5278 | 4.7675 | −2.5402 | −1.4336 | 21 | 99.471 | 99.7951 | 0.1078 | 0.0654 |
| 22 | 0.5296 | 4.7839 | −2.489 | −1.4557 | 22 | 99.4691 | 99.7944 | 0.1056 | 0.0664 |
| 23 | 0.5321 | 4.8062 | −2.4332 | −1.4858 | 23 | 99.4667 | 99.7934 | 0.1032 | 0.0677 |
| 24 | 0.5353 | 4.8353 | −2.373 | −1.5245 | 24 | 99.4634 | 99.7922 | 0.1006 | 0.0694 |
| 25 | 0.5394 | 4.8723 | −2.3081 | −1.5726 | 25 | 99.4593 | 99.7906 | 0.0978 | 0.0714 |
| 26 | 0.5445 | 4.9182 | −2.2386 | −1.6304 | 26 | 99.4543 | 99.7886 | 0.0948 | 0.0739 |
| 27 | 0.5507 | 4.9742 | −2.1645 | −1.6986 | 27 | 99.4481 | 99.7862 | 0.0917 | 0.0769 |
| 28 | 0.5581 | 5.0416 | −2.0858 | −1.7777 | 28 | 99.4406 | 99.7833 | 0.0883 | 0.0803 |
| 29 | 0.567 | 5.122 | −2.0025 | −1.8682 | 29 | 99.4317 | 99.7798 | 0.0847 | 0.0842 |
| 30 | 0.5775 | 5.2169 | −1.9148 | −1.9705 | 30 | 99.4212 | 99.7758 | 0.0809 | 0.0886 |
| 31 | 0.5899 | 5.3281 | −1.8227 | −2.0851 | 31 | 99.4089 | 99.771 | 0.077 | 0.0935 |
| 32 | 0.6042 | 5.4577 | −1.7263 | −2.2123 | 32 | 99.3945 | 99.7654 | 0.0729 | 0.099 |
| 33 | 0.6208 | 5.6078 | −1.6258 | −2.3526 | 33 | 99.3779 | 99.7589 | 0.0685 | 0.1051 |
| 34 | 0.64 | 5.7808 | −1.5214 | −2.5062 | 34 | 99.3587 | 99.7515 | 0.0641 | 0.1117 |
| 35 | 0.662 | 5.9794 | −1.4133 | −2.6735 | 35 | 99.3367 | 99.743 | 0.0594 | 0.1189 |
| 36 | 0.6871 | 6.2066 | −1.3016 | −2.8546 | 36 | 99.3116 | 99.7332 | 0.0546 | 0.1268 |
| 37 | 0.7158 | 6.4657 | −1.1867 | −3.0459 | 37 | 99.2829 | 99.7221 | 0.0497 | 0.1352 |
| 38 | 0.7484 | 6.7603 | −1.0688 | −3.2299 | 38 | 99.2503 | 99.7094 | 0.0446 | 0.1443 |
| 39 | 0.7854 | 7.0945 | −0.9482 | −3.3995 | 39 | 99.2133 | 99.695 | 0.0395 | 0.1539 |
| 40 | 0.8273 | 7.4726 | −0.8253 | −3.548 | 40 | 99.1714 | 99.6787 | 0.0342 | 0.1642 |
| 41 | 0.8745 | 7.8997 | −0.7003 | −3.6678 | 41 | 99.1241 | 99.6603 | 0.0288 | 0.1751 |
| 42 | 0.9279 | 8.3754 | −0.5592 | −3.7604 | 42 | 99.0708 | 99.6396 | 0.0234 | 0.1866 |
| 43 | 0.9879 | 8.8899 | −0.4162 | −3.8434 | 43 | 99.0108 | 99.6162 | 0.0179 | 0.1988 |
| 44 | 1.0553 | 9.4441 | −0.2829 | −3.9167 | 44 | 98.9433 | 99.59 | 0.0123 | 0.2115 |
| 45 | 1.1311 | 10.0387 | −0.16 | −3.9793 | 45 | 98.8676 | 99.5605 | 0.0068 | 0.2247 |
| 46 | 1.216 | 10.6748 | −0.0477 | −4.0308 | 46 | 98.7826 | 99.5274 | 0.0012 | 0.2386 |
| 47 | 1.3111 | 11.3531 | 0.0537 | −4.0708 | 47 | 98.6875 | 99.4903 | −0.0044 | 0.253 |
| 48 | 1.4176 | 12.0745 | 0.1444 | −4.099 | 48 | 98.581 | 99.4487 | −0.0099 | 0.2679 |
| 49 | 1.5367 | 12.8397 | 0.2244 | −4.1155 | 49 | 98.4619 | 99.4022 | −0.0154 | 0.2833 |
| 50 | 1.6699 | 13.6496 | 0.2942 | −4.1202 | 50 | 98.3287 | 99.3501 | −0.0208 | 0.2993 |
| 51 | 1.8186 | 14.5047 | 0.3541 | −4.1135 | 51 | 98.18 | 99.292 | −0.0262 | 0.3157 |
| 52 | 1.9846 | 15.406 | 0.4047 | −4.0957 | 52 | 98.014 | 99.227 | −0.0315 | 0.3325 |
| 53 | 2.1698 | 16.3541 | 0.4466 | −4.0673 | 53 | 97.8288 | 99.1543 | −0.0367 | 0.3498 |
| 54 | 2.3764 | 17.3501 | 0.4805 | −4.0288 | 54 | 97.6222 | 99.0732 | −0.0419 | 0.3674 |
| 55 | 2.6068 | 18.3947 | 0.5072 | −3.9809 | 55 | 97.3918 | 98.9826 | −0.0469 | 0.3855 |
| 56 | 2.8635 | 19.4889 | 0.5273 | −3.9242 | 56 | 97.135 | 98.8815 | −0.0519 | 0.404 |
| 57 | 3.1497 | 20.6339 | 0.5416 | −3.8593 | 57 | 96.8488 | 98.7685 | −0.0568 | 0.4228 |
| 58 | 3.4686 | 21.8306 | 0.5508 | −3.787 | 58 | 96.53 | 98.6424 | −0.0616 | 0.4419 |
| 59 | 3.8239 | 23.0804 | 0.5556 | −3.708 | 59 | 96.1747 | 98.5016 | −0.0663 | 0.4614 |
| 60 | 4.2196 | 24.3845 | 0.5567 | −3.6229 | 60 | 95.779 | 98.3443 | −0.071 | 0.4812 |

| | | | | |
|---|---|---|---|---|
| Reflectance color shift range between normal incidence (AOI = 0 degrees) to AOI = 36 degrees | Low: 0.0018 High: 1.97861 | | Transmittance color shift range from normal incidence (AOI = 0) to AOI = 60 | Low: 0.0001 High: 0.4492 |
| Reflectance color shift range between normal incidence (AOI = 0 degrees) and AOI = 37-60 degrees | Low: 2.1861 High: 4.1114 | | | |

TABLE 24B

One surface reflectance and transmitted color coordinates (Y, L*, a* and b*) using illuminant F2 for Example 20.

| | Reflectance, F2 | | | | | Transmittance, F2 | | | |
|---|---|---|---|---|---|---|---|---|---|
| AOI | Y | L* | a* | b* | AOI | Y | L* | a* | b* |
| 0 | 0.4711 | 4.2557 | −1.6317 | −1.9631 | 0 | 99.5279 | 99.8172 | 0.0693 | 0.0885 |
| 1 | 0.4711 | 4.2552 | −1.6304 | −1.9618 | 1 | 99.5279 | 99.8172 | 0.0692 | 0.0884 |
| 2 | 0.4709 | 4.2538 | −1.6264 | −1.9583 | 2 | 99.5281 | 99.8172 | 0.069 | 0.0883 |
| 3 | 0.4707 | 4.2515 | −1.6197 | −1.9524 | 3 | 99.5283 | 99.8173 | 0.0687 | 0.088 |
| 4 | 0.4703 | 4.2482 | −1.6104 | −1.9443 | 4 | 99.5287 | 99.8175 | 0.0683 | 0.0877 |
| 5 | 0.4699 | 4.2443 | −1.5983 | −1.9342 | 5 | 99.5291 | 99.8176 | 0.0678 | 0.0872 |
| 6 | 0.4694 | 4.2397 | −1.5835 | −1.9224 | 6 | 99.5296 | 99.8178 | 0.0672 | 0.0867 |
| 7 | 0.4688 | 4.2346 | −1.5659 | −1.9091 | 7 | 99.5302 | 99.8181 | 0.0664 | 0.0862 |
| 8 | 0.4682 | 4.2291 | −1.5454 | −1.8946 | 8 | 99.5308 | 99.8183 | 0.0656 | 0.0855 |
| 9 | 0.4676 | 4.2236 | −1.5221 | −1.8792 | 9 | 99.5314 | 99.8185 | 0.0646 | 0.0849 |
| 10 | 0.467 | 4.2181 | −1.4959 | −1.8633 | 10 | 99.532 | 99.8188 | 0.0634 | 0.0842 |
| 11 | 0.4664 | 4.213 | −1.4668 | −1.8472 | 11 | 99.5326 | 99.819 | 0.0622 | 0.0835 |
| 12 | 0.4659 | 4.2086 | −1.4348 | −1.8314 | 12 | 99.5331 | 99.8192 | 0.0608 | 0.0828 |
| 13 | 0.4655 | 4.2051 | −1.3999 | −1.8161 | 13 | 99.5335 | 99.8193 | 0.0593 | 0.0822 |
| 14 | 0.4653 | 4.2031 | −1.3621 | −1.8019 | 14 | 99.5337 | 99.8194 | 0.0577 | 0.0816 |
| 15 | 0.4653 | 4.2027 | −1.3216 | −1.789 | 15 | 99.5337 | 99.8194 | 0.0559 | 0.081 |
| 16 | 0.4655 | 4.2046 | −1.2783 | −1.7778 | 16 | 99.5335 | 99.8193 | 0.0541 | 0.0805 |
| 17 | 0.466 | 4.2092 | −1.2324 | −1.7688 | 17 | 99.533 | 99.8191 | 0.0521 | 0.0802 |
| 18 | 0.4669 | 4.217 | −1.184 | −1.7622 | 18 | 99.5321 | 99.8188 | 0.05 | 0.0799 |
| 19 | 0.4681 | 4.2287 | −1.1333 | −1.7585 | 19 | 99.5308 | 99.8183 | 0.0479 | 0.0797 |
| 20 | 0.4699 | 4.2448 | −1.0805 | −1.758 | 20 | 99.529 | 99.8176 | 0.0456 | 0.0797 |
| 21 | 0.4723 | 4.2661 | −1.0257 | −1.7611 | 21 | 99.5267 | 99.8167 | 0.0432 | 0.0799 |
| 22 | 0.4753 | 4.2934 | −0.9693 | −1.7683 | 22 | 99.5237 | 99.8155 | 0.0408 | 0.0802 |
| 23 | 0.4791 | 4.3274 | −0.9115 | −1.78 | 23 | 99.5199 | 99.8141 | 0.0383 | 0.0807 |
| 24 | 0.4837 | 4.3692 | −0.8526 | −1.7966 | 24 | 99.5153 | 99.8123 | 0.0358 | 0.0814 |
| 25 | 0.4893 | 4.4197 | −0.793 | −1.8187 | 25 | 99.5097 | 99.8101 | 0.0332 | 0.0824 |
| 26 | 0.496 | 4.4801 | −0.7328 | −1.8468 | 26 | 99.503 | 99.8075 | 0.0307 | 0.0836 |
| 27 | 0.5039 | 4.5514 | −0.6726 | −1.8817 | 27 | 99.4951 | 99.8044 | 0.0281 | 0.0851 |
| 28 | 0.5131 | 4.6352 | −0.6127 | −1.9239 | 28 | 99.4858 | 99.8008 | 0.0255 | 0.0869 |
| 29 | 0.524 | 4.7328 | −0.5534 | −1.9742 | 29 | 99.475 | 99.7966 | 0.023 | 0.0891 |
| 30 | 0.5365 | 4.8458 | −0.4952 | −2.0334 | 30 | 99.4625 | 99.7918 | 0.0205 | 0.0917 |
| 31 | 0.5509 | 4.976 | −0.4384 | −2.1023 | 31 | 99.4481 | 99.7862 | 0.018 | 0.0947 |
| 32 | 0.5674 | 5.1253 | −0.3835 | −2.182 | 32 | 99.4315 | 99.7798 | 0.0157 | 0.0981 |
| 33 | 0.5863 | 5.2958 | −0.3307 | −2.2734 | 33 | 99.4126 | 99.7724 | 0.0134 | 0.102 |
| 34 | 0.6078 | 5.4899 | −0.2806 | −2.3774 | 34 | 99.3911 | 99.7641 | 0.0112 | 0.1065 |
| 35 | 0.6321 | 5.7101 | −0.2335 | −2.4952 | 35 | 99.3668 | 99.7546 | 0.0092 | 0.1116 |
| 36 | 0.6597 | 5.9593 | −0.1897 | −2.6277 | 36 | 99.3392 | 99.7439 | 0.0073 | 0.1174 |
| 37 | 0.6909 | 6.2406 | −0.1497 | −2.7761 | 37 | 99.308 | 99.7318 | 0.0056 | 0.1238 |
| 38 | 0.726 | 6.5575 | −0.1138 | −2.9365 | 38 | 99.2729 | 99.7182 | 0.0041 | 0.131 |
| 39 | 0.7654 | 6.9139 | −0.0823 | −3.0886 | 39 | 99.2335 | 99.7029 | 0.0027 | 0.1389 |
| 40 | 0.8097 | 7.314 | −0.0556 | −3.2243 | 40 | 99.1892 | 99.6856 | 0.0016 | 0.1477 |
| 41 | 0.8594 | 7.7626 | −0.0341 | −3.3366 | 41 | 99.1395 | 99.6663 | 0.0006 | 0.1573 |
| 42 | 0.915 | 8.262 | −0.0175 | −3.4219 | 42 | 99.0839 | 99.6447 | −0.0001 | 0.1678 |
| 43 | 0.9772 | 8.7997 | −0.007 | −3.5027 | 43 | 99.0217 | 99.6205 | −0.0005 | 0.1793 |
| 44 | 1.0467 | 9.3743 | −0.0026 | −3.5818 | 44 | 98.9522 | 99.5934 | −0.0007 | 0.1917 |
| 45 | 1.1243 | 9.9866 | −0.004 | −3.6584 | 45 | 98.8746 | 99.5632 | −0.0006 | 0.2051 |
| 46 | 1.2109 | 10.6374 | −0.0105 | −3.7314 | 46 | 98.788 | 99.5294 | −0.0003 | 0.2196 |
| 47 | 1.3075 | 11.3276 | −0.0214 | −3.7999 | 47 | 98.6914 | 99.4918 | 0.0004 | 0.2351 |
| 48 | 1.4151 | 12.058 | −0.0362 | −3.863 | 48 | 98.5837 | 99.4498 | 0.0013 | 0.2517 |
| 49 | 1.5351 | 12.8295 | −0.0542 | −3.92 | 49 | 98.4637 | 99.4029 | 0.0025 | 0.2693 |
| 50 | 1.6687 | 13.6429 | −0.0747 | −3.97 | 50 | 98.3301 | 99.3507 | 0.0041 | 0.288 |
| 51 | 1.8176 | 14.4992 | −0.0972 | −4.0126 | 51 | 98.1812 | 99.2924 | 0.006 | 0.3077 |
| 52 | 1.9833 | 15.3994 | −0.121 | −4.0471 | 52 | 98.0155 | 99.2275 | 0.0081 | 0.3286 |
| 53 | 2.1678 | 16.3444 | −0.1457 | −4.0733 | 53 | 97.831 | 99.1552 | 0.0106 | 0.3505 |
| 54 | 2.3732 | 17.3352 | −0.1706 | −4.0907 | 54 | 97.6256 | 99.0745 | 0.0135 | 0.3735 |
| 55 | 2.6019 | 18.3731 | −0.1953 | −4.0992 | 55 | 97.397 | 98.9846 | 0.0166 | 0.3976 |
| 56 | 2.8564 | 19.4592 | −0.2193 | −4.0987 | 56 | 97.1424 | 98.8844 | 0.02 | 0.4227 |
| 57 | 3.1397 | 20.5949 | −0.2424 | −4.0891 | 57 | 96.8591 | 98.7726 | 0.0238 | 0.4488 |
| 58 | 3.4551 | 21.7814 | −0.264 | −4.0706 | 58 | 96.5437 | 98.6479 | 0.0278 | 0.476 |
| 59 | 3.8062 | 23.0202 | −0.2839 | −4.0431 | 59 | 96.1926 | 98.5087 | 0.0321 | 0.5041 |
| 60 | 4.1972 | 24.3129 | −0.3019 | −4.007 | 60 | 95.8016 | 98.3534 | 0.0366 | 0.5332 |

Reflectance color shift range between normal incidence (AOI = 0 degrees) to AOI = 39 degrees   Low: 0.0018   High: 1.9150

Transmittance color shift range from normal incidence (AOI = 0) to AOI = 60   Low: 0.0001   High: 0.4459

Reflectance color shift range between normal incidence (AOI = 0 degrees) and AOI = 40-60 degrees   Low: 2.1859   High: 2.5810

TABLE 24C

Two surface reflectance and transmitted color coordinates (Y, L*, a* and b*) using illuminant D65 for Example 20.

| | Reflectance, D65 | | | | | Transmittance, D65 | | | |
|---|---|---|---|---|---|---|---|---|---|
| AOI | Y | L* | a* | b* | AOI | Y | L* | a* | b* |
| 0 | 4.5668 | 25.4632 | −0.9446 | −1.0023 | 0 | 95.4319 | 98.2061 | 0.1224 | 0.1381 |
| 1 | 4.5668 | 25.463 | −0.9445 | −1.0018 | 1 | 95.432 | 98.2061 | 0.1224 | 0.138 |
| 2 | 4.5666 | 25.4624 | −0.9442 | −1.0002 | 2 | 95.4322 | 98.2062 | 0.1224 | 0.1378 |
| 3 | 4.5663 | 25.4615 | −0.9438 | −0.9977 | 3 | 95.4325 | 98.2063 | 0.1223 | 0.1375 |
| 4 | 4.5658 | 25.4602 | −0.943 | −0.9942 | 4 | 95.4329 | 98.2065 | 0.1222 | 0.137 |
| 5 | 4.5653 | 25.4587 | −0.942 | −0.9898 | 5 | 95.4334 | 98.2067 | 0.1221 | 0.1364 |
| 6 | 4.5648 | 25.457 | −0.9407 | −0.9847 | 6 | 95.434 | 98.2069 | 0.1219 | 0.1357 |
| 7 | 4.5642 | 25.4553 | −0.939 | −0.9789 | 7 | 95.4345 | 98.2071 | 0.1216 | 0.1349 |
| 8 | 4.5636 | 25.4535 | −0.9368 | −0.9727 | 8 | 95.4351 | 98.2073 | 0.1213 | 0.134 |
| 9 | 4.5631 | 25.452 | −0.9341 | −0.966 | 9 | 95.4356 | 98.2076 | 0.121 | 0.1331 |
| 10 | 4.5627 | 25.4508 | −0.9307 | −0.9592 | 10 | 95.436 | 98.2077 | 0.1205 | 0.1322 |
| 11 | 4.5625 | 25.4501 | −0.9267 | −0.9524 | 11 | 95.4362 | 98.2078 | 0.12 | 0.1313 |
| 12 | 4.5625 | 25.4501 | −0.9218 | −0.9457 | 12 | 95.4362 | 98.2078 | 0.1194 | 0.1304 |
| 13 | 4.5628 | 25.451 | −0.9161 | −0.9395 | 13 | 95.4359 | 98.2077 | 0.1186 | 0.1295 |
| 14 | 4.5635 | 25.4532 | −0.9094 | −0.9337 | 14 | 95.4352 | 98.2074 | 0.1178 | 0.1288 |
| 15 | 4.5647 | 25.4568 | −0.9016 | −0.9288 | 15 | 95.434 | 98.2069 | 0.1168 | 0.1281 |
| 16 | 4.5665 | 25.4622 | −0.8926 | −0.9247 | 16 | 95.4322 | 98.2062 | 0.1156 | 0.1276 |
| 17 | 4.569 | 25.4697 | −0.8824 | −0.9219 | 17 | 95.4297 | 98.2052 | 0.1143 | 0.1273 |
| 18 | 4.5723 | 25.4798 | −0.8708 | −0.9203 | 18 | 95.4264 | 98.2039 | 0.1129 | 0.1271 |
| 19 | 4.5766 | 25.4927 | −0.8578 | −0.9203 | 19 | 95.4221 | 98.2022 | 0.1113 | 0.1272 |
| 20 | 4.582 | 25.5091 | −0.8434 | −0.922 | 20 | 95.4167 | 98.2 | 0.1095 | 0.1275 |
| 21 | 4.5887 | 25.5293 | −0.8275 | −0.9255 | 21 | 95.41 | 98.1973 | 0.1075 | 0.1282 |
| 22 | 4.5969 | 25.5539 | −0.8099 | −0.931 | 22 | 95.4018 | 98.1941 | 0.1053 | 0.1291 |
| 23 | 4.6067 | 25.5836 | −0.7908 | −0.9386 | 23 | 95.392 | 98.1901 | 0.103 | 0.1303 |
| 24 | 4.6184 | 25.6188 | −0.77 | −0.9484 | 24 | 95.3802 | 98.1855 | 0.1004 | 0.1319 |
| 25 | 4.6323 | 25.6605 | −0.7475 | −0.9606 | 25 | 95.3664 | 98.1799 | 0.0977 | 0.1338 |
| 26 | 4.6486 | 25.7092 | −0.7234 | −0.9751 | 26 | 95.3501 | 98.1734 | 0.0947 | 0.1361 |
| 27 | 4.6675 | 25.7658 | −0.6976 | −0.9922 | 27 | 95.3311 | 98.1659 | 0.0916 | 0.1389 |
| 28 | 4.6895 | 25.8313 | −0.6702 | −1.0117 | 28 | 95.3092 | 98.1571 | 0.0882 | 0.142 |
| 29 | 4.7149 | 25.9065 | −0.6412 | −1.0336 | 29 | 95.2838 | 98.147 | 0.0847 | 0.1456 |
| 30 | 4.7439 | 25.9924 | −0.6106 | −1.058 | 30 | 95.2547 | 98.1353 | 0.0809 | 0.1496 |
| 31 | 4.7772 | 26.0903 | −0.5786 | −1.0847 | 31 | 95.2215 | 98.1221 | 0.077 | 0.1541 |
| 32 | 4.8151 | 26.2013 | −0.5451 | −1.1137 | 32 | 95.1836 | 98.1069 | 0.0729 | 0.159 |
| 33 | 4.8581 | 26.3265 | −0.5104 | −1.1447 | 33 | 95.1406 | 98.0897 | 0.0686 | 0.1644 |
| 34 | 4.9068 | 26.4675 | −0.4744 | −1.1775 | 34 | 95.0919 | 98.0703 | 0.0641 | 0.1702 |
| 35 | 4.9618 | 26.6256 | −0.4374 | −1.2119 | 35 | 95.0369 | 98.0483 | 0.0595 | 0.1765 |
| 36 | 5.0238 | 26.8023 | −0.3995 | −1.2476 | 36 | 94.9749 | 98.0235 | 0.0547 | 0.1832 |
| 37 | 5.0934 | 26.9993 | −0.3608 | −1.2842 | 37 | 94.9052 | 97.9956 | 0.0498 | 0.1903 |
| 38 | 5.1716 | 27.2182 | −0.3217 | −1.3213 | 38 | 94.827 | 97.9643 | 0.0447 | 0.1979 |
| 39 | 5.2592 | 27.4608 | −0.2821 | −1.3584 | 39 | 94.7394 | 97.9292 | 0.0395 | 0.2058 |
| 40 | 5.3571 | 27.7289 | −0.2424 | −1.395 | 40 | 94.6415 | 97.8899 | 0.0342 | 0.214 |
| 41 | 5.4665 | 28.0244 | −0.2029 | −1.4306 | 41 | 94.5321 | 97.846 | 0.0288 | 0.2225 |
| 42 | 5.5884 | 28.3493 | −0.1636 | −1.4645 | 42 | 94.4102 | 97.797 | 0.0234 | 0.2313 |
| 43 | 5.7242 | 28.7057 | −0.1249 | −1.4961 | 43 | 94.2744 | 97.7424 | 0.0178 | 0.2403 |
| 44 | 5.8753 | 29.0956 | −0.0869 | −1.5249 | 44 | 94.1233 | 97.6817 | 0.0122 | 0.2494 |
| 45 | 6.0431 | 29.521 | −0.0499 | −1.5501 | 45 | 93.9554 | 97.614 | 0.0065 | 0.2585 |
| 46 | 6.2295 | 29.9842 | −0.0142 | −1.5712 | 46 | 93.7691 | 97.5389 | 0.0008 | 0.2676 |
| 47 | 6.4362 | 30.4872 | 0.0202 | −1.5877 | 47 | 93.5624 | 97.4554 | −0.0049 | 0.2767 |
| 48 | 6.6652 | 31.0322 | 0.0531 | −1.5989 | 48 | 93.3334 | 97.3627 | −0.0106 | 0.2855 |
| 49 | 6.9188 | 31.6213 | 0.0842 | −1.6044 | 49 | 93.0798 | 97.26 | −0.0164 | 0.2941 |
| 50 | 7.1993 | 32.2565 | 0.1136 | −1.6038 | 50 | 92.7992 | 97.146 | −0.0222 | 0.3023 |
| 51 | 7.5096 | 32.9399 | 0.141 | −1.5968 | 51 | 92.489 | 97.0198 | −0.028 | 0.3101 |
| 52 | 7.8523 | 33.6733 | 0.1666 | −1.5833 | 52 | 92.1462 | 96.88 | −0.0338 | 0.3174 |
| 53 | 8.2307 | 34.4588 | 0.1902 | −1.563 | 53 | 91.7678 | 96.7253 | −0.0397 | 0.324 |
| 54 | 8.6483 | 35.2981 | 0.2118 | −1.5361 | 54 | 91.3502 | 96.554 | −0.0456 | 0.3298 |
| 55 | 9.1088 | 36.1929 | 0.2317 | −1.5027 | 55 | 90.8897 | 96.3646 | −0.0516 | 0.3349 |
| 56 | 9.6163 | 37.1447 | 0.2497 | −1.4629 | 56 | 90.3822 | 96.1551 | −0.0577 | 0.339 |
| 57 | 10.1752 | 38.1551 | 0.2659 | −1.4172 | 57 | 89.8232 | 95.9234 | −0.0639 | 0.3422 |
| 58 | 10.7904 | 39.2253 | 0.2806 | −1.366 | 58 | 89.208 | 95.6673 | −0.0703 | 0.3443 |
| 59 | 11.4672 | 40.3565 | 0.2937 | −1.3099 | 59 | 88.5312 | 95.3842 | −0.0769 | 0.3453 |
| 60 | 12.2111 | 41.5497 | 0.3055 | −1.2493 | 60 | 87.7873 | 95.0713 | −0.0837 | 0.3451 |
| 61 | 13.1957 | 43.0567 | −0.2359 | −0.5057 | 61 | 86.8042 | 94.6551 | 0.0663 | 0.1464 |
| 62 | 14.0946 | 44.3683 | −0.2259 | −0.4794 | 62 | 85.9053 | 94.2719 | 0.0669 | 0.146 |
| 63 | 15.0802 | 45.7439 | −0.2148 | −0.4519 | 63 | 84.9197 | 93.8485 | 0.067 | 0.1451 |
| 64 | 16.16 | 47.1837 | −0.2024 | −0.4234 | 64 | 83.8399 | 93.3809 | 0.0667 | 0.1435 |
| 65 | 17.3418 | 48.6879 | −0.1889 | −0.3943 | 65 | 82.6581 | 92.8645 | 0.0658 | 0.1414 |
| 66 | 18.634 | 50.2563 | −0.1743 | −0.3648 | 66 | 81.3659 | 92.2943 | 0.0644 | 0.1387 |
| 67 | 20.0454 | 51.8886 | −0.1589 | −0.3353 | 67 | 79.9545 | 91.6644 | 0.0623 | 0.1355 |
| 68 | 21.5851 | 53.584 | −0.1428 | −0.306 | 68 | 78.4148 | 90.9689 | 0.0595 | 0.1316 |
| 69 | 23.2625 | 55.3417 | −0.1262 | −0.2772 | 69 | 76.7374 | 90.2006 | 0.056 | 0.1272 |
| 70 | 25.0872 | 57.1602 | −0.1093 | −0.2493 | 70 | 74.9128 | 89.3521 | 0.0518 | 0.1223 |
| 71 | 27.0688 | 59.038 | −0.0924 | −0.2223 | 71 | 72.9311 | 88.4148 | 0.0468 | 0.1169 |
| 72 | 29.2172 | 60.9728 | −0.0758 | −0.1966 | 72 | 70.7827 | 87.3793 | 0.041 | 0.111 |

TABLE 24C-continued

Two surface reflectance and transmitted color coordinates (Y, L*, a* and b*) using illuminant D65 for Example 20.

| | Reflectance, D65 | | | | | Transmittance, D65 | | | |
|---|---|---|---|---|---|---|---|---|---|
| AOI | Y | L* | a* | b* | AOI | Y | L* | a* | b* |
| 73 | 31.5415 | 62.9622 | −0.0596 | −0.1722 | 73 | 68.4584 | 86.2351 | 0.0346 | 0.1048 |
| 74 | 34.0508 | 65.0029 | −0.0443 | −0.1495 | 74 | 65.9491 | 84.9704 | 0.0275 | 0.0983 |
| 75 | 36.7532 | 67.0914 | −0.03 | −0.1284 | 75 | 63.2467 | 83.572 | 0.0199 | 0.0916 |

| Reflectance color shift range between normal incidence (AOI = 0 degrees) to AOI = 75 degrees | Low: 0.0005 High: 1.2800 | Transmittance color shift range from normal incidence (AOI = 0) to AOI = 75 | Low: 0.0001 High: 0.2921 |
|---|---|---|---|

TABLE 24D

Two surface reflectance and transmitted color coordinates (Y, L*, a* and b*) using illuminant F2 for Example 20.

| | Reflectance, F2 | | | | | Transmittance, F2 | | | |
|---|---|---|---|---|---|---|---|---|---|
| AOI | Y | L* | a* | b* | AOI | Y | L* | a* | b* |
| 0 | 4.4977 | 25.2528 | −0.5382 | −1.1683 | 0 | 95.5013 | 98.2337 | 0.0691 | 0.1594 |
| 1 | 4.4976 | 25.2527 | −0.5378 | −1.1679 | 1 | 95.5013 | 98.2338 | 0.0691 | 0.1594 |
| 2 | 4.4975 | 25.2522 | −0.5366 | −1.1668 | 2 | 95.5015 | 98.2338 | 0.0689 | 0.1592 |
| 3 | 4.4972 | 25.2515 | −0.5345 | −1.1651 | 3 | 95.5017 | 98.2339 | 0.0686 | 0.159 |
| 4 | 4.4969 | 25.2506 | −0.5316 | −1.1627 | 4 | 95.502 | 98.234 | 0.0682 | 0.1587 |
| 5 | 4.4966 | 25.2495 | −0.5278 | −1.1598 | 5 | 95.5024 | 98.2342 | 0.0678 | 0.1583 |
| 6 | 4.4962 | 25.2484 | −0.5232 | −1.1563 | 6 | 95.5027 | 98.2343 | 0.0671 | 0.1578 |
| 7 | 4.4958 | 25.2473 | −0.5177 | −1.1523 | 7 | 95.5031 | 98.2345 | 0.0664 | 0.1572 |
| 8 | 4.4955 | 25.2463 | −0.5113 | −1.148 | 8 | 95.5034 | 98.2346 | 0.0656 | 0.1567 |
| 9 | 4.4953 | 25.2457 | −0.5039 | −1.1435 | 9 | 95.5036 | 98.2347 | 0.0646 | 0.156 |
| 10 | 4.4953 | 25.2455 | −0.4957 | −1.1387 | 10 | 95.5037 | 98.2347 | 0.0636 | 0.1554 |
| 11 | 4.4954 | 25.2459 | −0.4865 | −1.1339 | 11 | 95.5035 | 98.2346 | 0.0624 | 0.1548 |
| 12 | 4.4959 | 25.2473 | −0.4764 | −1.129 | 12 | 95.5031 | 98.2345 | 0.0611 | 0.1541 |
| 13 | 4.4967 | 25.2497 | −0.4653 | −1.1244 | 13 | 95.5023 | 98.2341 | 0.0596 | 0.1535 |
| 14 | 4.4979 | 25.2536 | −0.4533 | −1.1199 | 14 | 95.501 | 98.2336 | 0.0581 | 0.1529 |
| 15 | 4.4997 | 25.2591 | −0.4404 | −1.1158 | 15 | 95.4992 | 98.2329 | 0.0564 | 0.1524 |
| 16 | 4.5022 | 25.2666 | −0.4265 | −1.112 | 16 | 95.4968 | 98.2319 | 0.0547 | 0.152 |
| 17 | 4.5054 | 25.2765 | −0.4118 | −1.1088 | 17 | 95.4935 | 98.2306 | 0.0528 | 0.1516 |
| 18 | 4.5095 | 25.2891 | −0.3963 | −1.1062 | 18 | 95.4894 | 98.229 | 0.0508 | 0.1514 |
| 19 | 4.5147 | 25.3049 | −0.38 | −1.1043 | 19 | 95.4842 | 98.2269 | 0.0487 | 0.1512 |
| 20 | 4.5211 | 25.3243 | −0.363 | −1.1031 | 20 | 95.4778 | 98.2244 | 0.0465 | 0.1512 |
| 21 | 4.5288 | 25.3479 | −0.3453 | −1.1028 | 21 | 95.4701 | 98.2213 | 0.0443 | 0.1514 |
| 22 | 4.5382 | 25.3763 | −0.3271 | −1.1034 | 22 | 95.4608 | 98.2176 | 0.042 | 0.1517 |
| 23 | 4.5492 | 25.4099 | −0.3084 | −1.1051 | 23 | 95.4497 | 98.2132 | 0.0396 | 0.1522 |
| 24 | 4.5623 | 25.4495 | −0.2893 | −1.1078 | 24 | 95.4366 | 98.2079 | 0.0372 | 0.1528 |
| 25 | 4.5776 | 25.4957 | −0.27 | −1.1117 | 25 | 95.4213 | 98.2018 | 0.0347 | 0.1537 |
| 26 | 4.5954 | 25.5494 | −0.2505 | −1.1169 | 26 | 95.4035 | 98.1947 | 0.0322 | 0.1548 |
| 27 | 4.616 | 25.6114 | −0.231 | −1.1235 | 27 | 95.3829 | 98.1865 | 0.0298 | 0.1562 |
| 28 | 4.6396 | 25.6824 | −0.2116 | −1.1315 | 28 | 95.3592 | 98.1771 | 0.0273 | 0.1579 |
| 29 | 4.6668 | 25.7636 | −0.1925 | −1.1411 | 29 | 95.3321 | 98.1662 | 0.0249 | 0.1598 |
| 30 | 4.6978 | 25.8558 | −0.1737 | −1.1524 | 30 | 95.3011 | 98.1539 | 0.0225 | 0.1621 |
| 31 | 4.733 | 25.9601 | −0.1555 | −1.1654 | 31 | 95.2659 | 98.1398 | 0.0201 | 0.1648 |
| 32 | 4.7729 | 26.0778 | −0.1379 | −1.1802 | 32 | 95.2259 | 98.1238 | 0.0179 | 0.1678 |
| 33 | 4.8181 | 26.2101 | −0.1211 | −1.1969 | 33 | 95.1808 | 98.1058 | 0.0157 | 0.1713 |
| 34 | 4.869 | 26.3582 | −0.1052 | −1.2155 | 34 | 95.1299 | 98.0855 | 0.0136 | 0.1752 |
| 35 | 4.9262 | 26.5235 | −0.0903 | −1.236 | 35 | 95.0726 | 98.0626 | 0.0117 | 0.1795 |
| 36 | 4.9905 | 26.7076 | −0.0765 | −1.2584 | 36 | 95.0084 | 98.0369 | 0.0098 | 0.1844 |
| 37 | 5.0624 | 26.9118 | −0.064 | −1.2826 | 37 | 94.9364 | 98.0081 | 0.0082 | 0.1897 |
| 38 | 5.1429 | 27.138 | −0.0527 | −1.3084 | 38 | 94.856 | 97.9759 | 0.0067 | 0.1956 |
| 39 | 5.2327 | 27.3877 | −0.0428 | −1.3356 | 39 | 94.7661 | 97.9399 | 0.0053 | 0.2021 |
| 40 | 5.3328 | 27.6627 | −0.0342 | −1.364 | 40 | 94.666 | 97.8997 | 0.0041 | 0.2091 |
| 41 | 5.4443 | 27.9649 | −0.0271 | −1.3933 | 41 | 94.5545 | 97.855 | 0.0031 | 0.2166 |
| 42 | 5.5683 | 28.2961 | −0.0214 | −1.423 | 42 | 94.4305 | 97.8052 | 0.0023 | 0.2246 |
| 43 | 5.706 | 28.6582 | −0.0171 | −1.4526 | 43 | 94.2928 | 97.7499 | 0.0017 | 0.2332 |
| 44 | 5.8588 | 29.0534 | −0.0141 | −1.4817 | 44 | 94.14 | 97.6884 | 0.0013 | 0.2423 |
| 45 | 6.0282 | 29.4836 | −0.0124 | −1.5097 | 45 | 93.9706 | 97.6201 | 0.0011 | 0.2518 |
| 46 | 6.216 | 29.9509 | −0.0119 | −1.5359 | 46 | 93.7828 | 97.5444 | 0.001 | 0.2616 |
| 47 | 6.4238 | 30.4573 | −0.0124 | −1.5597 | 47 | 93.575 | 97.4605 | 0.0012 | 0.2719 |
| 48 | 6.6536 | 31.0051 | −0.0138 | −1.5805 | 48 | 93.3451 | 97.3675 | 0.0015 | 0.2823 |
| 49 | 6.9078 | 31.5961 | −0.0159 | −1.5976 | 49 | 93.091 | 97.2645 | 0.0019 | 0.293 |
| 50 | 7.1886 | 32.2326 | −0.0185 | −1.6105 | 50 | 92.8101 | 97.1505 | 0.0024 | 0.3037 |

TABLE 24D-continued

Two surface reflectance and transmitted color coordinates (Y, L*, a* and b*) using illuminant F2 for Example 20.

| | Reflectance, F2 | | | | Transmittance, F2 | | | |
|---|---|---|---|---|---|---|---|---|
| AOI | Y | L* | a* | b* | AOI | Y | L* | a* | b* |
| 51 | 7.4988 | 32.9164 | −0.0215 | −1.6184 | 51 | 92.5 | 97.0243 | 0.0031 | 0.3145 |
| 52 | 7.8411 | 33.6497 | −0.0247 | −1.621 | 52 | 92.1577 | 96.8847 | 0.0038 | 0.3251 |
| 53 | 8.2187 | 34.4343 | −0.0278 | −1.6178 | 53 | 91.78 | 96.7303 | 0.0046 | 0.3355 |
| 54 | 8.6351 | 35.2721 | −0.0306 | −1.6084 | 54 | 91.3636 | 96.5596 | 0.0054 | 0.3455 |
| 55 | 9.0941 | 36.1648 | −0.0329 | −1.5926 | 55 | 90.9046 | 96.3708 | 0.0061 | 0.3551 |
| 56 | 9.5996 | 37.1141 | −0.0346 | −1.5703 | 56 | 90.3991 | 96.1621 | 0.0068 | 0.364 |
| 57 | 10.1563 | 38.1215 | −0.0354 | −1.5414 | 57 | 89.8424 | 95.9314 | 0.0073 | 0.3723 |
| 58 | 10.7689 | 39.1884 | −0.0353 | −1.5062 | 58 | 89.2298 | 95.6764 | 0.0077 | 0.3797 |
| 59 | 11.4426 | 40.3162 | −0.0341 | −1.4648 | 59 | 88.5561 | 95.3946 | 0.0078 | 0.3861 |
| 60 | 12.1832 | 41.5059 | −0.0318 | −1.4175 | 60 | 87.8154 | 95.0832 | 0.0075 | 0.3915 |
| 61 | 13.191 | 43.0497 | −0.3225 | −0.5066 | 61 | 86.8089 | 94.6571 | 0.0912 | 0.1466 |
| 62 | 14.0869 | 44.3573 | −0.3206 | −0.4919 | 62 | 85.913 | 94.2752 | 0.0954 | 0.1498 |
| 63 | 15.0693 | 45.7289 | −0.316 | −0.4754 | 63 | 84.9307 | 93.8532 | 0.0992 | 0.1525 |
| 64 | 16.1456 | 47.1649 | −0.309 | −0.4571 | 64 | 83.8543 | 93.3872 | 0.1024 | 0.1548 |
| 65 | 17.3238 | 48.6655 | −0.2996 | −0.437 | 65 | 82.6761 | 92.8725 | 0.1051 | 0.1566 |
| 66 | 18.6124 | 50.2306 | −0.288 | −0.4155 | 66 | 81.3876 | 92.3039 | 0.1071 | 0.1577 |
| 67 | 20.02 | 51.8599 | −0.2744 | −0.3926 | 67 | 79.9799 | 91.6758 | 0.1084 | 0.1583 |
| 68 | 21.556 | 53.5527 | −0.259 | −0.3686 | 68 | 78.444 | 90.9821 | 0.1089 | 0.1581 |
| 69 | 23.2297 | 55.3082 | −0.2422 | −0.3438 | 69 | 76.7702 | 90.2157 | 0.1086 | 0.1573 |
| 70 | 25.051 | 57.1251 | −0.2243 | −0.3184 | 70 | 74.949 | 89.3691 | 0.1074 | 0.1557 |
| 71 | 27.0295 | 59.0016 | −0.2055 | −0.2928 | 71 | 72.9705 | 88.4336 | 0.1053 | 0.1533 |
| 72 | 29.1749 | 60.9357 | −0.1861 | −0.2672 | 72 | 70.825 | 87.3999 | 0.1024 | 0.1503 |
| 73 | 31.4968 | 62.9248 | −0.1666 | −0.242 | 73 | 68.5031 | 86.2574 | 0.0986 | 0.1465 |
| 74 | 34.0041 | 64.9658 | −0.1473 | −0.2173 | 74 | 65.9959 | 84.9943 | 0.094 | 0.142 |
| 75 | 36.7049 | 67.0551 | −0.1284 | −0.1934 | 75 | 63.295 | 83.5974 | 0.0886 | 0.1369 |

Reflectance color shift range between normal incidence (AOI = 0 degrees) to AOI = 75 degrees    Low: 0.0005    High: 1.0575

Transmittance color shift range from normal incidence (AOI = 0) to AOI = 75    Low: 0.0001    High: 0.2401

Example 21

Example 21 included a 10-layer anti-reflective coating disposed on a strengthened aluminosilicate glass substrate having a nominal composition of about 58 mol % $SiO_2$, 17 mol % $Al_2O_3$, 17 mol % $Na_2O$, 3 mol % MgO, 0.1 mol % SnO, and 6.5 mol % $P_2O_5$. The thicknesses of the layers are shown in Table 25.

The $SiO_2$ and $AlO_xN_y$ layers were made by reactive sputtering in a coater made by Optorun Co. Ltd. $SiO_2$ was deposited by DC reactive sputtering from a Si target with ion assist; $AlO_xN_y$ material was deposited by DC reactive sputtering combined with RF superimposed DC sputtering with ion assist. The reactive gasses were nitrogen and oxygen, and the "working" (or inert) gas was Argon. The deposition conditions for the $SiO_2$ and $AlO_xN_y$ layers are provided in Table 26. Each layer was formed at 200° C. deposition temperature and for a deposition time sufficient to form the physical thickness of each layer.

TABLE 25

Example 21 physical attributes.

| Layer | Material | Refractive Index | Physical Thickness (nm) |
|---|---|---|---|
| Medium | Air | 1 | |
| 1 | $SiO_2$ | 1.47225 | 86.51 |
| 2 | $AlO_xN_y$ | 1.98593 | 93.71 |
| 3 | $SiO_2$ | 1.47225 | 23.29 |
| 4 | $AlO_xN_y$ | 1.98593 | 26.79 |
| 5 | $SiO_2$ | 1.47225 | 75.47 |
| 6 | $AlO_xN_y$ | 1.98593 | 23.06 |
| 7 | $SiO_2$ | 1.47225 | 24.12 |
| 8 | $AlO_xN_y$ | 1.98593 | 122.78 |
| 9 | $SiO_2$ | 1.47225 | 33.64 |
| 10 | $AlO_xN_y$ | 1.98593 | 17.32 |
| Substrate | Glass | 1.50542 | |
| Total coating Thickness | | | 526.68 nm |

TABLE 26

Deposition conditions for Example 21.

| Layer | Ar Flow (sccm) | N2 flow (sccm) | O2 flow (sccm) | Al Wrf | Al Wdc | Si Wrf | Si shutter | P (torr) | Bias |
|---|---|---|---|---|---|---|---|---|---|
| $SiO_2$ | | | | | | | | | |
| $AlO_xN_y$ | | | | | | | | | |

Figure 37:
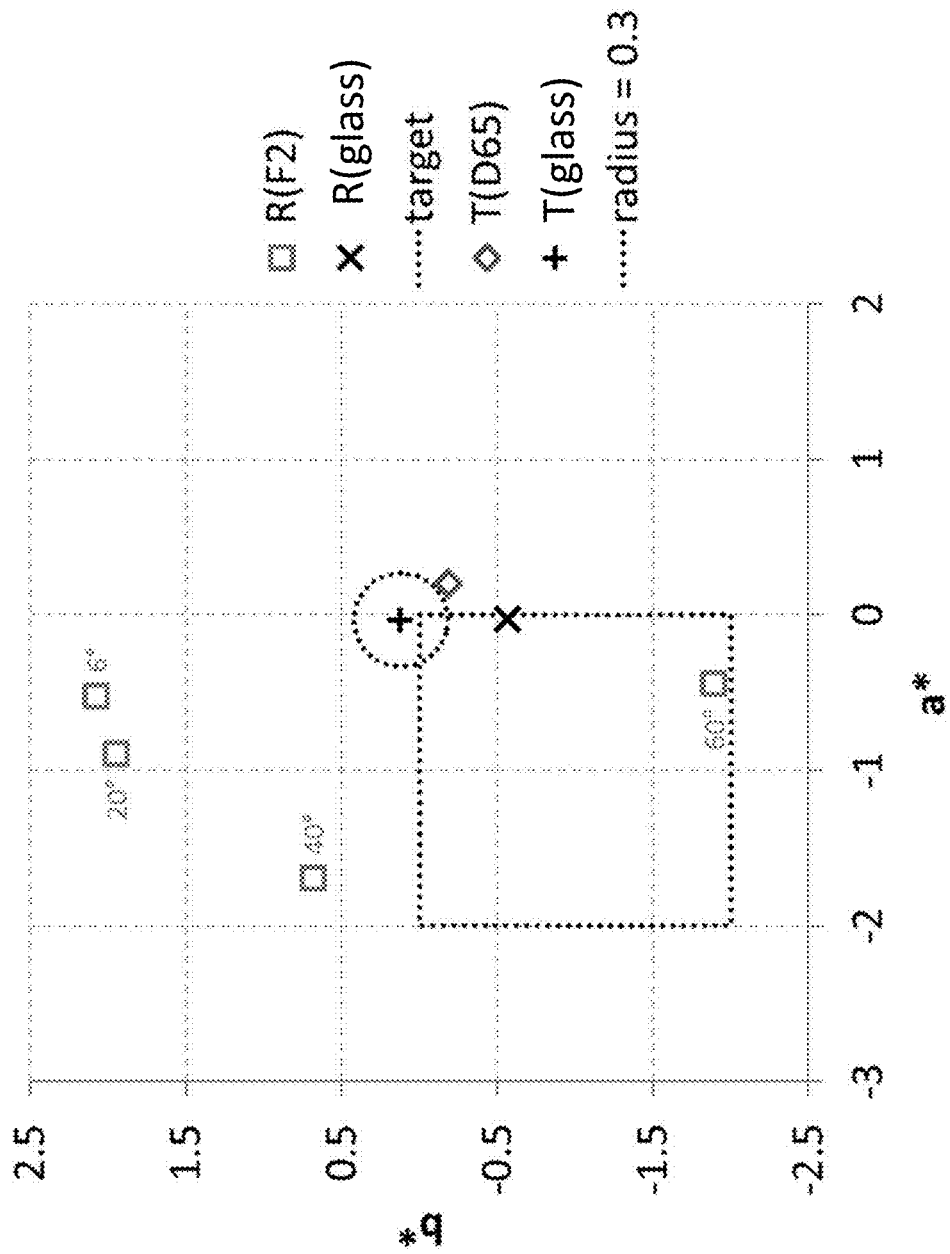
FIG. 37 is an graph showing the measured transmittance color coordinates and reflectance color coordinates of Example 21.

The transmittance color coordinates at normal incidence were measured through both the anti-reflective surface of Example 21 and the opposite bare surface of Example 21 using a D65 illuminant, as shown in FIG. 37 and indicated by T(D65). The reflectance color coordinates were measured on the anti-reflective surface only using a F2 illuminant and at incident illumination angles of 20 degrees, 40 degrees and 60 degrees and a reference illumination angle of 6 degrees are also plotted in FIG. 37, and indicated by R(F2). The measured transmittance and reflectance color coordinates of the substrate are plotted in FIG. 37 and indicated by T(glass) and R(glass), respectively. As shown in FIG. 37, the transmittance color shift of the article with respect to the transmittance color coordinates of the substrate is very low (i.e., less than about 0.5). The color shift with respect to viewing angle in reflectance between the reference illumination angle ($a^*=-0.53$, $b^*=2.08$) and incident viewing angles 20 degrees ($a^*=-0.9$, $b^*=1.95$), 40 degrees ($a^*=-1.7$, $b^*=0.69$) and 60 degrees ($a^*=-0.44$, $b^*=-1.89$) was 0.39, 1.81 and 3.96, respectively.

Figure 38:
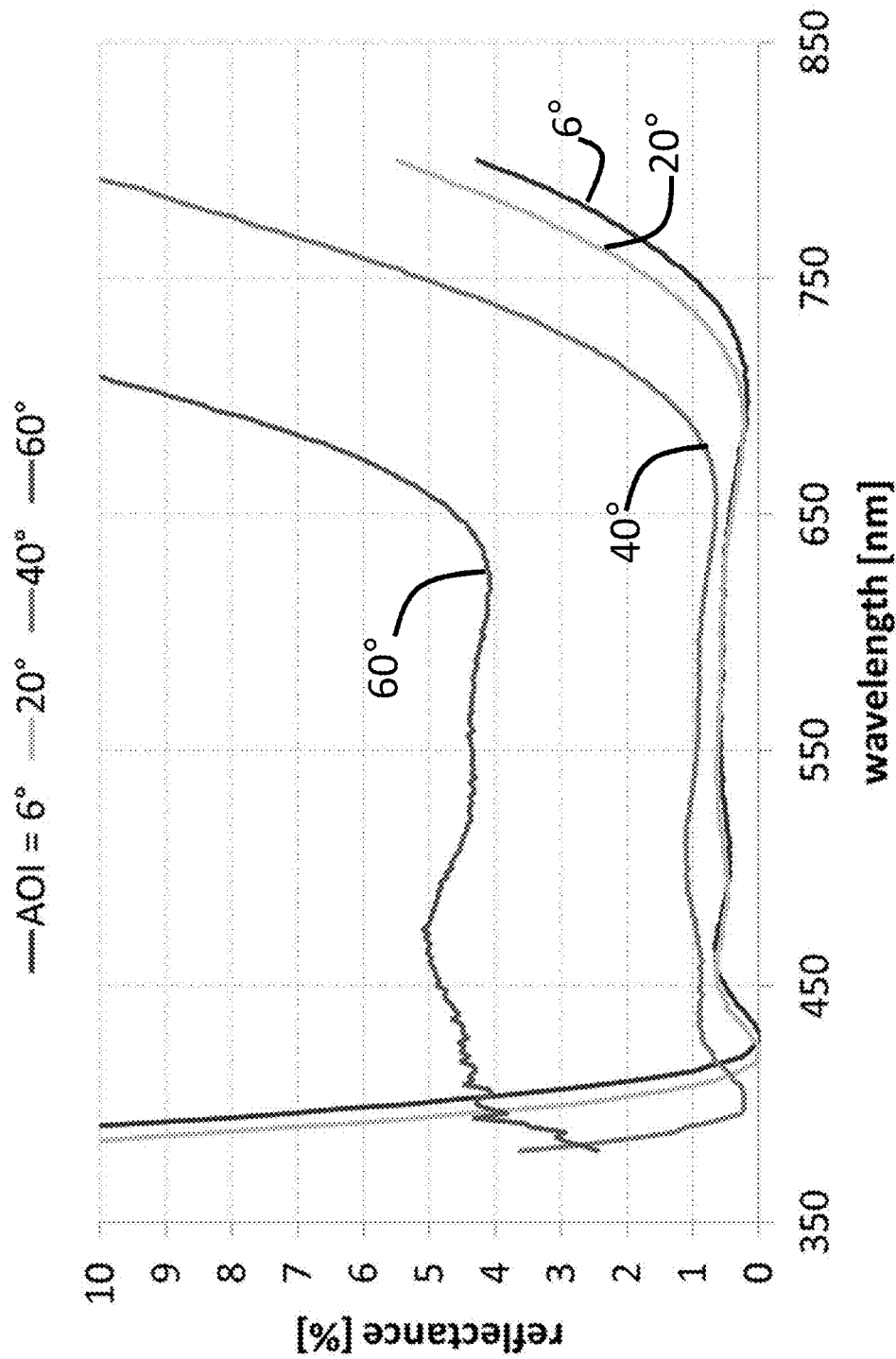
FIG. 38 is the reflectance spectrum for Example 21 at different illumination angles.
Figure 39:
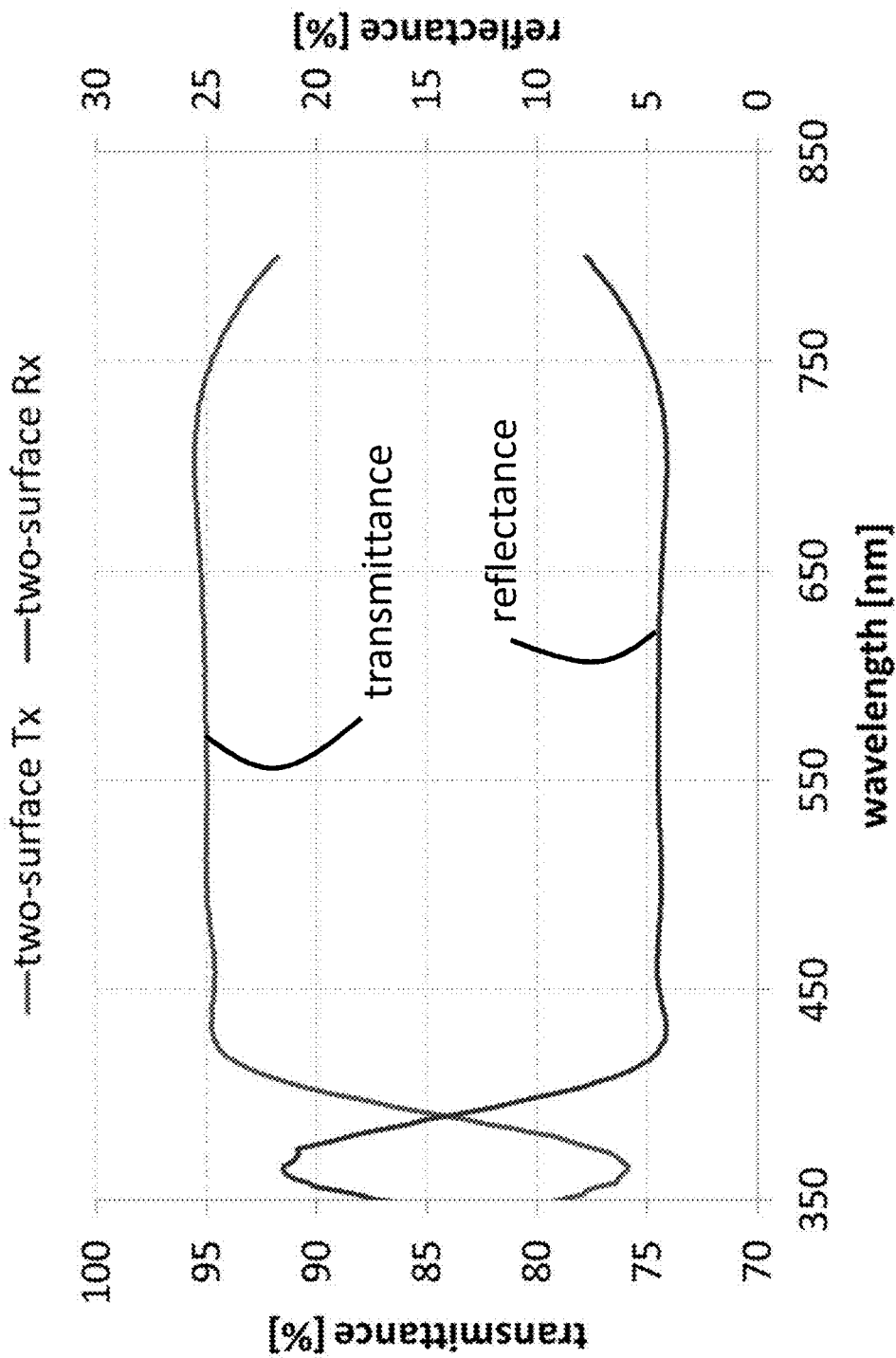
FIG. 39 is a graph showing the two surface transmittance and reflectance spectra for Example 21.

FIG. 38 shows the reflectance spectra of Example 21 as measured on only the anti-reflective surface at the reference illumination angle and the incident viewing angles of 20 degrees, 40 degrees and 60 degrees. The radiometric and photopic average of Example 21 was calculated as 0.54%. The transmittance and reflectance spectra measured at the reference illumination angle (6 degrees) for both the anti-reflective surface and the opposite bare surface are shown in FIG. 39.

The measured hardness and the Young's modulus of Example 21, as measured on the anti-reflective surface, was 11.1 GPa and 110 GPa, respectively. Examples of Modeled Comparative Example 11 exhibited a hardness of about 6.8 GPa.

It will be apparent to those skilled in the art that various modifications and variations can be made without departing from the spirit or scope of the invention.

What is claimed is:

1. An article comprising:
a substrate having a major surface; and
an anti-reflective coating having a physical thickness of from about 0.2 μm to about 1 μm disposed on the major surface, the anti-reflective coating comprising an anti-reflective surface, wherein the anti-reflective coating comprises a plurality of alternating low and high refractive index layers that ranges from five (5) layers to seven (7) layers and comprises a first low refractive index (RI) layer of $SiO_2$ disposed on and in direct contact with the major surface, at least one additional low RI layer of $SiO_2$, and at least one high RI layer, and wherein a total physical thickness of the high RI layers is greater than about 30% of the total physical thickness of the anti-reflective coating,
wherein each high RI layer consists of $SiO_xN_y$, or $Si_uAl_vO_xN_y$,
wherein the first low RI layer disposed on and in direct contact with the major surface of the substrate has an optical thickness from about 15 nm to about 200 nm,
wherein each low RI layer has a refractive index from about 1.3 to about 1.7 and each high RI layer has a refractive index of greater than about 1.9,
wherein the article exhibits a maximum hardness of about 10 GPa or greater as measured by a Berkovich Indenter Hardness Test along an indentation depth of about 50 nm or greater, and
wherein the article exhibits:
a single side average visible photopic light reflectance of about 2% or less.

2. The article of claim 1, wherein the article exhibits article transmittance color coordinates in the (L*, a*, b*) colorimetry system at normal incidence under an International Commission on Illumination illuminant exhibiting a reference point color shift of less than about 2 from a reference point as measured at the anti-reflective surface, the reference point comprising at least one of the color coordinates ($a^*=0$, $b^*=0$) and the transmittance color coordinates of the substrate, and
article reflectance color coordinates in the (L*, a*, b*) colorimetry system at normal incidence under an International Commission on Illumination illuminant exhibiting a reference point color shift of less than about 5 from a reference point as measured at the anti-reflective surface, the reference point comprising at least one of the color coordinates ($a^*=0$, $b^*=0$), the color coordinates ($a^*=-2$, $b^*=-2$) and the reflectance color coordinates of the substrate,
wherein, when the reference point is the color coordinates ($a^*=0$, $b^*=0$), the color shift is defined by $\sqrt{((a^*_{article})^2+(b^*_{article})^2)}$,
wherein, when the reference point is the color coordinates ($a^*=-2$, $b^*=-2$), the color shift is defined by $\sqrt{((a^*_{article}+2)^2+(b^*_{article}+2)^2)}$, and
wherein, when the reference point is the color coordinates of the substrate, the color shift is defined by $\sqrt{((a^*_{article}-a^*_{substrate})+(b^*_{article}-b^*_{substrate})^2)}$.

3. The article of claim 1, wherein the article exhibits about 1% haze or less, as measured using a hazemeter having an aperture, wherein the aperture has a diameter of about 8 mm, and
wherein the haze is measured after a 500-cycle abrasion using a Taber Test.

4. The article of claim 1, wherein the article exhibits an average roughness Ra, as measured by atomic force microscopy, of about 12 nm or less, and
wherein the average roughness Ra is measured after a 500-cycle abrasion using a Taber Test.

5. The article of claim 1, wherein the article exhibits a scattered light intensity of about 0.05 (in units of 1/steradian) or less, at a polar scattering angle of about 40 degrees or less, as measured at normal incidence in transmission using an imaging sphere for scatter measurements, with a 2 mm aperture at 600 nm wavelength, and
wherein the scattered light intensity is measured after a 500-cycle abrasion using a Taber Test.

6. The article of claim 1, wherein the article exhibits a scattered light intensity of about 0.1 (in units of 1/steradian) or less, at a polar scattering angle of about 20 degrees or less, as measured at normal incidence in transmission using an imaging sphere for scatter measurements, with a 2 mm aperture at 600 nm wavelength, and
wherein the scattered light intensity is measured after a 500-cycle abrasion using a Taber Test.

7. The article of claim 1, wherein a total physical thickness of the high RI layers is ≥200 nm.

8. The article of claim 1, wherein the article exhibits a reflectance angular color shift of less than about 5, as measured on the anti-reflective surface, at all angles from normal incidence to an incident illumination angle in the range from about 20 degrees to about 60 degrees under a F2 illuminant, and wherein angular color shift is calculated using the equation $\sqrt{((a^*_2-a^*_1)^2+(b^*_2-b^*_1)^2)}$, with $a^*_1$, and $b^*_1$ representing the coordinates of the article when viewed at normal incidence and $a^*_2$, and $b^*_2$ representing the coordinates of the article when viewed at the incident illumination angle.

9. The article of claim 1, exhibiting a reflectance spectra such that the maximum reflectance over a wavelength range from about 400 nm to about 480 nm (R400-max) is greater than the maximum reflectance over a wavelength range from about 500 nm to about 600 nm (R500-max) and the maximum reflectance over a wavelength range from about 640 nm to about 710 (R640-max), and
   wherein the minimum reflectance over a wavelength range from about 400 nm to about 480 nm (R400-min) is optionally less than the minimum reflectance over a wavelength range from about 500 nm to about 600 nm (R500-min), and
   wherein the minimum reflectance over a wavelength range from about 640 to about 710 (R640-min) is optionally less than R500-min.

10. The article of claim 1, wherein the substrate comprises an amorphous substrate or a crystalline substrate.

11. The article of claim 10, wherein the amorphous substrate comprises a glass selected from the group consisting of soda lime glass, alkali aluminosilicate glass, alkali containing borosilicate glass and alkali aluminoborosilicate glass.

12. The article of claim 10, wherein the crystalline substrate comprises a glass-ceramic substrate.

13. The article of claim 11, wherein the glass is chemically strengthened and comprises a compressive stress (CS) layer with a surface CS of at least 250 MPa extending within the chemically strengthened glass from a surface of the chemically strengthened glass to a depth of layer (DOL) of at least about 10 µm.

14. The article of claim 1, further comprising any one or more of an easy-to-clean coating, a diamond-like carbon coating, and a scratch resistant coating, disposed on the anti-reflective coating.

15. The article of claim 1, wherein the anti-reflective coating comprises a single-sided reflectance of ≤2% over the range of 450 nm to 650 nm for angles of incidence from 0° to 40°.

16. The article of claim 1, wherein the anti-reflective coating has a physical thickness of from about 350 nm to about 1 µm.

17. The article of claim 1, wherein the total physical thickness of the high RI layers is greater than about 30% and less than 45% of the total thickness of the anti-reflective coating.

18. An electronic product incorporating the article according to claim 1, wherein the article is a cover article configured to: (a) protect devices within the product, (b) provide a user interface for input, and/or (c) provide a display.

19. The article of claim 1, wherein the plurality of alternating low and high refractive index layers is five (5) layers.

20. The article of claim 1, wherein the anti-reflective coating has a physical thickness from about 0.2 µm to about 325 nm.

21. An article comprising:
   a substrate having a major surface; and
   an anti-reflective coating having a physical thickness of from about 0.2 µm to about 1 µm disposed on the major surface, the anti-reflective coating comprising a plurality of alternating low and high refractive index layers that ranges from five (5) layers to seven (7) layers and comprises a first low refractive index (RI) layer of $SiO_2$ disposed on and in direct contact with the major surface, at least one additional low RI layer of $SiO_2$, and at least one high RI layer, and wherein a total physical thickness of the high RI layers is greater than about 30% of the total physical thickness of the anti-reflective coating,
   wherein each high RI layer consists of $SiO_xN_y$, or $Si_uAl_vO_xN_y$,
   wherein the first low RI layer disposed on and in direct contact with the major surface of the substrate has an optical thickness from about 15 nm to about 200 nm,
   wherein each low RI layer has a refractive index from about 1.3 to about 1.7 and each high RI layer has a refractive index of greater than about 1.9,
   wherein the article exhibits:
   a maximum hardness of about 10 GPa or greater as measured by a Berkovich Indenter Hardness Test along an indentation depth of about 50 nm or greater;
   a single side average visible photopic light reflectance of about 2% or less; and
   a reflectance angular color shift of about 10 or less, as measured on the anti-reflective surface from normal incidence to an incident illumination angle of about 60 degrees under a D65 illuminant or F2 illuminant, wherein angular color shift is calculated using the equation $\sqrt{((a^*_2-a^*_1)^2+(b^*_2-b^*_1)^2)}$, with $a^*_1$, and $b^*_1$ representing the coordinates of the article when viewed at normal incidence and $a^*_2$, and $b^*_2$ representing the coordinates of the article when viewed at the incident illumination angle, and
   further wherein the article exhibits either one or both
      article transmittance color coordinates in the (L*, a*, b*) colorimetry system at normal incidence the D65 or F2 illuminant exhibiting a reference point color shift of less than about 2 from a reference point as measured at the anti-reflective surface, the reference point comprising at least one of the color coordinates (a*=0, b*=0) and the transmittance color coordinates of the substrate, and
      article reflectance color coordinates in the (L*, a*, b*) colorimetry system at normal incidence exhibiting a color shift of less than about 5 from a reference point as measured at the anti-reflective surface, the reference point comprising at least one of the color coordinates (a*=0, b*=0), the coordinates (a*=−2, b*=−2), and the reflectance color coordinates of the substrate,
         wherein, when the reference point is the color coordinates (a*=0, b*=0), the color shift is defined by $\sqrt{((a^*_{article})^2+(b^*_{article})^2)}$,
         wherein, when the reference point is the color coordinates (a*=−2, b*=−2), the color shift is defined by $\sqrt{((a^*_{article}+2)^2+(b^*_{article}+2)^2)}$, and
         wherein, when the reference point is the color coordinates of the substrate, the color shift is defined by $\sqrt{((a^*_{article}-a^*_{substrate})^2+(b^*_{article}-b^*_{substrate})^2)}$.

22. The article of claim 21, wherein the article exhibits an abrasion resistance comprising any one of
   about 1% haze or less, as measured using a hazemeter having an aperture, wherein the aperture has a diameter of about 8 mm,
   an average roughness, as measured by atomic force microscopy, of about 12 nm RMS or less,
   a scattered light intensity of about 0.05 (in units of 1/steradian) or less, at a polar scattering angle of about 40 degrees or less, as measured at normal incidence in transmission using an imaging sphere for scatter measurements, with a 2 mm aperture at 600 nm wavelength, and a scattered light intensity of about 0.1 (in units of 1/steradian) or less, at a polar scattering angle of about 20 degrees or less, as measured at normal incidence in transmission using an imaging sphere for scatter measurements, with a 2 mm aperture at 600 nm wavelength, wherein the abrasion resistance is measured after a 500-cycle abrasion using a Taber Test.

23. The article of claim 21, wherein a total physical thickness of the high RI layers is ≥200 nm.

24. The article of claim 21, wherein the anti-reflective coating comprises a single-sided reflectance of ≤2% over the range of 450 nm to 650 nm for angles of incidence from 0° to 40°.

25. An article comprising:
a substrate having a major surface; and
an anti-reflective coating having a physical thickness of from about 0.2 µm to about 1 µm disposed on the major surface, wherein the anti-reflective coating comprises a plurality of alternating low and high refractive index layers that ranges from five (5) layers to seven (7) layers and comprises a first low refractive index (RI) layer of $SiO_2$ disposed on and in direct contact with the major surface, at least one additional low RI layer of $SiO_2$, and at least one high RI layer, and wherein a total physical thickness of the high RI layers is greater than about 30% of the total physical thickness of the anti-reflective coating,
wherein each high RI layer consists of $SiO_xN_y$, or $Si_uAl_vO_xN_y$,
wherein the first low RI layer disposed on and in contact with the major surface of the substrate has an optical thickness from about 15 nm to about 200 nm,
wherein each low RI layer has a refractive index from about 1.3 to about 1.7 and each high RI layer has a refractive index of greater than about 1.9,
wherein the article exhibits an abrasion resistance comprising any one or more of:
about 1% haze or less, as measured using a hazemeter having an aperture, wherein the aperture has a diameter of about 8 mm,
an average roughness, as measured by atomic force microscopy, of about 12 nm RMS or less,
a scattered light intensity of about 0.05 (in units of 1/steradian) or less, at a polar scattering angle of about 40 degrees or less, as measured at normal incidence in transmission using an imaging sphere for scatter measurements, with a 2 mm aperture at 600 nm wavelength, and
a scattered light intensity of about 0.1 (in units of 1/steradian) or less, at a polar scattering angle of about 20 degrees or less, as measured at normal incidence in transmission using an imaging sphere for scatter measurements, with a 2 mm aperture at 600 nm wavelength,
wherein the abrasion resistance is measured after a 500-cycle abrasion using a Taber Test, and
wherein the article exhibits a single side average visible photopic reflectance of about 2% or less over the optical wavelength regime at normal incidence under a D65 or F2 illuminant.

26. The article of claim 25, wherein the total physical thickness of the high RI layers is ≥200 nm.

27. The article of claim 25, wherein the anti-reflective coating comprises a single-sided reflectance of ≤2% over the range of 450 nm to 650 nm for angles of incidence from 0° to 40°.

28. An article comprising:
a substrate having a major surface; and
an anti-reflective coating having a physical thickness of from about 0.2 µm to about 1 µm disposed on the major surface, wherein the anti-reflective coating comprises a plurality of alternating low and high refractive index layers that ranges from five (5) layers to seven (7) layers and comprises a first low refractive index (RI) layer of $SiO_2$ disposed on and in direct contact with the major surface, at least one additional low RI of $SiO_2$, and at least one high RI layer, and wherein a total physical thickness of the high RI layers is greater than about 30% of the total physical thickness of the anti-reflective coating,
wherein each high RI layer comprises consists of $SiO_xN_y$, or $Si_uAl_vO_xN_y$,
wherein the first low RI layer disposed on and in contact with the major surface of the substrate has an optical thickness from about 15 nm to about 200 nm,
wherein each low RI layer has a refractive index from about 1.3 to about 1.7 and each high RI layer has a refractive index of greater than about 1.9,
wherein the article exhibits single side average visible photopic reflectance of about 1.5% or less over the optical wavelength regime at normal incidence under a D65 or F2 illuminant, and
wherein the article exhibits a reflectance angular color shift of about 10 or less, as measured on the anti-reflective surface from normal incidence to an incident illumination angle of about 60 degrees under a D65 illuminant or F2 illuminant and wherein angular color shift is calculated using the equation $\sqrt{((a^*_2-a^*_1)^2+(b^*_2-b^*_1)^2)}$, with $a^*_1$, and $b^*_1$ representing the coordinates of the article when viewed at normal incidence and $a^*_2$, and $b^*_2$ representing the coordinates of the article when viewed at the incident illumination angle.

29. The article of claim 28, wherein the anti-reflective coating comprises a single-sided reflectance of ≤2% over the range of 450 nm to 650 nm for angles of incidence from 0° to 40°.

* * * * *

UNITED STATES PATENT AND TRADEMARK OFFICE
CERTIFICATE OF CORRECTION

PATENT NO. : 11,267,973 B2
APPLICATION NO. : 14/707106
DATED : March 8, 2022
INVENTOR(S) : Jaymin Amin et al.

It is certified that error appears in the above-identified patent and that said Letters Patent is hereby corrected as shown below:

On the Title Page

Under item (56) References Cited:

On the page 5, in Column 2, under "Other Publications", Line 2, delete "de" and insert -- dc --.

On the page 5, in Column 2, under "Other Publications", Line 9, delete "Epitaxy" and insert -- Epitaxy: --.

On the page 5, in Column 2, under "Other Publications", Line 9, delete "Incluence" and insert -- Influence --.

On the page 5, in Column 2, under "Other Publications", Line 32, delete "Characatization" and insert -- Characterization --.

On the page 5, in Column 2, under "Other Publications", Line 33, delete "Physices" and insert -- Physics --.

On the page 6, in Column 1, under "Other Publications", Line 1, delete "er" and insert -- et --.

On the page 6, in Column 1, under "Other Publications", Line 12, delete ""Al2O3" and insert -- "Al2O3 --.

On the page 6, in Column 2, under "Other Publications", Line 3, delete "consideratino" and insert -- consideration --.

On the page 6, in Column 2, under "Other Publications", Line 6, delete "Zr02" and insert -- ZrO2 --.

On the page 6, in Column 2, under "Other Publications", Line 6, delete "Al2O3" and insert -- Al2O3 --.

Signed and Sealed this
Thirteenth Day of August, 2024

Katherine Kelly Vidal
*Director of the United States Patent and Trademark Office*

CERTIFICATE OF CORRECTION (continued)
U.S. Pat. No. 11,267,973 B2

On the page 6, in Column 2, under "Other Publications", Line 6, delete "nanolamianted" and insert -- nanolaminated --.

On the page 6, in Column 2, under "Other Publications", Line 18, delete "Chakraborty," and insert -- Chakroborty, --.

On the page 6, in Column 2, under "Other Publications", Line 21, delete "Sceince" and insert -- Science --.

On the page 6, in Column 2, under "Other Publications", Line 27, delete "films" and insert -- films: --.

On the page 6, in Column 2, under "Other Publications", Line 41, delete "AI2O3" and insert -- Al2O3 --.

On the page 6, in Column 2, under "Other Publications", Line 66, delete "Interconects" and insert -- Interconnects --.

On the page 7, in Column 1, under "Other Publications", Line 10, delete "Coming," and insert -- Corning, --.

On the page 7, in Column 1, under "Other Publications", Line 47, delete "oxyynitride" and insert -- oxynitride --.

On the page 7, in Column 1, under "Other Publications", Line 53, delete "notride" and insert -- nitride --.

On the page 7, in Column 1, under "Other Publications", Line 56, delete "Ytiria" and insert -- Yttria --.

On the page 7, in Column 2, under "Other Publications", Line 5, delete "Testing"" and insert -- Testing"; --.

On the page 7, in Column 2, under "Other Publications", Line 25, delete "Stabilzed Zrconia" and insert -- Stabilized Zirconia --.

On the page 7, in Column 2, under "Other Publications", Line 33, delete "Sputiering" and insert -- Sputtering --.

On the page 7, in Column 2, under "Other Publications", Line 34, delete "Sputiering"," and insert -- Sputtering"; --.

On the page 7, in Column 2, under "Other Publications", Line 37, delete "Technology" and insert -- Technology; --.

On the page 7, in Column 2, under "Other Publications", Line 41, delete "Si02" and insert -- SiO2 --.

CERTIFICATE OF CORRECTION (continued)
U.S. Pat. No. 11,267,973 B2

In the Claims

In Column 56, Line 29, in Claim 28, after "layer" delete "comprises".